(12) United States Patent
Asai et al.

(10) Patent No.: US 7,917,791 B2
(45) Date of Patent: Mar. 29, 2011

(54) ELECTRONIC APPARATUS

(75) Inventors: Katsuhiko Asai, Takatsuki (JP);
Sadafusa Tsuji, Tondabayashi (JP);
Katsuyuki Nanba, Sakai (JP);
Masahiko Matsuura, Suita (JP);
Makiko Mandai, Takatsuki (JP);
Hiroshi Ishibe, Kyoto (JP); Mikihiro Komatsu, Ibaraki (JP); Kazuaki Okumura, Ikeda (JP); Naoki Masazumi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 1202 days.

(21) Appl. No.: 11/344,703

(22) Filed: Feb. 1, 2006

(65) Prior Publication Data
US 2006/0125814 A1  Jun. 15, 2006

Related U.S. Application Data

(62) Division of application No. 09/770,078, filed on Jan. 25, 2001, now Pat. No. 7,046,239.

(30) Foreign Application Priority Data

Jan. 25, 2000 (JP) .................................. 00-0016127
Mar. 29, 2000 (JP) .................................. 00-0091609
Mar. 29, 2000 (JP) .................................. 00-0091610

(51) Int. Cl.
*G09G 5/00* (2006.01)
(52) U.S. Cl. ........................................ 713/324; 345/211
(58) Field of Classification Search .................. 345/156, 345/30, 94, 211; 713/324
See application file for complete search history.

(56) References Cited

U.S. PATENT DOCUMENTS

| | | | |
|---|---|---|---|
| 4,746,787 A | 5/1988 | Suto et al. | 235/379 |
| 4,954,985 A | 9/1990 | Yamazaki | 365/379 |
| 5,072,103 A | 12/1991 | Nara | 235/492 |
| H1173 H | 4/1993 | Davis et al. | 340/7.32 |
| 5,359,182 A | 10/1994 | Schilling | 235/380 |
| 5,380,991 A | 1/1995 | Valencia et al. | 235/383 |
| 5,541,985 A | 7/1996 | Ishii et al. | 379/111 |
| 5,598,565 A | 1/1997 | Reinhardt | 713/323 |
| 5,682,027 A | 10/1997 | Bertina et al. | 235/380 |
| 5,682,031 A | 10/1997 | Geronimi | 235/492 |
| 5,740,549 A * | 4/1998 | Reilly et al. | 705/14 |
| 5,841,418 A | 11/1998 | Bril et al. | 345/3.1 |
| 5,946,646 A | 8/1999 | Schena et al. | 702/177 |
| 5,953,047 A | 9/1999 | Nemirofsky | 725/23 |
| 5,990,890 A | 11/1999 | Etheredge | 345/808 |
| 6,011,537 A | 1/2000 | Slotznick | 715/733 |
| 6,019,284 A | 2/2000 | Freeman et al. | 235/380 |
| 6,068,183 A * | 5/2000 | Freeman et al. | 235/375 |
| 6,124,908 A | 9/2000 | Kobayashi et al. | 349/106 |
| 6,289,464 B1 * | 9/2001 | Wecker et al. | 713/300 |

(Continued)

FOREIGN PATENT DOCUMENTS

JP         405046855 A    2/1993

(Continued)

*Primary Examiner* — Quan-Zhen Wang
*Assistant Examiner* — Tony Davis
(74) *Attorney, Agent, or Firm* — Sidley Austin LLP

(57) ABSTRACT

An electronic device includes a display having a memory function and a communications capability. Display functions are controlled based on a state of the operation of the device and/or based on a state of received data. Also disclosed is a method of selectively displaying advertising information based on a state of the device where the advertising can be maintained on the display without requiring any power consumption.

7 Claims, 43 Drawing Sheets

U.S. PATENT DOCUMENTS

| | | | |
|---|---|---|---|
| 6,295,061 B1 | 9/2001 | Park et al. | 715/764 |
| 6,297,789 B2 | 10/2001 | Gauthier et al. | 345/87 |
| 6,339,762 B1 | 1/2002 | Powell | 705/14 |
| 6,446,049 B1 | 9/2002 | Janning et al. | 705/40 |
| 6,473,058 B1* | 10/2002 | Hotomi et al. | 345/1.1 |
| 6,557,107 B1 | 4/2003 | Kim | 713/320 |
| 6,917,359 B1* | 7/2005 | Nanba et al. | 345/211 |
| 7,019,737 B1* | 3/2006 | Asai et al. | 345/211 |
| 2002/0000984 A1* | 1/2002 | Asai et al. | 345/211 |
| 2005/0195147 A1* | 9/2005 | Takahashi et al. | 345/94 |
| 2005/0280627 A1* | 12/2005 | Koshimizu et al. | 345/156 |
| 2006/0017659 A1* | 1/2006 | Ogawa et al. | 345/30 |

FOREIGN PATENT DOCUMENTS

| | | |
|---|---|---|
| JP | 5-264949 A | 10/1993 |
| JP | 5-264954 A | 10/1993 |
| JP | 10-21457 A | 1/1998 |
| JP | 10-40966 A | 2/1998 |
| WO | WO 94/28512 | 12/1994 |

* cited by examiner

FIG. 1
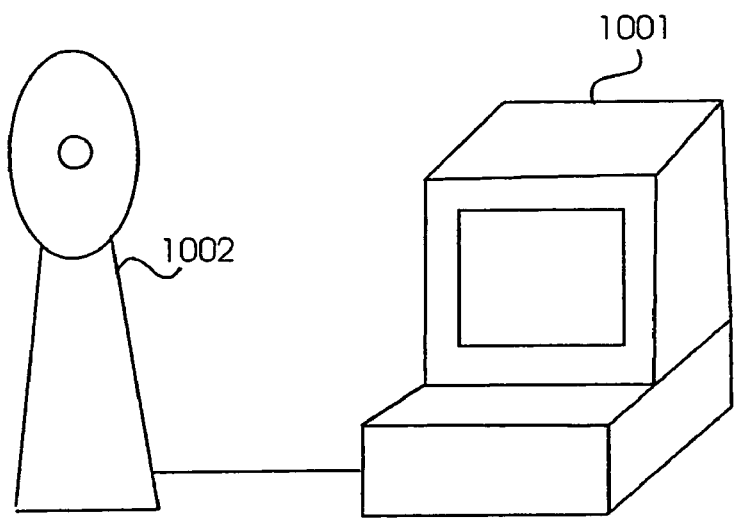
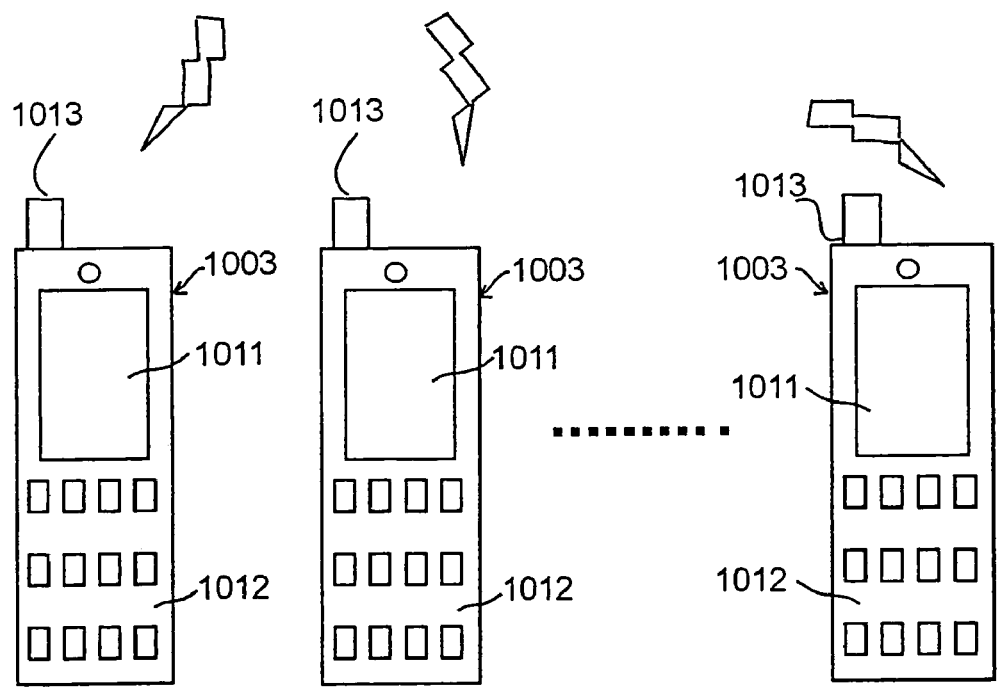

Display Example in On Mode

Display Example 1 in Off Mode

Display Example 2 in Off Mode

Waiting Screen

Guidance Screen

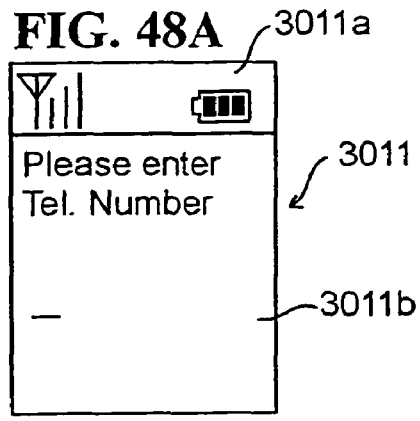
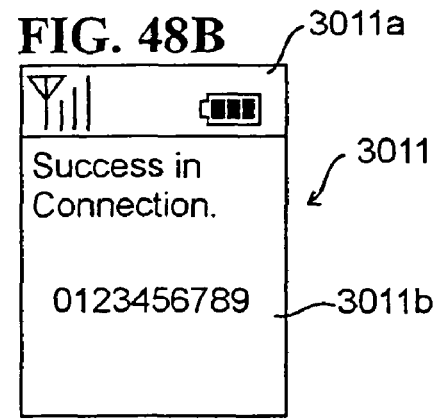
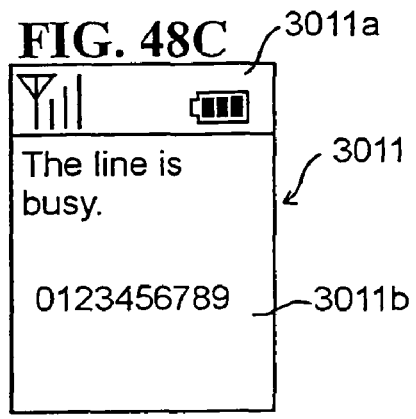
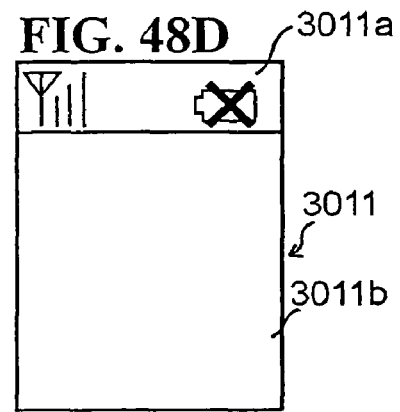
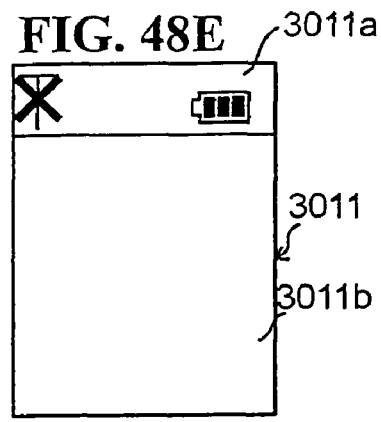
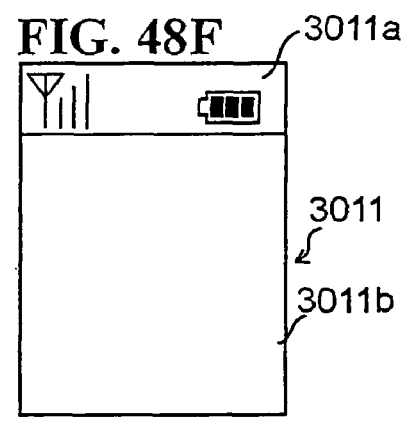

ELECTRONIC APPARATUS

RELATED APPLICATIONS

This application is a divisional application of application Ser. No. 09/770,078, filed Jan. 25, 2001, now U.S. Pat. No. 7,046,239, issued May 16, 2006, which is based on Japanese patent application No. 00-0016127, No. 00-0091609, and No. 00-0091610, the contents of which are hereby incorporated by reference.

FIELD OF THE INVENTION

The present invention relates to an electronic apparatus, a method of placing an advertisement on the electronic apparatus, and a system and a method for charging for usage of the electronic apparatus. More specifically, the present invention relates to an electronic apparatus having a display panel that visibly displays information, a method of placing an advertisement on the electronic apparatus, and a system and a method for charging for usage of the electronic apparatus.

The present invention also relates to a communication terminal, particularly, a communication terminal having a still image data display function such as a portable telephone and a PHS (Personal Handyphone System), a communication system and a communication data structure.

The present invention also relates to a portable communication terminal, and more particularly, to a portable communication terminal such as a portable telephone, a PHS, a portable terminal designed specifically for electronic mail, and a PDA (Personal Digital Assistant) having a communication function.

BACKGROUND OF THE INVENTION

In recent years, electronic apparatuses have been increasing in variety and the number of functions provided therefor has been increasing, so that many kinds of electronic apparatuses are provided with display panels to improve the operability. As the display panels, for example, ones comprising liquid crystal are used. The display panels are structured so as to display operation menu information, the information entered by the user and the like. Display panels of this kind can be used as effective advertising media.

For example, Japanese Laid-open Patent Application No. H5-264954 describes an advertisement information display element using a ferroelectric polymeric liquid crystal having memory capability. Japanese Laid-open Patent Application No. H5-264949 describes a menu apparatus using a ferroelectric polymeric liquid crystal. On this apparatus, letters can be directly written by use of a touch panel.

Japanese Laid-open Patent Application No. H10-21457 discloses a vending machine where product information and advertisement information are displayed on a display panel using a ferroelectric liquid crystal.

However, in displays of the above-described kind, the following are unsolved: to display an operation display function of the apparatus and an advertisement display function without deteriorating the ease of use of the apparatus while achieving energy conservation; and to efficiently update the advertisement display. Thus, an advertising method desirable for the users of the apparatuses, distributors, advertising agents, information service firms and the like is yet unrealized.

Also, when a new electronic apparatus is placed on the market, the usage charge (i.e., fee) of the apparatus is generally set to be high, which hinders wider use of the apparatus. For this reason, a charging method and a charging system with which apparatuses more easily spread is required.

It is also noted that, at present, there are approximately 40 million portable telephone subscribers in Japan; however, problems arise such that the cost to the users is high, that portable telephones are not made use of except when telephone calls are made and that portable telephone apparatuses look similar and it is therefore difficult to distinguish one's telephone apparatus from others'.

In recent years, various kinds of reflective liquid crystal display devices in which liquid crystal exhibiting the cholesteric phase such as cholesteric liquid crystal or chiral nematic liquid crystal is sandwiched between two substrates have been researched and developed. This type of liquid crystal having the cholesteric phase has several advantages even though the writing time is slightly slower than those of TN liquid crystal, STN liquid crystal and the like typically used as display means. Specifically, in the cholesteric liquid crystal display, after information is displayed, the display is maintained even after voltage application is stopped (memory capability is provided), and since the liquid crystal is reflective, no backlight is necessary and bright and high-resolution full-color display can be easily provided. Therefore, it is expected that various novel and useful additional values can be created by providing such a reflective liquid crystal display device having memory capability on a battery-operated portable communication terminal. Such a reflective liquid crystal display device having memory capability is suitable for use as secondary display means of a battery-operated portable communication terminal.

However, liquid crystal exhibiting the cholesteric phase has a problem that the driving voltage is comparatively high. On the other hand, in order that the portability is not impaired, portable communication terminals are required to be capable of maintaining a communicating state and a standby state for a long time with the limited power of the battery. Thus far, a high-power battery that meets this requirement cannot be used even though the above-described type of liquid crystal display device is provided.

Further, when the liquid crystal display device having memory capability and a communication circuit that requires particularly high power among the parts of the portable communication terminal are driven at the same time, the peak current increases to raise a possibility that communication is interrupted. This problem is particularly likely when the battery becomes weak.

SUMMARY OF THE INVENTION

Accordingly, an object of the present invention is to provide an electronic apparatus in which energy conservation can be achieved and a predetermined display such as an advertisement can be efficiently updated without the ease of use being deteriorated.

Another object of the present invention is to provide a method of placing an advertisement on an electronic apparatus, which method is desirable for both the user and the operator of the advertising system or the like.

Still another object of the present invention is to provide a charging system (i.e., billing system) and a charging method effective at making an electronic apparatus widespread.

Another object of the present invention is to provide a communication terminal and a communication system in which by using the display device having memory capability as secondary display means, the cost to the users can be reduced and various kinds of image display that were previously impossible can be performed.

Another object of the present invention is to provide a communication data structure most suitable for use in the communication terminal and the communication system.

Another object of the present invention is to provide a portable communication terminal in which, although a liquid crystal display device having memory capability is provided, impairment of functions such as the communication function by driving of the display device is minimized.

To achieve the above-mentioned objects, one apparatus [TNT1] according to the present invention comprises: a rewritable display panel having memory capability; reception means for externally receiving display information; and control means for performing display in a display mode in which first display information associated with an operation is displayed on said display panel when said apparatus is operated, second display information received by said reception means is displayed on said display panel at least when said apparatus is not operated and the display is maintained with no power supplied to said display panel.

In the above-described device, when the apparatus is operated, the first display information associated with the operation is displayed on the display panel, so that the operability improves. When the apparatus is not operated, the second information (for example, advertisement information) is displayed and the display is maintained with no power supplied, so that energy conservation can be achieved. Since the second information is externally received, latest information which is desirable for receivers and distributors is displayed.

Moreover, in the apparatus, by displaying the second display information at all times, at least in an area of the display panel, the user more frequently sees the second display information such as an advertisement, so that the effect of the advertisement improves. Moreover, by displaying the second display information at all times at least in an area of the display panel and inhibiting the display of the second display information from being turned off by an operation by the user, the effect of the display such as an advertisement can be prevented from being inadvertently ruined.

Further, by updating the second display information when power necessary for operating the apparatus can be supplied even if the second display information is updated, the operation of the apparatus can be prevented from being hindered.

Moreover, another apparatus according to the present invention comprises: reception means for externally receiving display information; a first display portion for displaying first display information associated with an operation of the apparatus; and a second display portion for displaying second display information received by the reception means at least when the apparatus is not operated, and at least the second display portion has memory capability.

In this apparatus, control means may be provided for performing display in a display mode in which the first display information is displayed on the first display portion when the apparatus is operated, the second display information is displayed on the second display portion at least when the apparatus is not operated and the display is maintained with no power supplied to the second display portion.

In this apparatus, each of the first and the second display portions may be a part of a common display panel having memory capability.

In both the above apparatuses, by the reception means being a connector for connection to a communication line, the second display information can be received with reliability. Moreover, by the reception means including a reception circuit for radio communication, information can be received even at a place not equipped with a communication line. Alternately, by memory means in which the second display information is stored being detachably attachable to the apparatus and the receiving means receiving the second display information from the memory means, the second display information can be received even when connection to a communication line is impossible or when radio waves cannot be received.

In the above-described electronic apparatuses, detection means may be further provided for detecting information on the presence or absence of reception of at least one of an electronic apparatus purchase price discount service and an electronic apparatus usage charge discount service. The control means may decide whether to select the display mode or not based on a result of detection by the detection means. By doing this, display can be accurately performed in correspondence with reception of a service. The information on the presence or absence of reception of a discount service may be received from an external apparatus through the reception means.

According to another aspect of the present invention, a first advertisement method according to the present invention is a method of placing an advertisement on an electronic apparatus comprising a display panel having memory capability and control means for controlling display on the display panel, and the control means is set so that when at least one of an electronic apparatus purchase price discount service and an electronic apparatus usage charge discount service is received, an advertisement is displayed on the display panel at least when the electronic apparatus is not operated and the advertisement displayed condition is maintained with no power supplied.

According to this advertisement method, the user can obtain an advantage that information and a discount on the usage charge of the apparatus can be obtained or that information and the apparatus can be obtained inexpensively, so that the display panel on the apparatus can be effectively utilized for display of guidance information. Moreover, since advertisement display is provided with no power consumption when the apparatus is not operated, the manufacturer of the apparatus, distributors, advertising agencies and information service firms have an advantage that advertisements can be placed without excessive expense to the user.

In a second advertisement method according to the present invention, a display panel having memory capability is provided on the electronic apparatus, and when a user is under a predetermined payment contract in using the electronic apparatus, an advertisement is displayed on the display panel and the advertisement displayed condition is maintained with no power supplied.

According to this advertisement method, the user can obtain an advantage that information and a discount on the usage charge of the apparatus can be obtained, so that the display panel on the apparatus can be effectively utilized for display of guidance information. Moreover, since the advertisement display has no power consumption when the apparatus is not operated, the manufacturer of the apparatus, distributors, advertising agencies and information service firms have an advantage that advertisements can be placed without excessive expense to the user.

In a third advertisement method according to the present invention, a display panel having memory capability is provided on the electronic apparatus, and when a user receives a predetermined discount in purchasing the electronic apparatus, an advertisement is displayed on the display panel and the advertisement displayed condition is maintained with no power supplied.

According to this advertisement method, the user can obtain information and the apparatus inexpensively, so that the display panel on the apparatus can be effectively utilized for display of guidance information. Moreover, since advertisement display is provided with no power consumption when the apparatus is not operated, the manufacturer of the apparatus, distributors, advertising agencies and information service firms have an advantage that advertisements can be placed without excessive expense to the user.

According to another aspect of the present invention, a charging system according to the present invention is a system for charging for usage of an electronic apparatus provided with a display panel having memory capability, and the charging system comprises: a management table in which an identification number of the electronic apparatus and information on the presence or absence of a discount service are registered; setting means for setting the electronic apparatus so that predetermined information is displayed on the display panel based on the presence or absence of a discount service and the display is maintained with no power supplied; a charge counter for counting a usage charge based on a use condition of the electronic apparatus; subtraction means for reducing the usage charge based on the registered information; and charging means for charging a user based on the reduced usage charge.

According to another aspect of the present invention, a charging method according to the present invention is a method of charging for usage of an electronic apparatus provided with a display panel having memory capability, and the charging method comprises the steps of: (1) registering in a management table an identification number of the electronic apparatus and information on the presence or absence of a discount service; (2) setting the electronic apparatus so that predetermined information is displayed on the display panel based on the presence or absence of a discount service and the display is maintained with no power supplied; (3) counting a usage charge by a charge counter based on a use condition of the electronic apparatus; (4) reducing the usage charge by subtraction means based on the registered information; and (5) charging a user based on the reduced usage charge. The electronic apparatus may be designed so that the setting of the electronic apparatus in the step (2) can be performed from outside the electronic apparatus.

To achieve the above-mentioned objects of the invention, a communication terminal according to another aspect of the present invention comprises: first display means; second display means having memory capability; and control means for, based on an identifier attached to communication data, selecting either the first display means or the second display means as a display on which received image data is displayed.

In the above-described communication terminal, the second display means having memory capability is provided in addition to the first display means, and display means can be selected in accordance with the content of the image to be displayed. For example, an image not requiring frequent updating can be displayed on the second display means. Therefore, at the transmitting end of such an image, an identifier is previously attached to the communication data, and at the receiving end, based on the identifier, the second display means having memory capability is selected as the display on which received data is displayed.

For example, an advertisement provided by a specific company or the like is transmitted as a still image and displayed on the second display means having memory capability of a multiplicity of communication terminals. Since the telephone company can obtain advertising revenue, the cost to the users of the communication terminals can be reduced. Moreover, by transmitting a weather forecast, fortune-telling or news and displaying it, communication terminals can be used not only as telephones but also as information sources. Alternately, still images (for example, images captured from a digital camera or a personal computer) can be exchanged between communication terminals, and by displaying a received still image, the communication terminal can be decorated with a distinctive display.

Further, in the communication terminal according to the present invention, when selecting the second display means having memory capability as the display on which received image data is displayed, the control means may display the image data on the second display means without making a reception notification sound.

As the second display means, one including a reflective liquid crystal display device may be used. In this case, no backlight is necessary and the energy necessary for display can be reduced. In addition, the contents of the display can be excellently viewed also when the communication terminal is used outdoors.

A communication system according to another aspect of the present invention comprises: a) a first communication terminal comprising: communication means; and providing means for providing communication data with an identifier related to a content of image data included in the communication data; and (b) a second communication terminal comprising: communication means; a first display means; a second display means having memory capability; and control means for, based on the identifier attached to the received communication data, selecting either the first display means or the second display means as a display on which received image data is displayed.

Consequently, images to be displayed on the display means having memory capability, such as still images not requiring frequent rewriting, can be easily displayed with reliability.

A communication data structure according to another aspect of the present invention comprises: image data portion including image data to be displayed; and an identifier to indicate that the image data is to be displayed on display means having memory capability. Consequently, in a communication terminal provided with the display means having memory capability, images to be displayed on the display means having memory capability can be easily identified with reliability.

To achieve the above-mentioned objects, a portable communication terminal according to a another aspect of the present invention comprises: a display device having memory capability; means for driving the display device; a power source; communication means; and control means for inhibiting driving of the display device and communication from being performed at the same time.

In the portable communication terminal according to the above aspect of the invention, driving of the display device having memory capability that requires comparatively high electric power, and communication are never performed at the same time. Consequently, the possibility that the peak current increases to interrupt communication is avoided.

A portable communication terminal according to another aspect of the invention comprises: a display device having memory capability; means for driving the display device; a power source; communication means; and control means for inhibiting driving of at least a display area of the display device and performing communication at the same time.

When processing in parallel with communication is inhibited, although update of all the display areas of the display device may be inhibited during communication, it is not necessary to inhibit driving of all the display areas, and update of a display area may be permitted to an extent that does not cause an electric load heavy enough to interrupt communication. The display area permitted to be updated during communication may be an additional information display area, and it is preferable for the additional information to include information on the remaining power of the power source. The information on the remaining power of the power source such as a battery is necessary for effectively using a portable communication terminal, and by giving higher priority to update of the information, the usability improves.

In the portable communication terminal according to the above aspect of the invention, either a first mode that inhibits update of all the display areas of the display device during communication or a second mode that permits update of a display area of the liquid crystal display device during communication may be selected.

A portable communication terminal according to a another aspect of the invention comprises: a display device having memory capability; means for driving the display device; a power source; communication means; and control means for adjusting driving timing of communication and the display device based on a change in an input and output level of communication.

By adjusting the driving timing of communication and the display device based on a change in the input and output level of communication, necessary information can be displayed while the possibility of interruption of communication is avoided, so that the operability improves.

The standby period is a period during which the portable communication terminal is in a state where it is waiting for a call or communication from another terminal although the line is not connected (that is, in a state where line connection can be immediately performed when a request for a call or communication is received from another terminal) or a period during which the portable communication terminal is trying to establish a connection to the base station in order to make a call or perform communication.

For example, power consumption is not so high during the standby period and during communication at a low input and output level, and there is no possibility that permission of update of the display on the display device causes a problem such as interruption of communication. If anything, the usability improves. In this case, the display area permitted to be updated may be limited to the additional information display area.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers.

FIG. 1 is an explanatory view showing a portable telephone communication system according to a first embodiment of the present invention.

FIG. 28A is a perspective view viewed from the front surface side.

FIG. 28B is a perspective view viewed from the rear surface side.

FIGS. 48A through 48F are explanatory views showing examples of the display provided on the liquid crystal display panel during a telephone call.

DETAILED DESCRIPTION OF THE PREFERRED EMBODIMENTS

Hereinafter, various embodiments of the electronic apparatus, the method of placing an advertisement on the electronic apparatus, and the charging system and the charging method for usage of the electronic apparatus according to the present invention will be described with reference to the attached drawings.

First Embodiment, Referring to FIGS. 1 to 14

In the first embodiment, a case is shown in which the present invention is applied to a portable telephone. FIG. 1 schematically shows a portable telephone line system which is structured as a system in which a host apparatus 1001 transmits information such as an advertisement from a transmission tower 1002 to portable telephones 1003 owned by users.

Each of the portable telephones 1003 has on the front surface thereof a display panel 1011 comprising a liquid crystal display device and an operation panel 1012 including operation keys such as a power key and a numeric keypad, and has a transmitter/receiver 1013, internal speaker and internal microphone (non-illustrated). The display device used for the display panel 1011 uses a liquid crystal having memory capability, and details thereof will be described later.

The functions intrinsic to the portable telephones 1003 such as the functions of telephone call placement, alert, and electronic mail transmission and reception are similar to the conventional ones. The portable telephones 1003 are structured so that a choice between a condition where telephone call placement and provision of an alert when a call arrives are enabled (hereinafter, referred to as ON mode) and a condition where telephone call placement and provision of an alert when a call arrives are disabled (hereinafter, referred to as OFF mode) can be made by operating the power key.

Hereinafter, the structure of the display panel 1011 characteristic of the first embodiment and the display configuration thereof will be described.

Figure 2A:
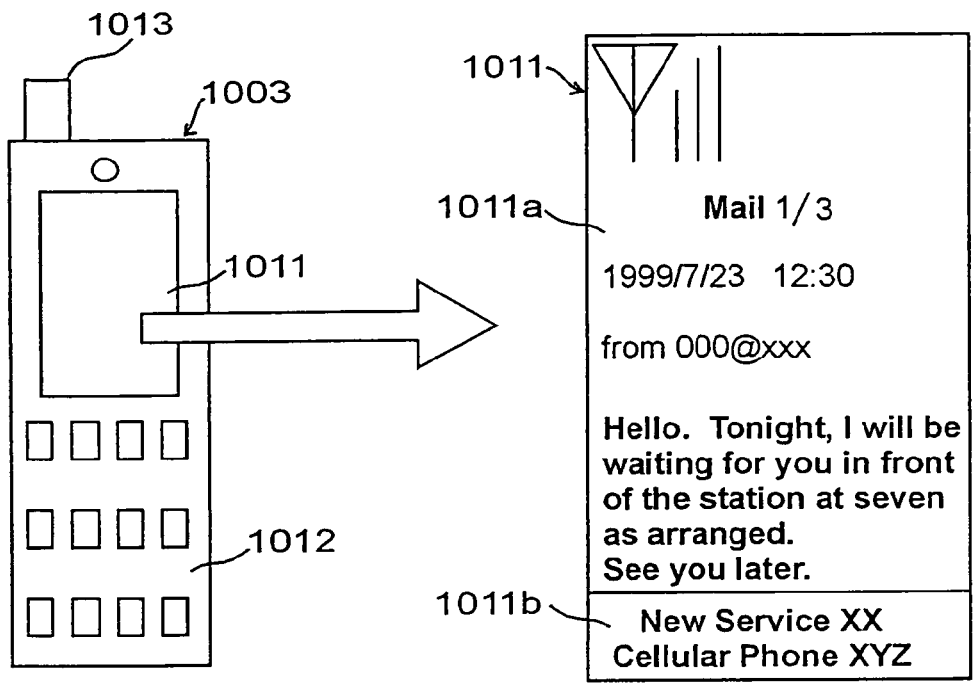
FIGS. 2A through 2C show an explanatory view showing examples of displays on a display panel of the portable telephone.
Figure 2B:
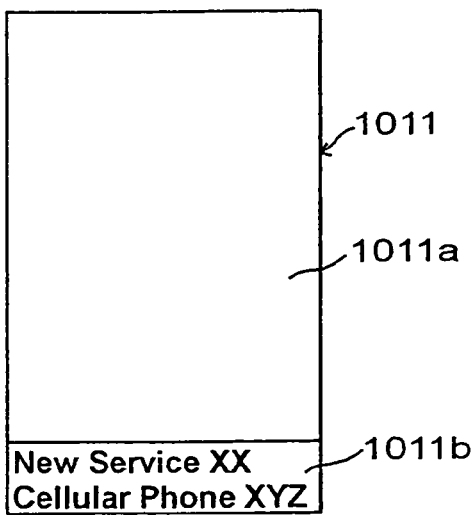
Figure 2C:
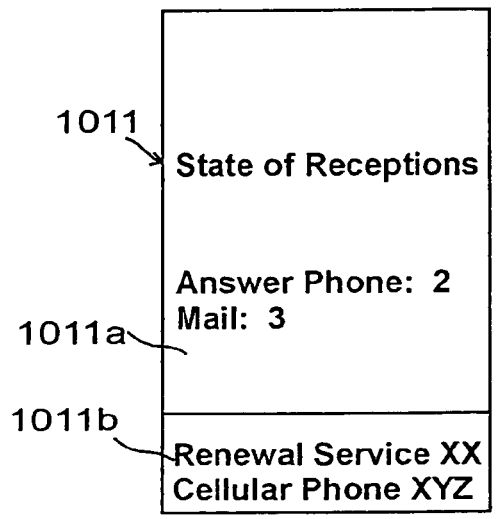

The display panel 1011 comprises, as shown in FIGS. 2A-2C, a guidance and data display area 1011a and an advertisement display area 1011b. The guidance and data display area 1011a is comparatively large, and when the ON mode is chosen, for example, the following are displayed: the radio wave intensity information, information such as the number of mails, the transmission or reception date, the mail address and the text of a mail (as shown in FIG. 2A), information associated with operations of the portable telephone 1003 such as the telephone number, the call placement date and various messages, as well as mails.

The advertisement display area 1011b is belt-shaped and small so as not to interfere with the display in the data display area 1011a and mail reading. However, the advertisement display area 1011b is set in an arbitrary position and may be movable by the user. The size of the advertisement display area 1011b may be changeable to the user's liking.

The information displayed in the advertisement display area 1011b is transmitted from the host apparatus 1001 to each portable telephone 1003 by way of the transmission tower 1002. The host apparatus 1001 updates the contents of the advertisement periodically or at given times in accordance with the advertiser's intention. The contents of the advertisement may be automatically updated in response to an operation of the power key or an operation key. However, the update of the display in the advertisement display area 1011b is inhibited immediately before the power source (for example, a battery such as a secondary battery) of the portable telephone 1003 becomes exhausted. The degree of exhaustion of the battery is detected by a known method. In other words, the display in the advertisement display area 1011b is updated when power necessary for operating the portable telephone 1003 can be supplied.

Since the display panel 1011 uses a liquid crystal having memory capability, the displayed condition can be maintained even when the power supply to the display panel 1011 is stopped. As shown in FIG. 2B, when the mode is changed from the ON mode to the OFF mode, although the display in the guidance and data display area 1011a is turned off, the advertisement display area 1011b is maintained in the advertisement displayed condition even in the OFF mode. The power consumed to maintain the advertisement display is zero. The portable telephones 1003 are structured so that the arrival of calls can be recognized even in the OFF mode. When a call arrives, the display panel 1011 is temporarily driven, and as shown in FIG. 2(C), the advertisement display in the display area 1011*b* is maintained and the reception condition is displayed in the data display area 1011*a*.

The user cannot freely turn off the display in the advertisement display area 1011*b*. However, to maintain excellent operability of the portable telephone 1003, a mode in which the user can temporarily turn off the advertisement display in the advertisement display area 1011*b* can be set. When this mode is selected, for example, by an operation of a display mode change key, the advertisement is temporarily turned off and the size of the guidance and data display area 1011*a* is enlarged. After a predetermined time from the end of the operation, the advertisement display is resumed and the display mode is returned to the previously set one.

By displaying an advertisement in the display area 1011*b* when the user receives a predetermined payment service in using the portable telephone 1003, for example, a service that provides a discount on the usage charge of the apparatus, the telephone charge or the usage charge of the mail service (usage charge discount service), the user can use the portable telephone for a small fee. When the user receives a predetermined price reduction (purchase price discount service) when purchasing the portable telephone 1003, by displaying an advertisement in the advertisement display area 1011*b*, the user can purchase the portable telephone at a low price.

On the other hand, the advertiser can present advertisements to a larger number of people.

Charging System, Referring to FIGS. 3 to 6

Figure 3:
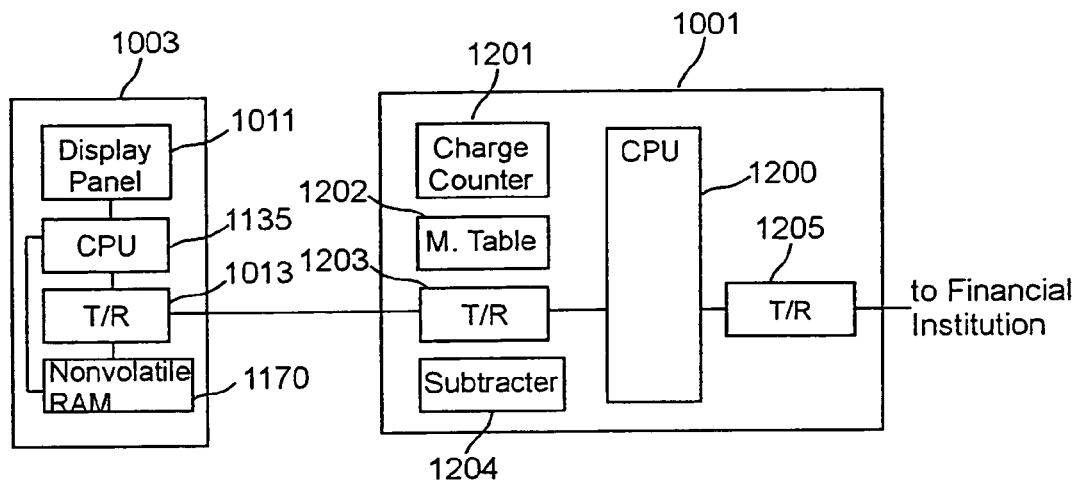
FIG. 3 is a block diagram showing a charging system for the portable telephone.

Now, a charging system will be described. As shown in FIG. 3, the charging system comprises the portable telephone 1003 and the host apparatus 1001 connected to a financial institution or the like by a communication line through a transmitter/receiver 1205.

The host apparatus 1001 includes a CPU 1200 controlling operations of the entire apparatus, a charge counter 1201 for counting the telephone charges of the portable telephone 1003, a management table 1202 in which the ID number of the portable telephone 1003 and information such as the presence or absence of a discount service are registered, a transmitter/receiver 1203 for performing communication with the portable telephone 1003, and a subtracter 1204 for reducing the telephone charges based on the presence or absence of a discount service.

The portable telephone 1003 is provided with a nonvolatile RAM 1170 in which information associated with the presence or absence of reception of a purchase price discount service or a usage charge discount service is stored. A CPU 1135 reads the information stored in the nonvolatile RAM 1170, and provides an instruction to drive the display panel 1011 based on the information.

Figure 4:
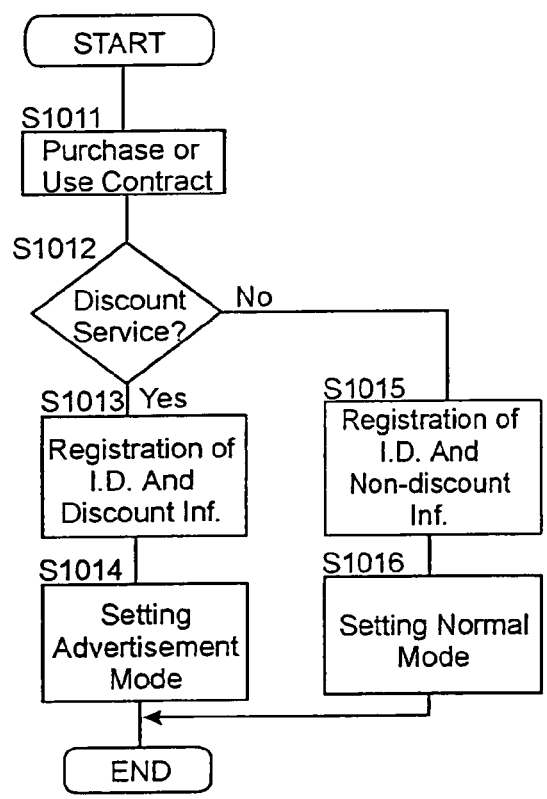
FIG. 4 is a flowchart showing the control system of a registration processing in the charging system.
Figure 5:
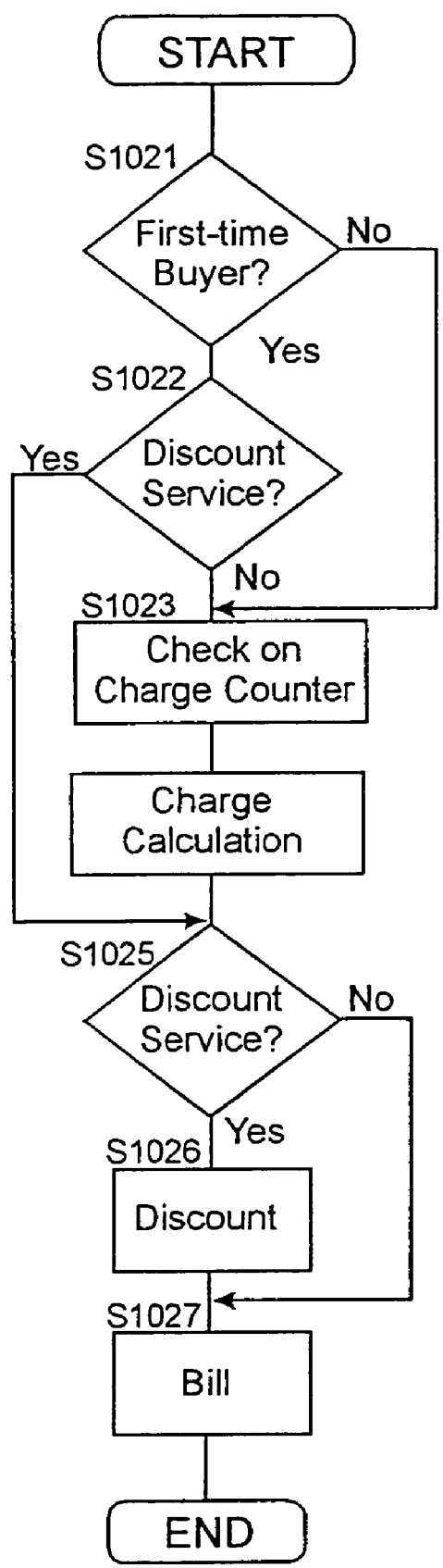
FIG. 5 is a flowchart showing the control procedure of a charging processing in the charging system.
Figure 6:
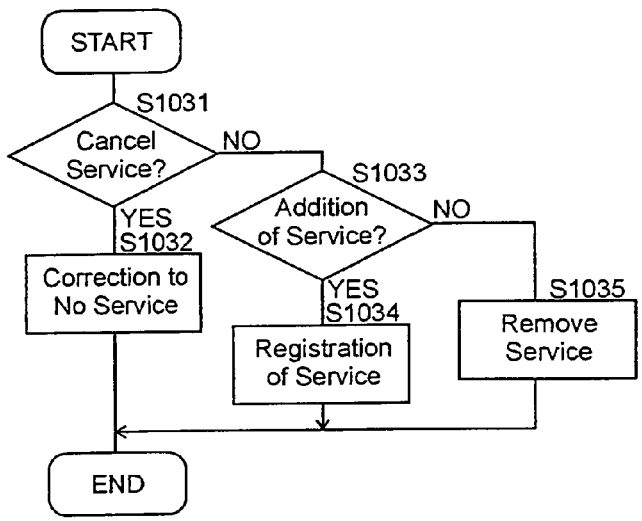
FIG. 6 is a flowchart showing a discount service change processing in the charging system.

FIGS. 4, 5 and 6 are flowcharts showing an example of such discount services. In this example, the discount service comprises the following three procedures: registration processing, charging processing and service change processing.

FIG. 4 shows the control procedure of the registration processing. First, a purchase contract or a use contract is made with the user (step S1011). In doing this, whether the user receives a discount service or not is checked. When the user receives a discount service (YES of S1012), the ID number of the apparatus and information representative of the presence of reception of a discount service are registered in the management table 1202 of the host apparatus 1001 (step S1013). Then, an advertisement display mode representative of the presence of a discount service is set in the portable telephone 1003 (step S1014). The advertisement display mode is set on the portable telephone 1003 by operating a predetermined key or, alternatively, is set on the host apparatus 1001 through a communication circuit. The mode switching may be made by providing on the portable telephone 1003 a switch that cannot be operated by the user. In any case, the information set in this manner is stored in the nonvolatile RAM 1170 included in the portable telephone 1003.

When the user does not receive a discount service (NO of step S1012), the ID number of the apparatus and information representative of the absence of a discount service are registered in the management table 1202 of the host apparatus 1001 (step S1015). Then, a normal mode representative of the absence of a discount service is set in the portable telephone 1003 (step S1016).

The advertisement mode or the normal mode can also be set as a default value at the time of manufacture or shipment of the portable telephone 1003.

FIG. 5 shows the control procedure of the charging processing. First, whether or not the user is a first-time buyer is determined. When the user is a first-time buyer (YES of S1021) and receives only a discount service offered at the time of purchase (YES of step S1022), the process proceeds to step S1025.

When the user is not a first-time buyer (NO of step S1021) and when the user is a first-time buyer and receives a discount service offered in using the portable telephone (YES of step S1021, NO of step S1022), the charge in accordance with the use condition of the portable telephone 1003 is calculated by the charge counter 1201 (steps S1023 and S1024).

When the user receives a discount service (YES of step S1025), a predetermined amount is subtracted from the purchase price or the usage charge by the subtracter 1204 (step S1026), and the user is charged based on the reduced usage charge (step S1027). The user pays the charge directly from his or her bank account or pays it into the telephone company's bank account.

FIG. 6 shows the control procedure of the discount service change processing. The discount services include purchase price discount services and telephone charge discount services, and the latter services include the following two kinds: a service that allows the user to temporarily turn off the advertisement when operating the apparatus as described above and a service that does not allow the user to do so. When addition or cancellation of such a plurality of discount services is performed, the discount service change processing is performed.

When all the services are canceled, the service registration is corrected to no service (YES of step S1031, step S1032). When a service is added, the service to be added is added to the registration (NO of step S1031, YES of step S1033, step S1034). When a service is canceled, only the service to be canceled is removed from the registration (NO of step S1033, step S1035).

The service change processing is registered in the management table 1202, and based on the registered information, a command is sent to the portable telephone 1003 over the communication line to update the information in the nonvolatile RAM 1170.

The above-described charging system is equally applicable to portable communication apparatuses such as Personal Handyphone Systems (PHS's), transceivers, portable radio sets, communication Personal Digital Assistants (PDAs) and portable terminals designed specifically for electronic mail as well as to portable telephones. Moreover, the charging system is similarly applicable to receive-only portable electronic apparatuses such as portable GPS apparatuses, radio pagers, radios and portable televisions. Further, the charging system is applicable to car navigation apparatuses, car radio sets and the like having a GPS circuit, a receiver supporting the VICs (Vehicle Information Communication System) or the like. Further, the charging system is applicable to non-portable apparatuses such as fixed telephones, facsimiles, fixed radio sets, televisions and audio apparatuses.

In the case of electronic apparatuses frequently operated at a position away from the main unit of the apparatus by use of a remote control such as televisions and audio apparatuses, it is more effective that the screen for advertisement display is larger in size.

Display Panel, Referring to FIGS. 7 to 10

Now, a liquid crystal display device including liquid crystal exhibiting the cholesteric phase and a touch panel used for the display panel 1011 will be described.

Figure 7:
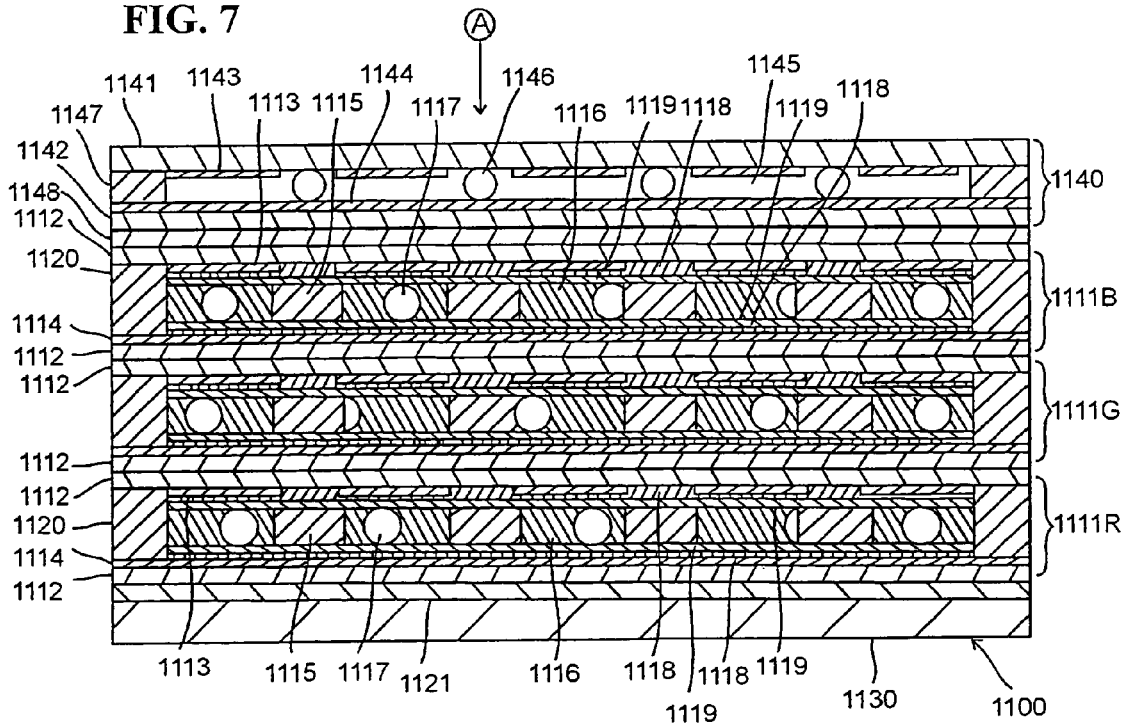
FIG. 7 is a cross-sectional view showing an example of a liquid crystal display device constituting the display panel.

FIG. 7 shows an example of a reflective type liquid crystal display device. The liquid crystal display device 1100 has a structure such that a red display layer 1111R performing display by switching between selective reflection of red and a transparent condition is disposed on a light absorbing layer 1121 provided on a support board 1130 of a hard material in order to prevent bending, a green display layer 1111G performing display by switching between selective reflection of green and the transparent condition is laminated on the red display layer 1111R, and a blue display layer 1111B performing display by switching between selective reflection of blue and the transparent condition is laminated on the green display layer 1111G.

The touch panel 1140 is placed on the surface of the liquid crystal display device 1100 with a protective layer 1148 of a hard resin material in between. The protective layer 1148 is provided for preventing a partial pressure from acting on the liquid crystal display device 1100. The touch panel 1140 has a known structure in which belt-shaped transparent electrodes 1143 and 1144 are provided on the opposing surfaces of transparent substrates 1141 and 1142 to form a matrix-form sensor. Between the substrates 1141 and 1142, a predetermined gap is maintained by particulate spacers 1146 and a surrounding sealing member 1147. The gap is filled with an air layer 1145. The portions at which the belt-shaped transparent electrodes 1143 and 1144 intersect are sensing portions which correspond to the pixels of the display layers 1111R, 1111G and 1111B described below.

The display layers 1111R, 1111G and 1111B have a structure such that resin pillars 1115, liquid crystal 1116 and spacers 1117 are sandwiched between transparent substrates 1112 having transparent electrodes 1113 and 1114 formed thereon. On the transparent electrodes 1113 and 1114, an insulative film 1118 and an alignment control film 1119 are provided as required. Around the perimeter of the transparent substrate 1112 (outside the display area), a sealing member 1120 for sealing of the liquid crystal 1116 is provided.

The transparent electrodes 1113 and 1114 are connected to drive ICs 1131 and 1132 (see FIG. 6), respectively, and a predetermined pulse voltage is applied between the transparent electrodes 1113 and 1114. In response to the applied voltage, the display is switched between the transparent condition in which the liquid crystal 1116 transmits visible light and the selective reflection condition in which the liquid crystal 1116 selectively reflects visible light of a specific wavelength.

The transparent electrodes 1113 and 1114 provided in each of the display layers 1111R, 1111G and 1111B comprise a plurality of belt-shaped electrodes disposed in parallel at minute intervals, and are opposed so that the belt-shaped electrodes of the transparent electrodes 1113 and 1114 are perpendicular to each other. Current is successively passed through these upper and lower belt-shaped electrodes. That is, a voltage is successively applied to each liquid crystal 1116 in a matrix form to perform display. This is called matrix driving. By performing such matrix driving on the display layers successively or at the same time, a full color image is displayed on the liquid crystal display device 1100.

Specifically, in a liquid crystal display device in which liquid crystal exhibiting the cholesteric phase is sandwiched between two substrates, display is performed by switching the state of the liquid crystal between the planar state and the focal conic state. When the liquid crystal is in the planar state, light of a wavelength $\lambda = P \cdot n$ is selectively reflected, where P is the helical pitch of the cholesteric liquid crystal and n is the average refractive index of the liquid crystal. In the focal conic state, when the selective reflection wavelength of the cholesteric liquid crystal is in the infrared region, the liquid crystal scatters visible light, and when the selective reflection wavelength is shorter than the infrared region, the liquid crystal transmits visible light. Therefore, by setting the selective reflection wavelength in the visible region and providing the light absorbing layer on the side opposite to the viewing side of the device, display of a selectively reflected color can be performed in the planar state and display of black can be performed in the focal conic state. Moreover, by setting the selective reflection wavelength in the infrared region and providing the light absorbing layer on the side opposite to the viewing side of the device, display of black can be performed in the planar state because the liquid crystal reflects light of wavelengths in the infrared region and transmits light of wavelengths in the visible region, and display of white can be performed in the focal conic state because the liquid crystal scatters light.

The liquid crystal display device 1100 comprising a lamination of the display layers 1111R, 1111G and 1111B is capable of displaying red by having the blue display layer 1111B and the green display layer 1111G be in the transparent condition, in which the liquid crystal is in the focal conic alignment, and having the red display layer 1111R be in the selective reflection condition, in which the liquid crystal is in the planar alignment. Moreover, the liquid crystal display device 1100 is capable of displaying yellow by having the blue display layer 1111B be in the transparent condition, in which the liquid crystal is in the focal conic alignment, and having the green display layer 1111G and the red display layer 1111R be in the selective reflection condition, in which the liquid crystal is in the planar alignment. Likewise, the liquid crystal display device 1100 is capable of displaying red, green, blue, white, cyan, magenta, yellow and black by variously selecting the transparent condition or the selective reflection condition as the condition of each display layer. Further, by selecting intermediate selective reflection conditions as the conditions of the display layers 1111R, 1111G and 1111B, display of neutral tints can be performed, so that the liquid crystal display device 1100 can be used as a full color display device.

A water-clear glass plate or a transparent resin film can be used as the transparent substrate 1112.

Transparent electrodes of ITO (indium tin oxide) can be used as the transparent electrodes 1113 and 1114. Metal electrodes of aluminum, silicon or the like, or photoconductive films of amorphous silicon, BSO (bismuth silicon oxide) or the like can also be used. For the transparent electrodes 1114 of the lowermost layer, black electrodes can be used so that the electrodes 1114 function also as a light absorber.

As the insulative film 1118, an inorganic film of silicon oxide or the like or an organic film of polyimide resin, epoxy resin or the like is preferably used so that the insulative film 1118 functions also as a gas barrier layer. The insulative film 1118 prevents a short circuit between the substrates 1112 and improves the reliability of the liquid crystal. For the alignment control film 1119, polyimide is typically used.

As the liquid crystal 1116, one that exhibits the cholesteric phase at room temperature is desirable, and chiral nematic liquid crystal obtained by adding chiral dopant to nematic liquid crystal is particularly suitable.

The chiral dopant is an additive agent that twists the molecules of nematic liquid crystal when added to nematic liquid crystal. By adding the chiral dopant to nematic liquid crystal, a helical structure of liquid crystal molecules having predetermined twist intervals is generated, so that the liquid crystal exhibits the cholesteric phase.

The chiral nematic liquid crystal has an advantage that the pitch of the helical structure can be varied by varying the amount of addition of the chiral dopant and this enables control of the selective reflection wavelength of the liquid crystal. Generally, as the term representative of the pitch of the helical structure of liquid crystal molecules, "helical pitch" is used that is defined as the inter-molecule distance when the liquid crystal molecules are rotated 360° along the helical structure of the liquid crystal molecules.

As the material for the resin pillars 1115, for example, thermoplastic resin can be used. It is desired for the material to soften by heating, harden by cooling, not to chemically react with the liquid crystal material used and to have an appropriate elasticity.

Figure 8:
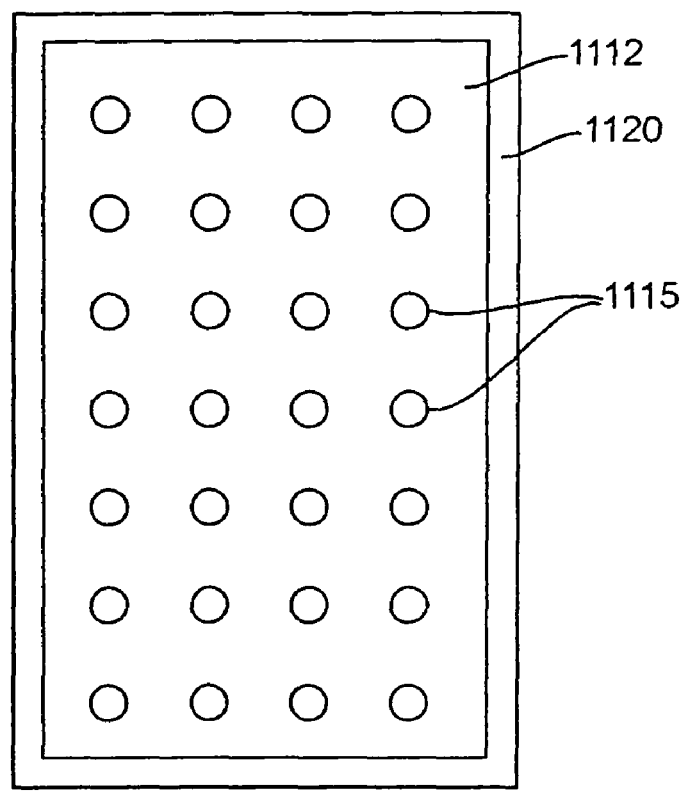
FIG. 8 is a plan view showing a condition where pillars and a sealing member are formed on a film substrate of the liquid crystal display device.

The resin pillars 1115 are formed by printing the material so that dot pillars are formed as shown in FIG. 8 by use of a pattern by a known printing method. The cross-sectional size, the pitch and the shape (cylindrical, drum-shaped, polygonal or the like) are selected according to the size and the pixel resolution of the liquid crystal display device 1100. Moreover, it is preferable to dispose the resin pillars 1115 between the transparent electrodes 1113 with higher priority, because the aperture efficiency improves.

As the spacers 1117, particles made of a hard material that is not deformed by heating or pressurization are desirable. For example, synthetic spherical particles of an inorganic material such as micromachined glass fibers, spherical silica glass or alumina powder, or an organic material such as a divinylbenzene cross-linked polymer or a polystyrene cross-linked polymer can be used.

As described above, by providing the hard spacers 1117 that maintain the gap between the two transparent substrates 1112 in a predetermined size and the resin pillars 1115 that are arranged within the display area according to a predetermined rule to support and bond the pair of transparent substrates 1112 and whose main component is a thermoplastic polymeric material, the transparent substrates 1112 can be firmly supported over the entire areas thereof, no nonuniformity is caused in the arrangement and generation of bubbles can be suppressed in low temperature environments. The spacers 1117 are not always necessary.

Now, an example of manufacture of the liquid crystal display device 1100 will be briefly described.

First, a plurality of belt-shaped transparent electrodes are formed on each of the two transparent substrates. The transparent electrodes are formed by forming an ITO film on each substrate by a method such as sputtering and then, performing patterning by photolithography.

Then, the transparent insulative film and the alignment control film are formed on the transparent electrode formed surface of each substrate. The insulative film and the alignment control film can be formed by use of an inorganic material such as silicon oxide or an organic material such as polyimide resin by a known method such as sputtering, spin coating or roll coating. Normally, rubbing is not performed on the alignment control film. Although the fundamental principle of operation of the alignment control film has not been clarified yet, it is considered that the presence of the alignment control film provides the liquid crystal molecules with a certain degree of anchoring effect, and the characteristics of the liquid crystal display device can be prevented from varying with time. Moreover, the color purity and the contrast may be increased by providing these thin films with functions as color filters, for example, by adding coloring matters.

As described above, the pillars are formed on the electrode formed surface of one substrate where the transparent electrodes, the insulative film and the alignment control film are provided. The pillars can be formed by a printing method in which a paste-form resin material comprising resin dissolved in a solvent is extruded by a squeegee through a screen plate or a metal mask and printed onto the substrate placed on a plate, by a method in which a resin material is discharged from a nozzle onto a substrate to perform formation such as the dispenser method or the ink jet method, or by a transfer method in which a resin material is supplied onto a plate or a roller and is then transferred onto the surface of the substrate. It is desirable that the height of the pillars at the time of formation be larger than the desired thickness of the liquid crystal layer.

On the electrode formed surface of the other substrate, the sealing member is formed by use of an ultraviolet-curing resin, a thermosetting resin or the like. The sealing member is provided in a ring form continuous around the perimeter of the substrate. Like the pillars, the sealing member is formed by the method in which resin is discharged from a nozzle onto a substrate to perform formation such as the dispenser method or the ink jet method, the printing method using a screen plate or a metal mask, or the transfer method in which resin is supplied onto a plate or a roller and is then transferred onto the transparent substrates. Further, spacers are sprayed onto the surface of at least one substrate by a known method.

Figure 9:
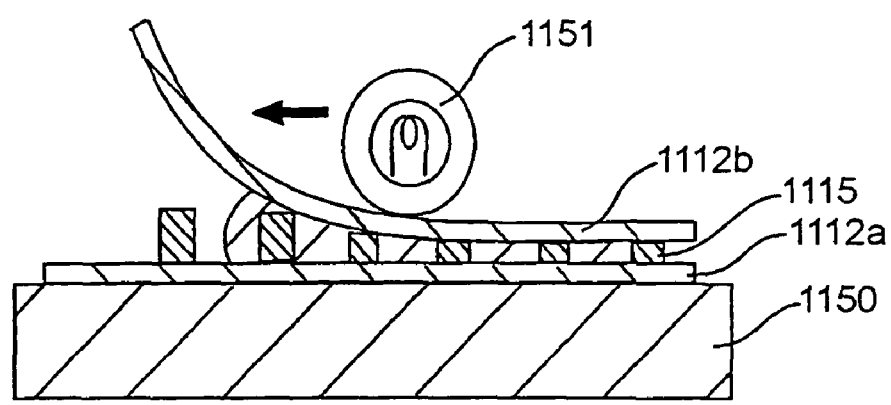
FIG. 9 is an explanatory view showing a manufacture process of the liquid crystal display device.

Then, these substrates are placed one on the other so that the electrode formed surfaces are opposed to each other, and are heated while pressurized from both sides. The pressurization and heating can be performed, for example, in the following manner. As shown in FIG. 9, a transparent substrate 1112a on which the pillars 1115 are formed is placed on a plate 1150, and an opposing transparent substrate 1112b is placed on the transparent substrate 1112a. The transparent substrates 1112a and 1112b are passed between a heating and pressurizing roller 1151 and the plate 1150 while heated and pressurized from one end by the heating and pressurizing roller 1151. By using this method, the cell can be accurately formed even when a flexible substrate having flexibility such as a film substrate is used. When the pillars are formed of a thermoplastic polymeric material, by softening the pillars by heating and hardening them by cooling, the substrates can be bonded by the pillars. When a thermosetting resin material is used for the sealing member, the sealing member is hardened by the heating performed when the substrates are placed one on the other.

In this placement process, the liquid crystal material is dripped onto one substrate, and at the same time when the substrates are place one on the other, the liquid crystal material is filled into the liquid crystal device. In this case, the spacers are previously mixed into the liquid crystal material, and the mixture is dripped onto the belt-shaped electrode formed surface of at least one substrate.

By dripping the liquid crystal material on an end of a substrate and spreading the liquid crystal material to the other end while the substrates are placed one on the other with the roller, the liquid crystal material can be filled into the entire area of the substrates. By doing this, the possibility that bubbles generated when the substrates are placed one on the other are rolled into the liquid crystal material can be reduced.

Then, after the pressurization of the substrates is continued until the temperature of the substrates decreases to at least not more than the softening temperature of the resin material of which the pillars are formed, the pressurization is stopped. Then, when a photo-setting resin material is used for the sealing member, light is applied to harden the sealing member.

The liquid crystal material is changed to one having a different selective reflection wavelength by the same procedure, and cells for blue display, green display and red display are formed. The cells thus formed are laminated in three layers and bonded by an adhesive, and a light absorbing layer is provided in the lowermost layer to form a full color liquid crystal display device.

Figure 10:
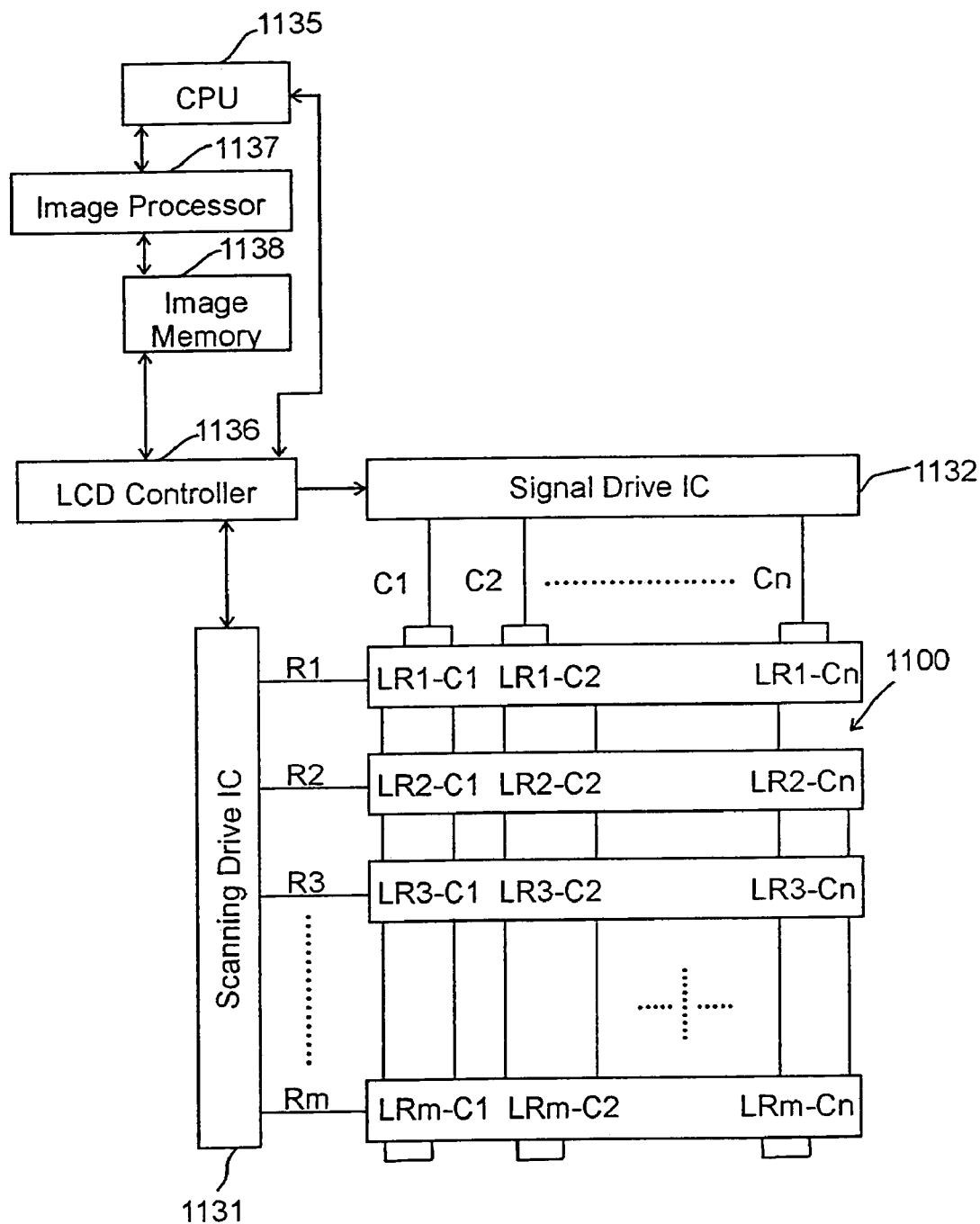
FIG. 10 is a block diagram showing a drive circuit of the liquid crystal display device.

The pixel structure of the liquid crystal display device 1100 is represented, as shown in FIG. 10, as a matrix of a plurality of scanning electrodes R1, R2 to Rm and signal electrodes C1, C2 to Cn (n, m are natural numbers). The scanning electrodes R1, R2 to Rm are connected to output terminals of the scanning drive IC 1131, and the signal electrodes C1, C2 to Cn are connected to output terminals of the signal drive IC 1132.

The scanning drive IC 1131 outputs a selection signal to a predetermined one of the scanning electrodes R1, R2 to Rm to bring the electrode to a selected state, and outputs a non-selection signal to the other electrodes to bring them to a non-selected state. The scanning drive IC 1131 successively applies the selection signal to the scanning electrodes R1, R2 to Rm while switching the electrode at predetermined time intervals. The signal drive IC 1132 outputs a signal corresponding to the image data to the signal electrodes C1, C2 to Cn at the same time in order to rewrite the pixels on the scanning electrodes R1, R2 to Rm in the selected state. For example, when the scanning electrode Ra is selected (a is a natural number satisfying a≦m), the pixels LRa-C1 to LRa-Cn at the points of intersection of the scanning electrode Ra and the signal electrodes C1, C2 to Cn are simultaneously rewritten. Consequently, the voltage difference between the scanning electrode and the signal electrode at each pixel is the pixel rewriting voltage, and each pixels is rewritten in accordance with the rewriting voltage.

The drive circuit comprises a central processing unit 1135, an LCD controller 1136, an image processor 1137, an image memory 1138 and the drive ICs 1131 and 1132. Based on the image data stored in the image memory 1138, the LCD controller 1136 controls the drive ICs 1131 and 1132 and successively applies a voltage between the scanning electrodes and the signal electrodes of the liquid crystal display device 1100 to write an image onto the liquid crystal display device 1100.

When a first threshold voltage for undoing the twist of the liquid crystal exhibiting the cholesteric phase is Vth1, the liquid crystal is brought to the planar state by decreasing the voltage to not more than a second threshold voltage Vth2 lower than the first threshold voltage Vth1 after the voltage Vth1 is applied for a sufficient time. The liquid crystal is brought to the focal conic state by applying a voltage not less than Vth2 and not more than Vth1 for a sufficient time. The two states are kept stable even after the voltage application is stopped. By applying an intermediate voltage between Vth1 and Vth2, display of neutral tints, that is, display of gradations can be performed.

When the pixels are partially rewritten, only specific scanning lines are successively selected so that the part to be rewritten is included. Consequently, rewriting of only a necessary part can be performed for a short time.

Although the pixels can be rewritten by the above-described method, when an image is already displayed, in order to remove the influence of the image, it is desirable to reset all the pixels to the same display state before rewriting. The reset of the pixels may be performed for all the pixels at the same time or may be performed for each scanning electrode. For example, it has been found that when the pixels are reset to the focal conic state, a comparatively long time is required so that a sufficient transparent state is obtained. Therefore, it is preferable to reset all the pixels to the focal conic state at the same time before rewriting, because the time required for rewriting is shorter than in the case where the pixels are reset for each scanning electrode.

When the pixels are partially rewritten, the reset is performed for each scanning line or only the pixels between specific scanning lines including the part to be rewritten are reset at the same time.

In the description of the liquid crystal display device 1100 given above, a device structure in which the resin pillars are included in the liquid crystal display layers is described. This structure is particularly useful because it has various excellent characteristics such that a liquid crystal display device being lightweight and excellent in display characteristics can be formed by use of a film substrate, that size increase is easy, that the drive voltage is comparatively low and that resistance to shocks is high.

However, the liquid crystal having memory capability is not limited to this structure; the liquid crystal display layer may be formed as a so-called polymer dispersed liquid crystal composite film in which liquid crystal is dispersed into a known three-dimensional network structure of a polymer or in which a three-dimensional network structure of a polymer is formed in the liquid crystal. Moreover, while bistable liquid crystal exhibiting the cholesteric phase is used as an example of the liquid crystal having memory capability, the liquid crystal is not limited thereto; a different kind of liquid crystal having memory capability, for example, ferroelectric polymeric liquid crystal or ferroelectric liquid crystal may be used.

Figure 11:
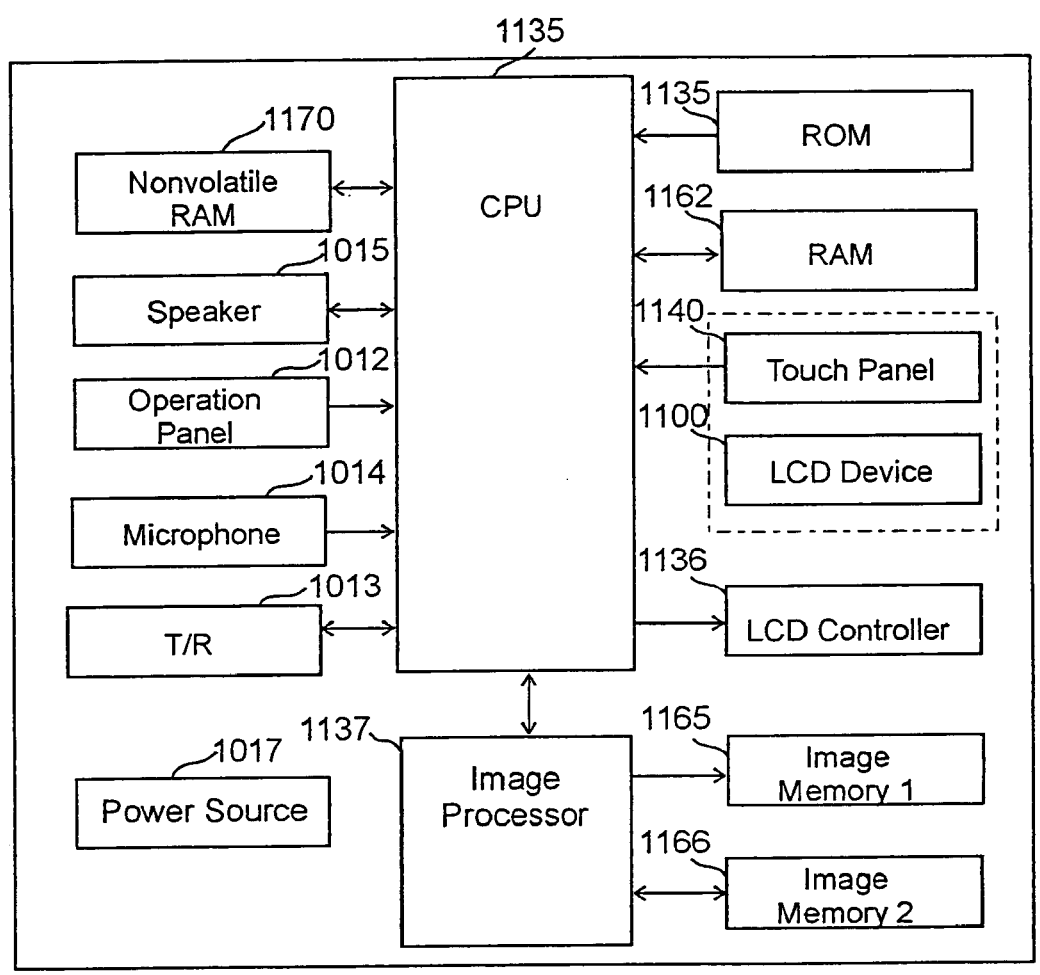
FIG. 11 is a block diagram showing a control portion of the portable telephone.

Control Portion of Portable Telephone, Referring to FIG. 11

FIG. 11 shows a control portion of the portable telephone 1003 including the drive circuit. The control portion is driven by a battery 1017 serving as the power source. The central processing unit 1135 is provided with a ROM 1161 and a RAM 1162, performs signal transmission and reception with the transmitter/receiver 1013, receives signals from the operation panel 1012 and a microphone 1014, and outputs sound signals to a speaker 1015. The image processor 1137 is provided with an image memory 1165 for storing therein image information for providing display in the data display area 1011a, an image memory 1166 for storing therein image information for providing display in the advertisement display area 1011b and the above-described nonvolatile RAM 1170 for storing therein information on the presence or absence of application of a discount service.

Figure 12:
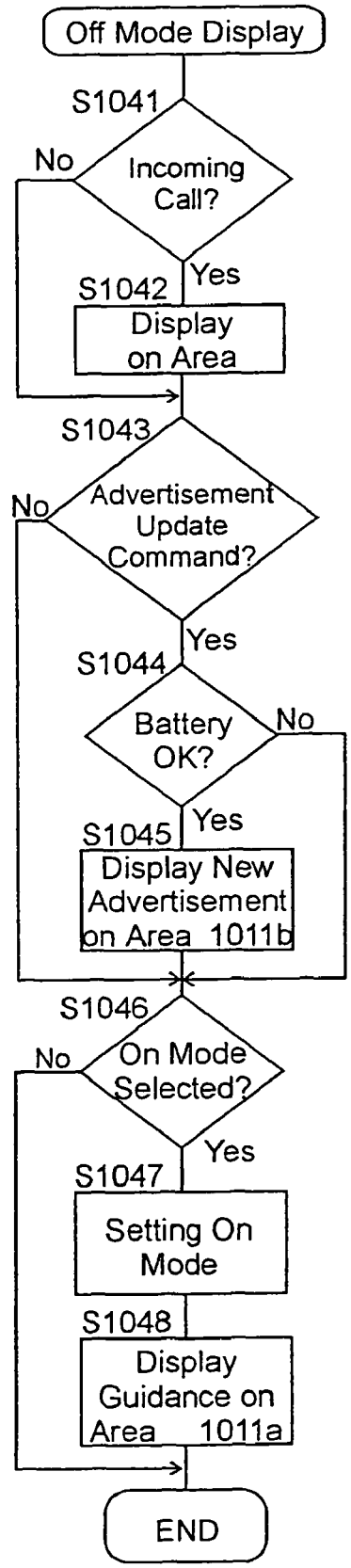
FIG. 12 is a flowchart showing a control procedure performed when the portable telephone is in an OFF mode.
Figure 13:
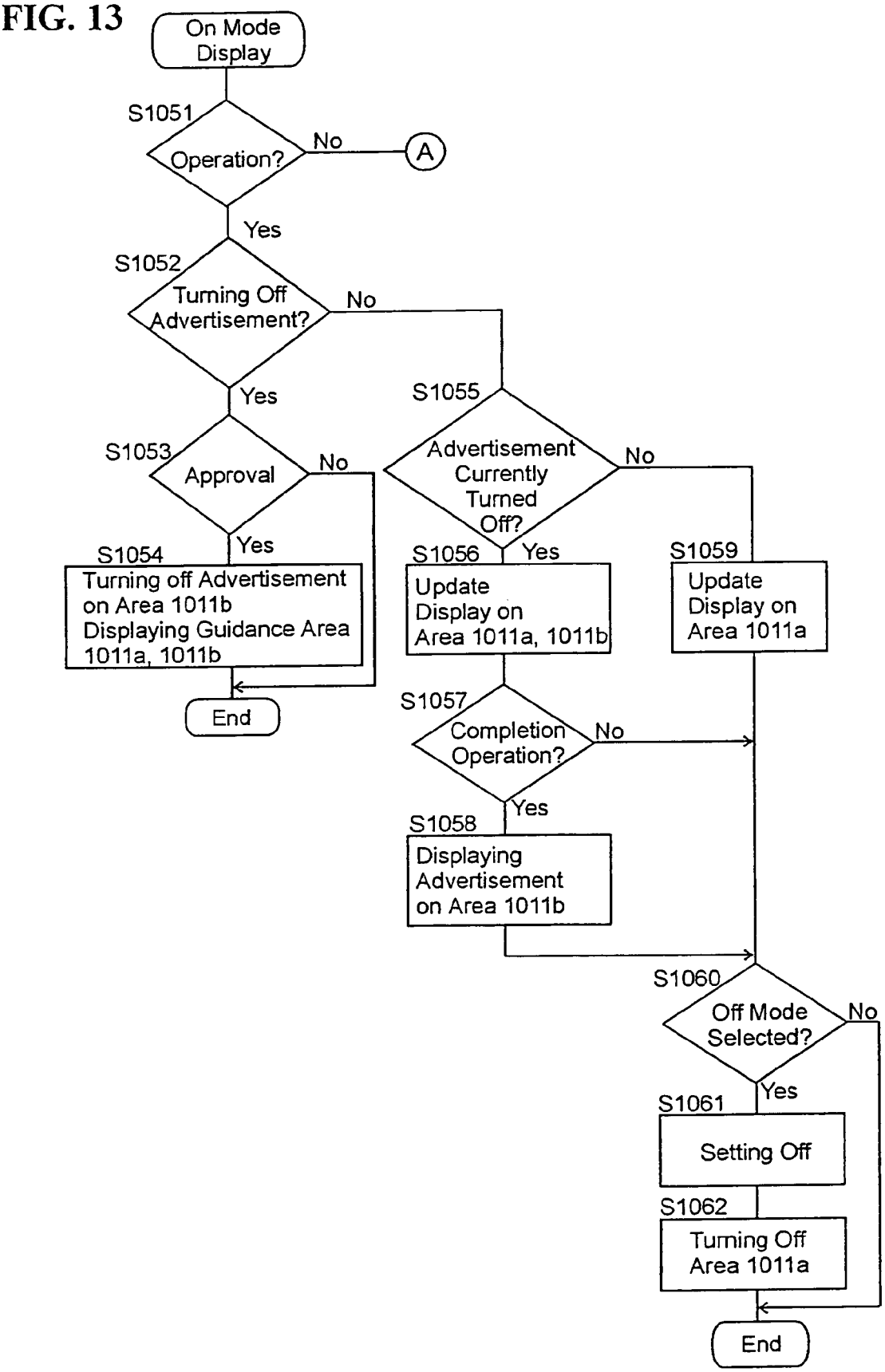
FIG. 13 is a flowchart showing a control procedure performed when the portable telephone is in an ON mode.
Figure 14:
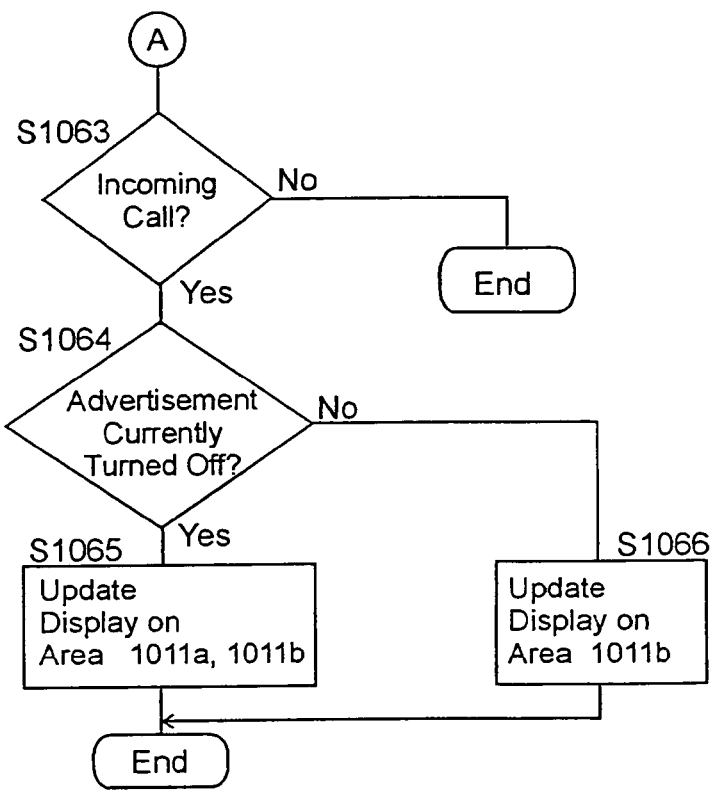
FIG. 14 is a flowchart showing the control procedure performed when the portable telephone is in the ON mode, continued from FIG. 13.

Display Control, Referring to FIGS. 12 to 14

Next, an example of the display control of the portable telephone 1003 comprising the following structure will be described with reference to flowcharts.

First, the display control performed when the portable telephone 1003 is in the OFF mode will be described with reference to FIG. 12.

The transmitter/receiver 1013 is activated to check the presence or absence of an incoming call every predetermined time (for example, every hour) even when the portable telephone 1003 is in the OFF mode. When there is an incoming call (YES of step S1041), the incoming call data is displayed on the display area 1011a (step S1042). To display the incoming call data, for example, the total number of incoming calls in the OFF mode is displayed or the call arrival time and the like are displayed in a list form every time a call arrives.

When a command to update the advertisement is provided (YES of step S1043), after checking that enough power is left in the power source (YES of step S1044), a new advertisement is displayed in the advertisement display area 1011b (step S1045). By updating the advertisement after checking the power left in the power source, faulty transmission and faulty reception of calls and mails because of the advertisement can be avoided, so that the user's operability can be secured.

It is desirable to use information sent from the host apparatus 1001 as the advertisement information because the latest information can be displayed. In this case, advertisement information may be sent from the host apparatus 1001 every time an advertisement update command is provided, or a plurality of advertisement data may be sent from the host apparatus 1001 at the same time and temporarily stored in the RAM 1162 in the portable telephone 1003 so that the advertisement data are successively read out from the RAM 1162 in response to advertisement update commands.

When the ON mode is selected by an operation of the power key or the like (YES of step S1046), ON mode setting such as activation of the transmitter/receiver 1013 is performed (step S1047), and a guidance screen is displayed in the advertisement display area 1011a (step S1048).

Next, the display control performed when the portable telephone 1003 is in the ON mode will be described with reference to FIGS. 13 and 14.

When there is an operation of an operation key (YES of step S1051), it is determined whether or not the operation is an instruction to temporarily turn off the advertisement by the display mode change key or the like (step S1052). When a usage charge discount service that allows the advertisement to be temporarily turned off is registered and information on this is previously set in the nonvolatile RAM 1170, after it is checked that the advertisement has not already been temporarily turned off (YES of step S1053), the advertisement in the display area 1011b is turned off, and the guidance and data are displayed in the whole of the display areas 1011a and 1011b (step S1054). This is convenient for checking the text of the electronic mail and the like because the apparatus can be operated on a large screen.

When there is an operation of a different key (NO of step S1052), display is provided on the display panel 1011 in accordance with the operation. At this time, when the advertisement is currently turned off, that is, when the size of the guidance and data display area 1011a is enlarged (YES of step S1055), the guidance and data display is updated by use of the whole of the display areas 1011a and 1011b (step S1056). When the advertisement is displayed (NO of step S1055), the guidance and data display is updated by use of only the display area 1011a (step S1059).

When the advertisement is temporarily turned off, after completion of the operation is checked based on a reason such that no key operation is performed within a predetermined time of the last key operation (YES of step S1057), the advertisement display is resumed in the display area 1011b (step S1058). Since the advertisement display is resumed when the operation is completed even though the advertisement display is turned off at the time of operation as described above, a problem can be avoided that although a discount service is received in compensation for the advertisement display, the advertisement is not correctly displayed to weaken the effect of the advertisement.

Thereafter, when the OFF mode is selected (YES of step S1060), OFF mode setting such as deactivation of the transmitter/receiver 1013 is performed (step S1061), and the display in the data display area 1011a is turned off (step S1062).

When there is an incoming call (NO of step S1051, YES of step S1063), the display is updated in accordance with the incoming call. In this case, like the above-described case of key operation, the display update range is changed according to whether the advertisement is currently displayed or not. That is, when the advertisement is temporarily turned off (YES of step S1064), the guidance and data display is updated in the whole of the display areas 1011a and 1011b (step S1065), and when the advertisement is displayed (NO of step S1064), the guidance and data display is updated in the display area 1011a (step S1066).

Basically, the rewriting in the display areas 1011a and 1011b is performed partially. However, when the display in one area is updated, the image data corresponding to the currently displayed information may be again written into the other area. For example, when the display in the area 1011a is updated, information the same as the currently displayed information may be again written into the area 1011b. By doing this, even if the display is disturbed, for example, by the user strongly pressing the display panel 1011, the disturbance is corrected, so that the display becomes easy to visually recognize.

Moreover, the following additional steps can also be performed: completion of the advertisement display is confirmed every time an advertisement display is provided on the display panel 1011; information indicating that the advertisement display is correctly performed is sent to the host apparatus 1001 based on the confirmation information; and the discount processing is corrected based on the information.

Second Embodiment, Referring to FIGS. 15 to 18

Figure 15:
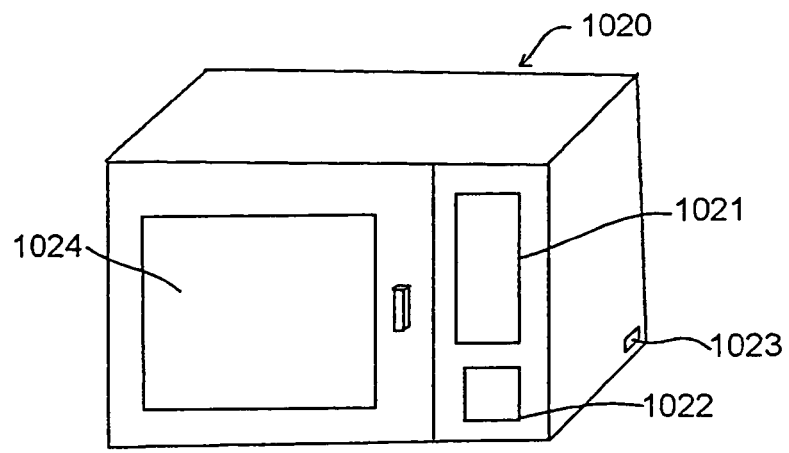
FIG. 15 is a perspective view showing a microwave oven according to a second embodiment of the present invention.

In the second embodiment, an example is shown in which the present invention is applied to a microwave oven. In the microwave oven 1020, while the function as a microwave oven is similar to the conventional one, a display panel 1022 is set below an operation panel 1021 as shown in FIG. 15. The display panel 1022 comprises the above-described liquid crystal display device 1100 having memory capability and the touch panel 1140.

The microwave oven 1020 is connected to the commercial power source, and unlike apparatuses operating on batteries, there is no possibility that the operation of the apparatus is disabled by updating the display on the display panel 1022, so that the advertisement display can be updated at any given times.

Figure 17:
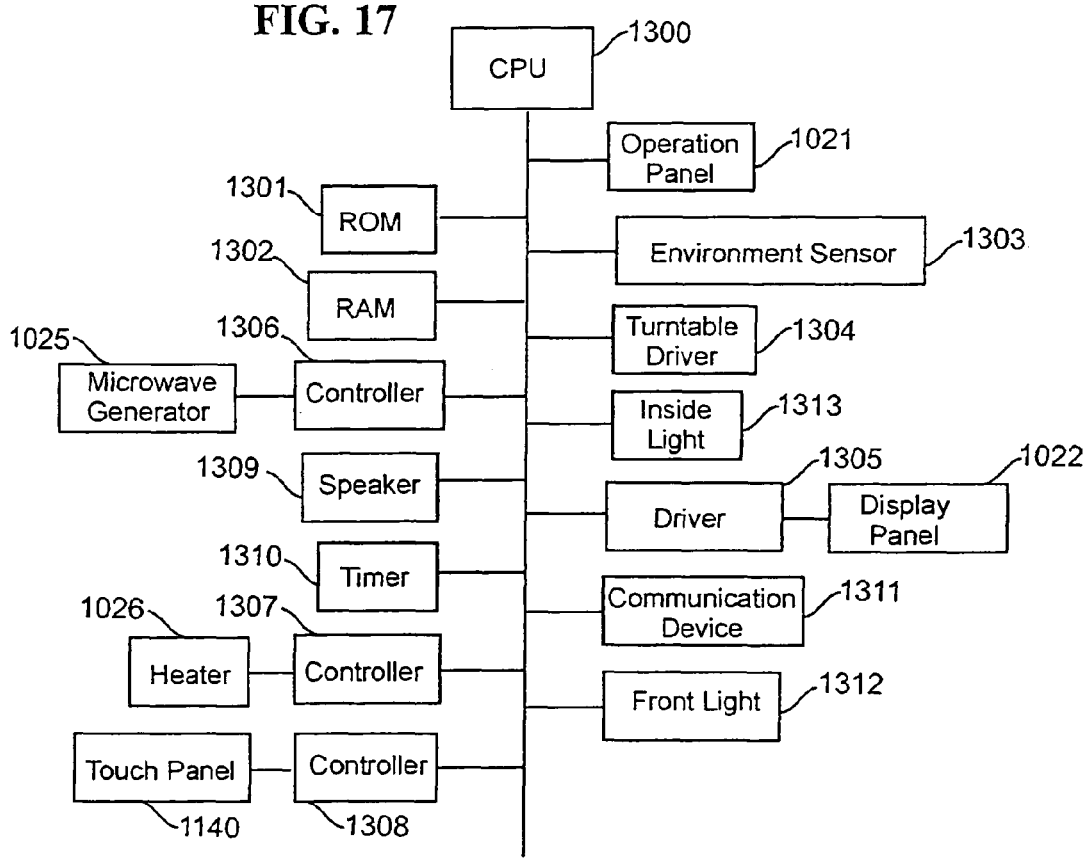
FIG. 17 is a block diagram showing a control portion of the microwave oven.

As shown in FIG. 17, the control portion of the microwave oven 1020 is formed with a CPU 1300 as the main element. The CPU 1300 includes a ROM 1301 for storing various programs and data therein and a RAM 1302 for storing various data therein, and receives signals from the operation panel 1021 including operation keys for performing cooking condition setting and the like and an environment sensor 1303 for sensing the inside temperature and humidity of the oven and the like. Moreover, the control portion is provided with: a drive portion 1304 for driving the turntable disposed inside the oven; a drive portion 1305 for driving the display panel 1022; a controller 1306 for a microwave generating mechanism 1025; a controller 1307 for a heater (oven) 1026; and a controller 1308 for the touch panel 1140 placed over the display panel 1022. Further, the following are connected: a speaker 1309 for providing a cooking end message and various guidance messages by a voice or an alarm sound; a timer 1310 for measuring the cooking time and the like; a communication device 1311; a front light 1312 for illuminating the display panel 1022, for example, when it is dark; and an inside light 1313.

The microwave oven 1020 is in a standby state at all times so that the presence or absence of a key operation and the kind of the key operation are recognized at all times. In the standby state, power consumption is cut back, for example, by bringing the CPU 1300 to a sleep state. The CPU 1300 is activated by an operation of an operation key.

Figure 16A:
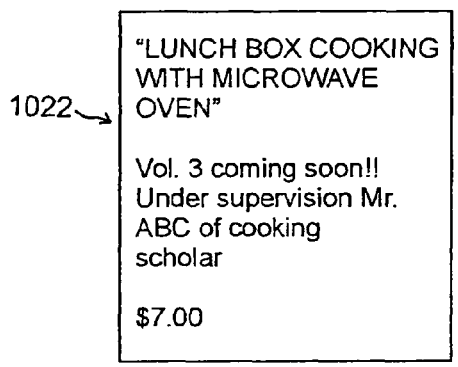
FIGS. 16A and 16B are explanatory views showing example displays provided on a display panel of the microwave oven.
Figure 16B:
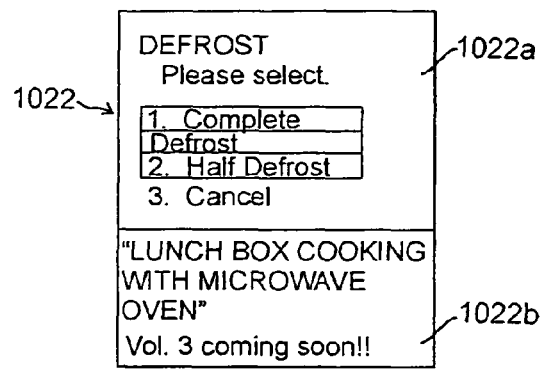

The microwave oven 1020 is connected to a communication line such as the telephone line through a connector 1023, and advertisement information sent from a (non-illustrated) host apparatus is displayed on the display panel 1022. When the microwave oven 1020 is not used, an advertisement display as shown in FIG. 16A is provided. When the microwave oven 1020 is used, the display panel 1022 is divided into an operation information display area 1022a and an advertisement display area 1022b as shown in FIG. 16B. In FIG. 16B, an example is shown in which thawing information is displayed in the operation information display area 1022a and the user is prompted to select from among menu items "1," "2" and "3."

When the operation panel 1021 is operated, an advertisement is displayed in the area 1022b while being updated every predetermined time for a predetermined period of time from the operation. When cooking is not being performed and a predetermined time has elapsed since the operation of the operation panel 1021, the advertisement is displayed in the entire area of the display panel 1022. The contents of the display are updated as necessary.

The advertisement may be updated in accordance with opening and closing of a door 1024 as well as the operation of the operation panel 1021.

Figure 18:
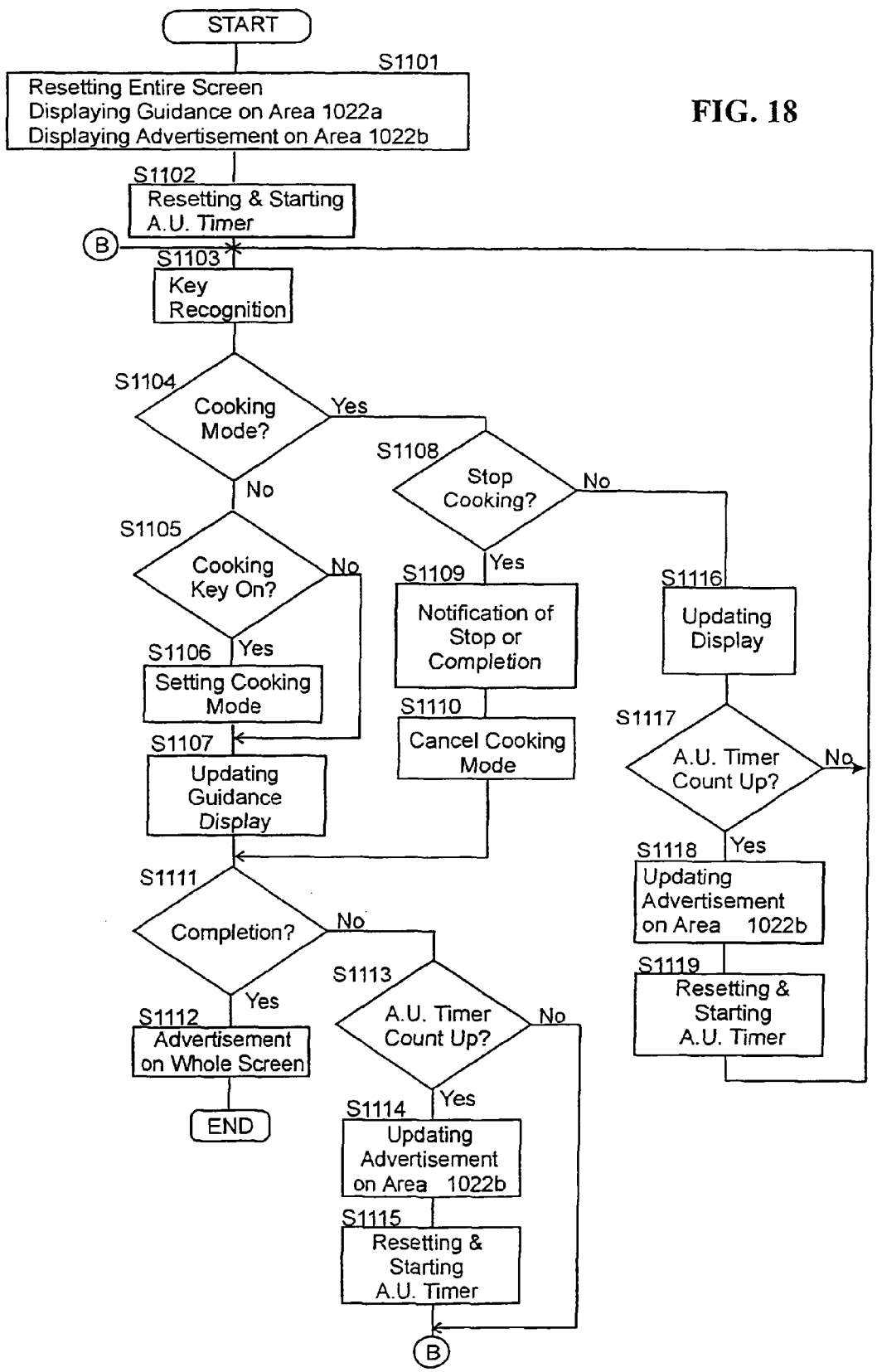
FIG. 18 is a flowchart showing a control procedure of the microwave oven.

Next, an example of the display control of the microwave oven 1020 having the above-described structure will be described with reference to the flowchart of FIG. 18.

When there is a key operation, the entire screen of the display panel 1022 is reset, a guidance display is provided in the operation information display area 1022a, and an advertisement display is provided in the display area 1022b (step S1101). For the advertisement, only a summary is displayed, or the whole of the advertisement is displayed scaled down. Then, an advertisement update timer for counting the advertisement update timing is reset and started (step S1102). Then, the kind of the operated key is recognized (step S1103).

Then, whether a cooking mode representing that cooking is being performed is set or not is determined. In the case where the cooking mode is not set (NO of step S1104), when it is determined that a cooking key is on (YES of step S1105), the cooking mode is set (step S1106). Then, the guidance display in the display area 1022a is updated in accordance with the key operation (step S1107).

In the case where the cooking mode is currently set (YES of step S1104), when an instruction to stop cooking is provided, for example, by completion of cooking or an operation of an operation key (YES of step S1108), this is displayed in the display area 1022a, and a voice or an alarm sound for notification of the stop or the completion of cooking is provided for a predetermined time (step S1109). Then, the cooking mode is canceled (step S1110).

When cooking is continued (NO of step S1108), the display in the display area 1022a is successively updated in accordance with the stage of cooking (step S1116). At this time, when the advertisement update timer has counted up (YES of step S1117), the advertisement in the display area 1022b is updated to different advertisement information (step S1118). Consequently, the advertisement is successively updated within a predetermined time of the user's key operation and during cooking. Since the user is highly likely to be in the vicinity of the microwave oven 1020 during cooking and immediately after a key operation, the user can recognize various pieces of advertisement information. Then, the advertisement update timer is reset and started again (step S1119), and the process returns to step S1103, so that the microwave oven 1020 is brought to a key input wait state.

When cooking is not being performed and a predetermined time has elapsed since the key input or when the predetermined time has elapsed since the completion of cooking without any key operation being performed, the user's operation is regarded as being completed (YES of step S1111), and an advertisement is displayed in the whole of the display areas 1022a and 1022b (step S1112). Thus, since advertisement display can be provided by use of the entire screen of the display panel 1022 when the microwave oven 1020 is not operated, the effect of the advertisement can be enhanced.

In the case where the input has not been completed (NO of step S1111), when the advertisement update timer has counted up (YES of step S113), the advertisement in the display area 1022b is updated to different advertisement information (step S1114), and the advertisement update timer is reset and started again (step S1115), so that the microwave oven 1020 is brought to the key input wait state.

As described in the first embodiment, a usage charge discount service, a purchase price discount service and the advertisement display may be combined into a system. Moreover, information on new recipes may be displayed as well as advertisement information.

The system described in the second embodiment is applicable not only to microwave ovens but also to household electric appliances such as fully automatic washing machines, tumble dryers, dishwashers, automatic bakers and futon dryers, and audio apparatuses. The system is particularly suitable for electronic apparatuses in which the operation is comparatively complicated and an operation guidance is necessary when an operation other than routine operations is performed.

Third Embodiment, Referring to FIGS. 19 to 22

Figure 19:
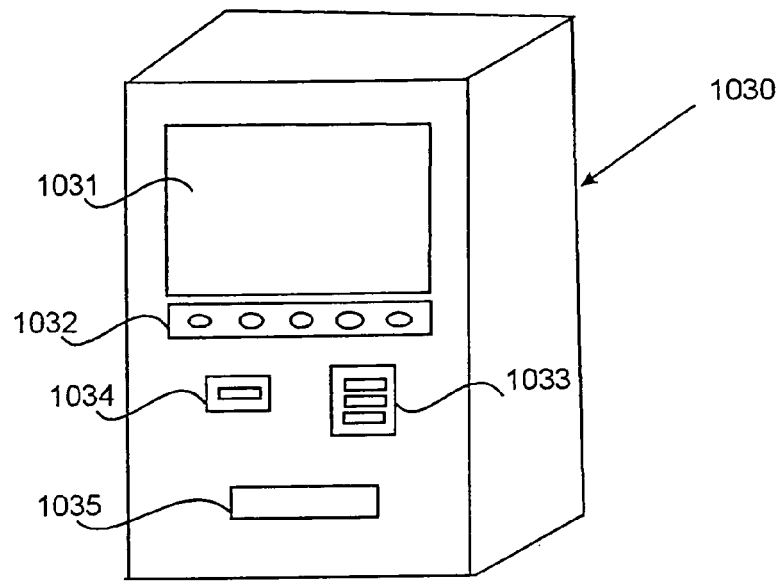
FIG. 19 is a perspective view showing a vending machine according to a third embodiment of the present invention.

In the third embodiment, an example is shown in which the present invention is applied to a vending machine. The vending machine 1030 sells electronic information by writing electronic information (contents) into a record medium, for example, a semiconductor memory such as a memory card, an optical disk or a magnetic disk. As shown in FIG. 19, the vending machine 1030 is provided with a display panel 1031 for displaying information such as an advertisement or an operation guidance, an operation panel 1032 where operation keys operated by the user are provided, a record medium slot 1033, a cash and prepaid card slot 1034, and a mouth 1035 for taking out a record medium or change. The display panel 1031 comprises the liquid crystal display device 1100 having memory capability and the touch panel 1140.

Figure 20A:
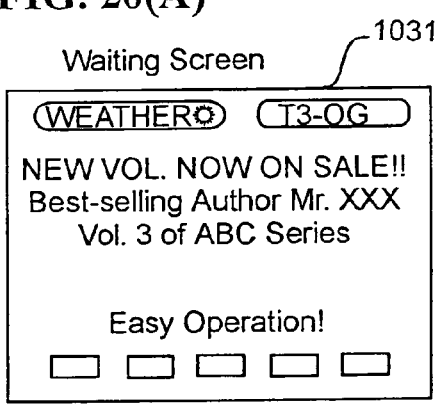
FIGS. 20A and 20B are explanatory views showing example displays provided on a display panel of the vending machine.
Figure 20B:
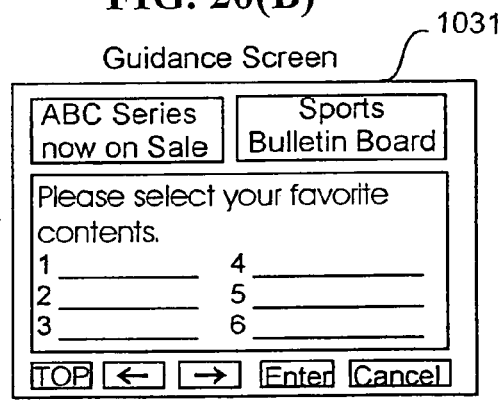

The display on the display panel 1031 is switchable, for example, between a standby screen where topic information such as an advertisement as to new contents and guidance of operation keys are displayed as shown in FIG. 20A and a guidance screen as shown in FIG. 20B used when the user operates the vending machine 1030. On the guidance screen, an operation instruction message is displayed in addition to the operation key guidance. Moreover, topic information such as an advertisement or an up-to-the-minute news is displayed being scaled down.

Figure 21:
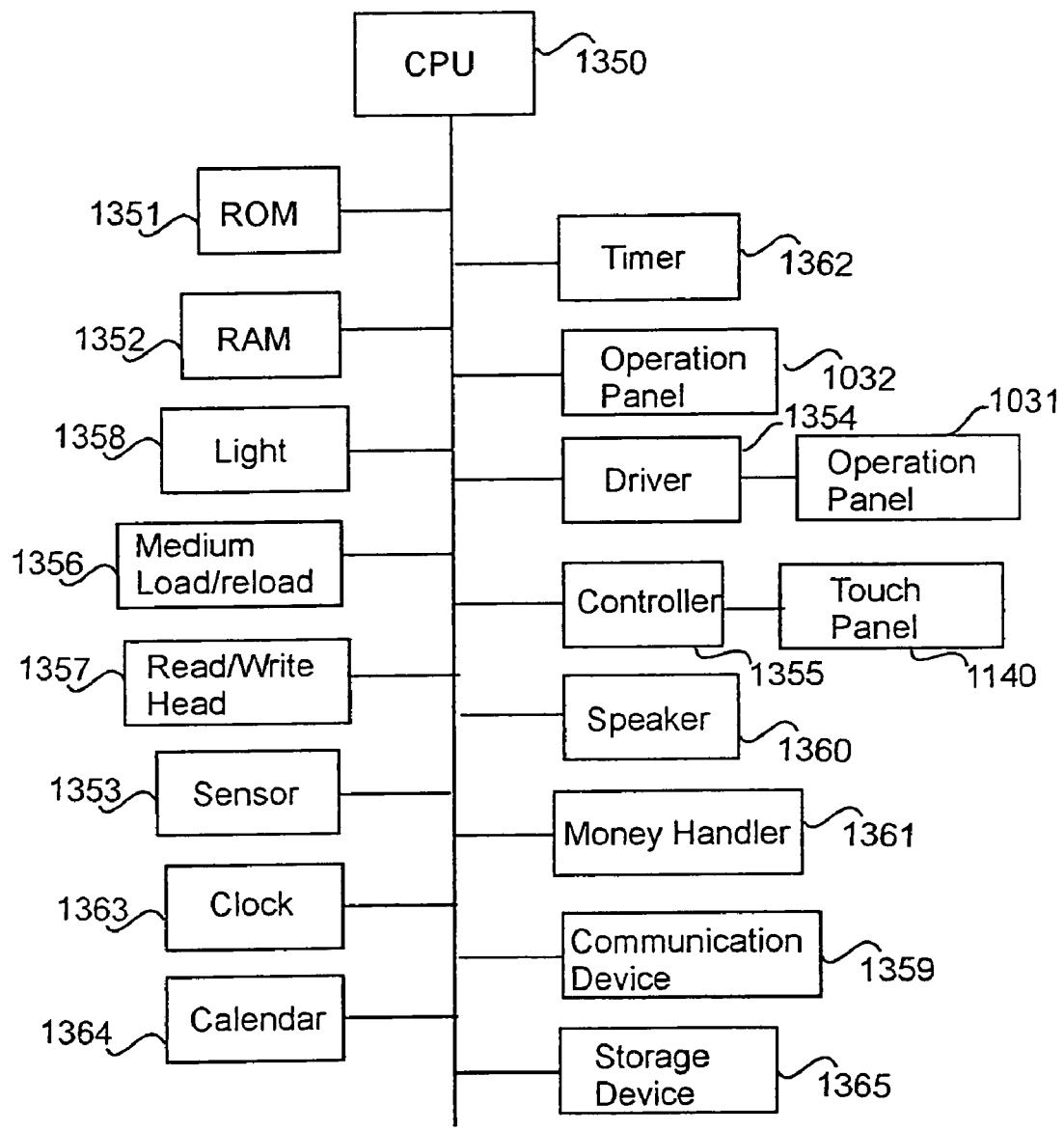
FIG. 21 is a block diagram showing a control portion of the vending machine.

As shown in FIG. 21, the control portion of the vending machine 1030 is formed with a CPU 1350 as the main element. The CPU 1350 includes a ROM 1351 for storing various programs and data therein and a RAM 1352 for storing various data therein, and receives signals from the operation panel 1032 including operation keys and a person sensor 1353. Moreover, the control portion is provided with a drive portion 1354 for driving the display panel 1031 and a controller 1355 for the touch panel 1140 placed over the display panel 1031.

Further, the following are connected to the CPU 1350: a record medium loading and reloading mechanism 1356; a head 1357 for data reading from a record medium and data writing into a record medium; a light 1358 for illuminating the display panel 1031, for example, when it is dark; a communication device 1359 for performing communication with an external apparatus; a speaker 1360 for providing a message or the like by a voice; a money handler 1361; a timer 1362, a clock 1363 and a calendar 1364 used for an advertisement update schedule and the like; and a storage device 1365 for storing contents and the like therein.

Figure 22:
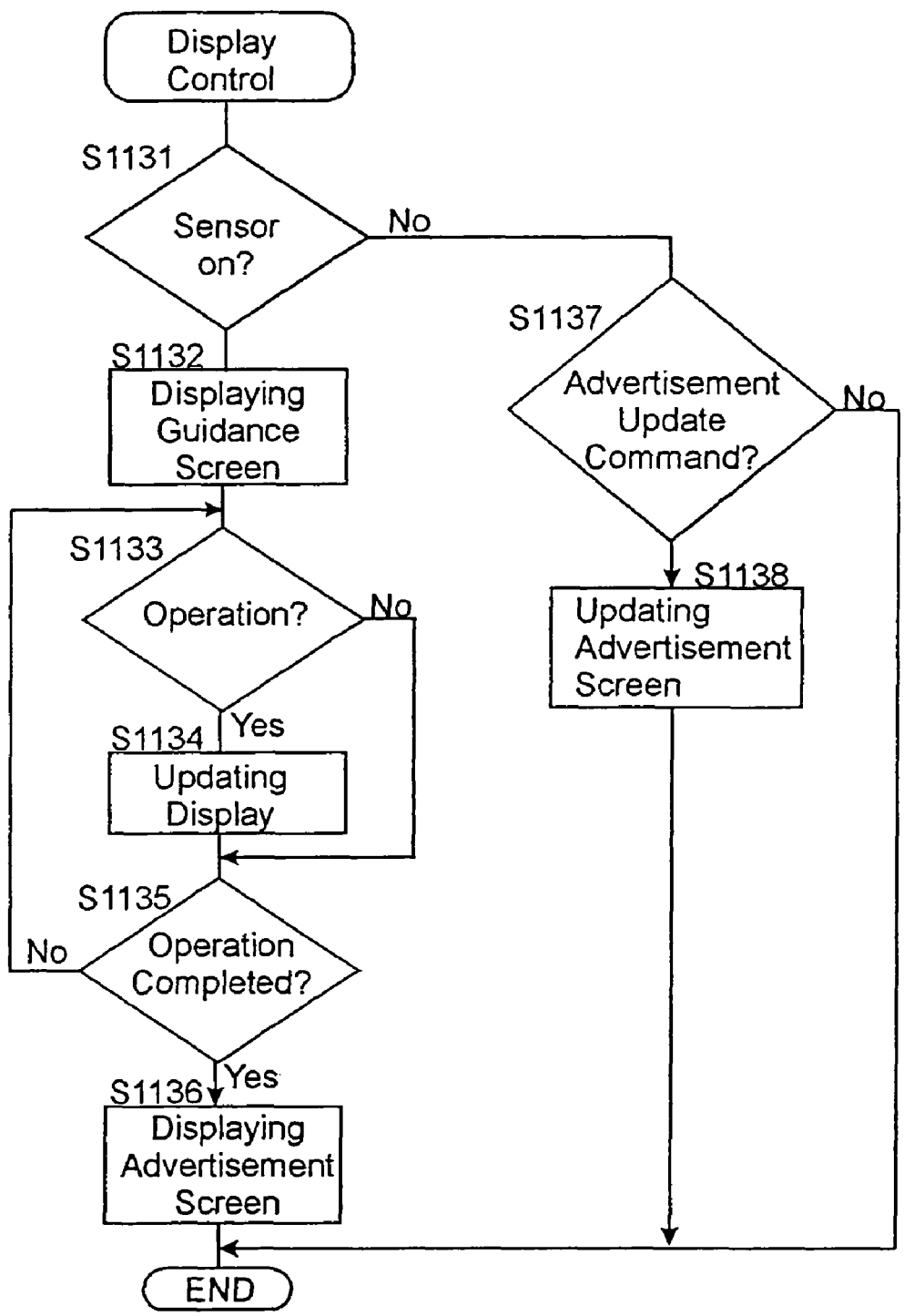
FIG. 22 is a flowchart showing a control procedure of the vending machine.

Next, an example of the display control of the vending machine 1030 having the above-described structure will be described with reference to the flowchart of FIG. 22. The advertisement information and the contents to be sold are sent from an external apparatus at appropriate times, and the vending machine 1030 receives them with the communication device 1359 and stores them in the storage device 1365.

When the person sensor 1353 detects a person (YES of step S1131), the screen display is changed from the standby screen to the guidance screen to display an operation guidance message, the contents and how to purchase the contents and the like (step S1132).

When there is a key operation, the display is updated in accordance with the operation, and this routine is repeated until the operation is finished (YES of step S1133, step S1134, NO of step S1135). When the operation is completed, the display on the display panel 1031 is returned to the advertisement screen (step S1136) to end the processing. In order to sufficiently show the user the advertisement display on the standby screen, the screen switching may be performed so that the switching to the guidance screen is not performed until there is a key operation.

In the ROM 1351, an advertisement update schedule is previously stored. The CPU 1350 provides an advertisement update command to the drive portion 1354 of the display panel 1031 according to the schedule based on the schedule information stored in the ROM 1351, the timer 1362, the clock 1363 and the calendar 1364 (YES of step S1137), and updates the advertisement screen to the next one stored in the storage device 1365 (step S1138).

As described above, application of the present invention to a vending machine produces advantages such that an advertisement effect on an indefinite number of people can be expected and that consumers can immediately buy advertised products on the spot.

The vending machine described in the third embodiment is applicable not only to vending machines of electronic information but also to vending machines of various articles (for example, beverages, food, cigarettes and everyday items). In the case of vending machines of articles, advertisement information may be stored in a storage medium such as a memory card so that a serviceperson updates the advertisement information by changing memory cards when replenishing the vending machine with articles. Moreover, the present invention is applicable not only to vending machines but also to apparatuses associated with store automation (SA) made available for public use such as ticket-vending machines, ATMs (automatic teller machines), automatic contracting machines, kiosk terminals and automatic service machines (for example, coin lockers, money changers and pachinko ball lending machines).

Fourth Embodiment, Referring to FIGS. 23 to 27

In the fourth embodiment, an example is shown in which the present invention is applied to a headphone stereo. The headphone stereo 1040 is battery-operated. Advertisement information and song information such as song titles are stored in an area of an optical disk 1045 which is a storage medium, and the headphone stereo 1040 obtains advertisement information and song information from the optical disk 1045. The storage medium is not limited to the optical disk 1045 but may be a magnetic disk, a magnetic tape or a memory card in which information is stored in a semiconductor memory. Moreover, a ROM chip in which advertisement information is stored in a storage medium may be added so that advertisement information is obtained from the ROM chip. Moreover, advertisement information may be obtained from a replacement part or a battery detachably attachable to the apparatus body as well as from a storage medium.

Figure 23:
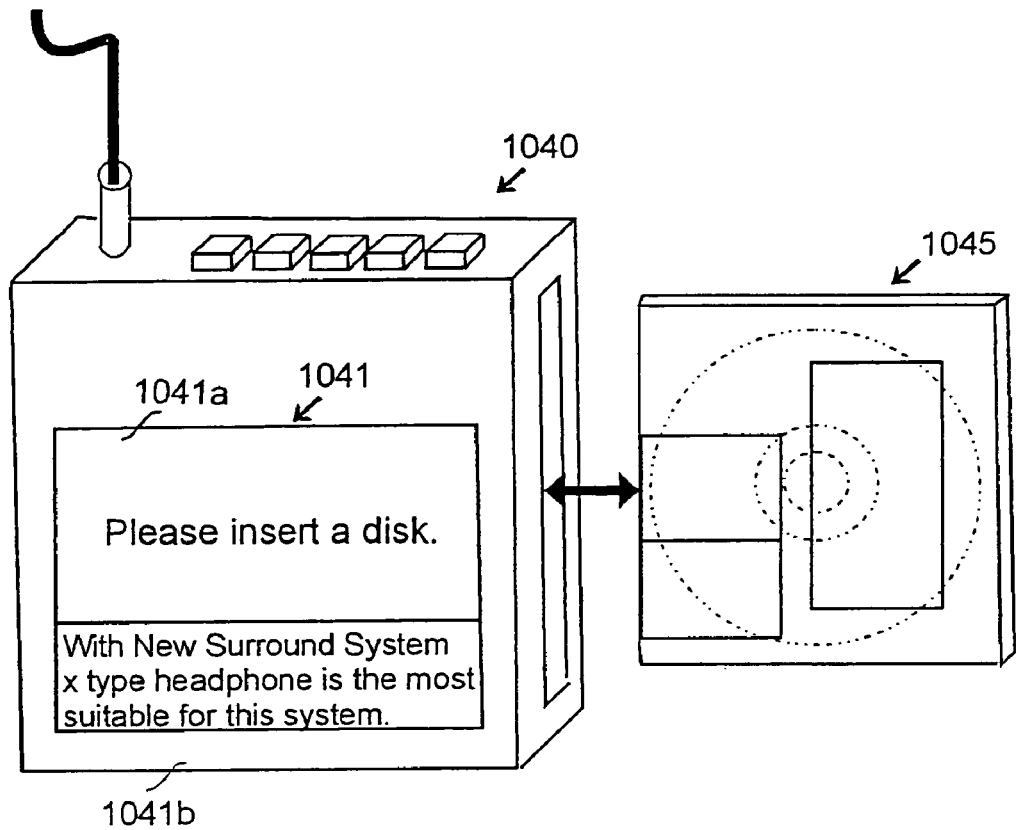
FIG. 23 is a perspective view showing a headphone stereo according to a fourth embodiment of the present invention.

Specifically, a display panel 1041 (comprising the above-described liquid crystal display device 1100) is set on the front surface of the headphone stereo 1040, and the display panel 1041 is divided into an information display area 1041a and an advertisement display area 1041b. When the optical disk 1045 is not inserted, as shown in FIG. 23, information associated with an operation of the headphone stereo 1040 such as a message indicating that the optical disk 1045 is not inserted is displayed in the area 1041a, and in the area 1041b, an advertisement obtained from the previously inserted optical disk is displayed in a no power supplied state.

Figure 24:
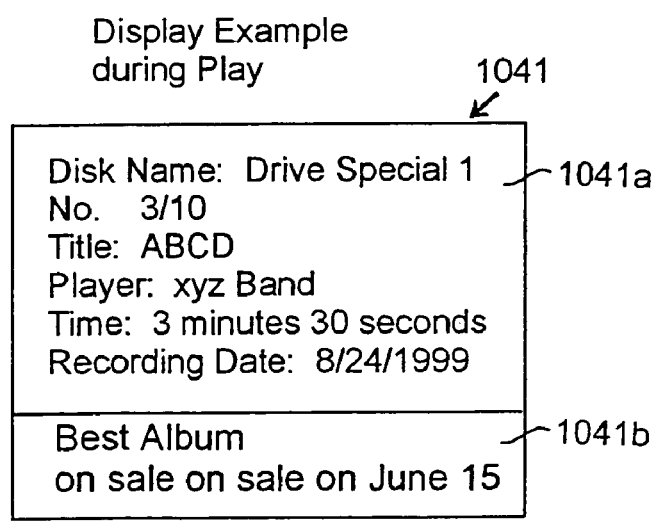
FIG. 24 is an explanatory view showing an example display on a display panel of the headphone stereo.

When the optical disk 1045 is inserted, as shown in FIG. 24, information on the contents obtained from the optical disk 1045 being inserted (for example, song information such as the disk name, the song title, the player, the playing time and the recording date) and an advertisement are displayed in the display areas 1041a and 1041b, respectively.

Figure 25:
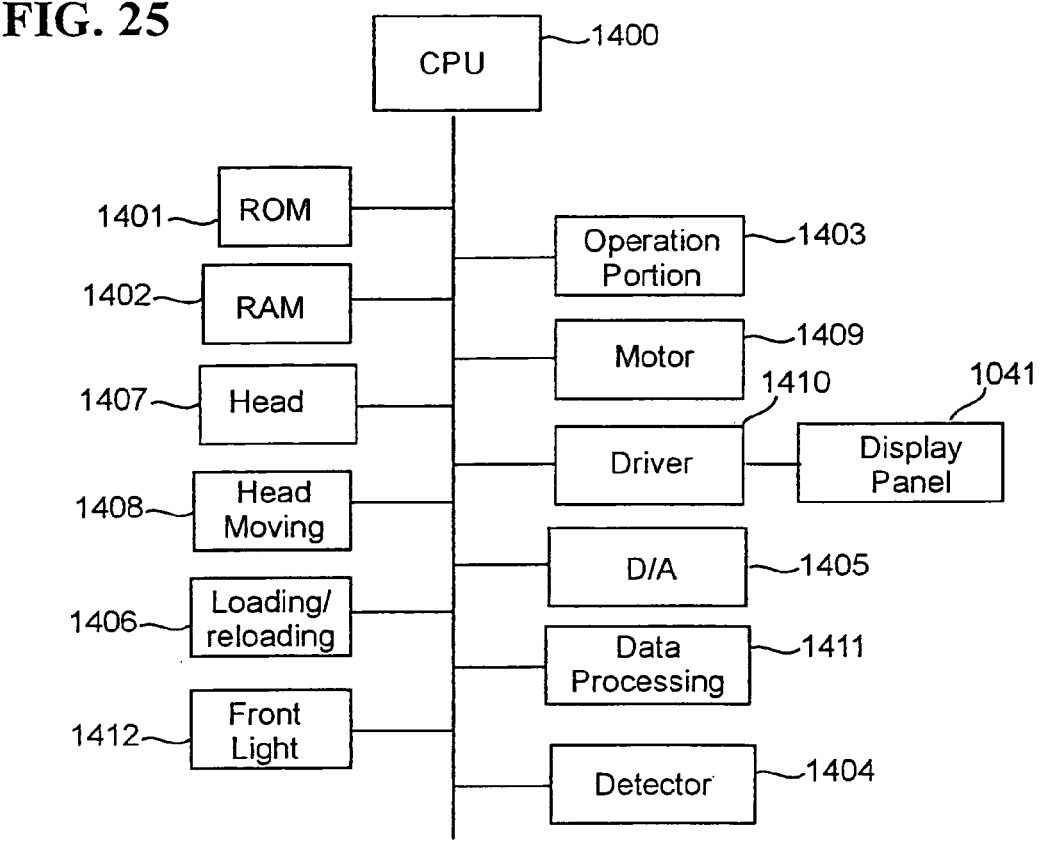
FIG. 25 is a block diagram showing a control portion of the headphone stereo.

As shown in FIG. 25, the control portion of the headphone stereo 1040 is formed with a CPU 1400 as the main element. The CPU 1400 includes a ROM 1401 for storing various programs and data therein and a RAM 1402 for storing various data therein, and receives signals from an operation portion 1403 including operation keys, a detector 1404 for detecting the remaining power of the power source such as a battery and a D/A converter 1405 for digital-to-analog converting the data read from a record medium. Moreover, the following are connected to the control portion: a loading and reloading mechanism 1406 for inserting and removing a record medium; a head 1407 for data reading from the record medium and data writing into the record medium; a head moving mechanism 1408; a motor 1409 for driving the record medium; a drive portion 1410 for driving the display panel 1041; a data processing circuit 1411 for performing various processings on sound data and image data; and a front light 1412 for illuminating the display panel 1041, for example, when it is dark.

The operation keys of the operation portion 1403 include a playback key, a stop key, a fast-forward key, a reversed key and a display mode change key.

Next, an example of the display control of the head phone stereo 1040 having the above-described structure will be described with reference to the flowcharts of FIGS. 26 and 27.

Figure 26:
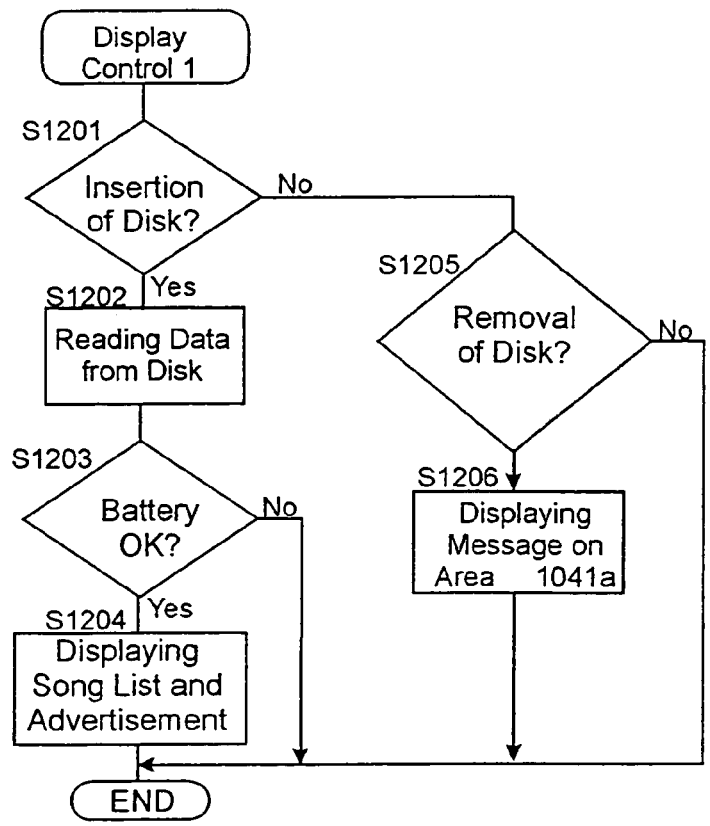
FIG. 26 is a flowchart showing the procedure of a display processing performed when a storage medium is inserted and removed in the headphone stereo.

FIG. 26 shows the procedure of a display processing performed when a storage medium is inserted and removed. In this procedure, when insertion of a storage medium is recognized (YES of step S1201), contents information and advertisement information are read from the storage medium (step S1202). When it is determined that enough power is left in the power source (YES of step S1203), the disk name and the list of the recorded songs are displayed in the display area 1041a and an advertisement is displayed in the display area 1041b (step S1204). As described above, since the advertisement is rewritten after the remaining power of the power source is checked, there is no possibility that the headphone stereo 1040 cannot be operated because of the rewriting of the advertisement or that the advertisement is not correctly displayed because of faulty rewriting.

When removal of a storage medium is recognized (YES of step S1205), the display in the display area 1041a is temporarily turned off and a message indicating that no storage medium is inserted is displayed with the advertisement display in the display area 1041b being maintained (step S1206). Consequently, the display of the advertisement information read from a storage medium is continued even after the storage medium is removed. Therefore, the effect of the advertisement is maintained for a long time without the need to store advertisement information in a memory or the need for power to maintain the display.

Default advertisement information stored in the ROM 1401 may be read and displayed when a storage medium is removed.

Figure 27:
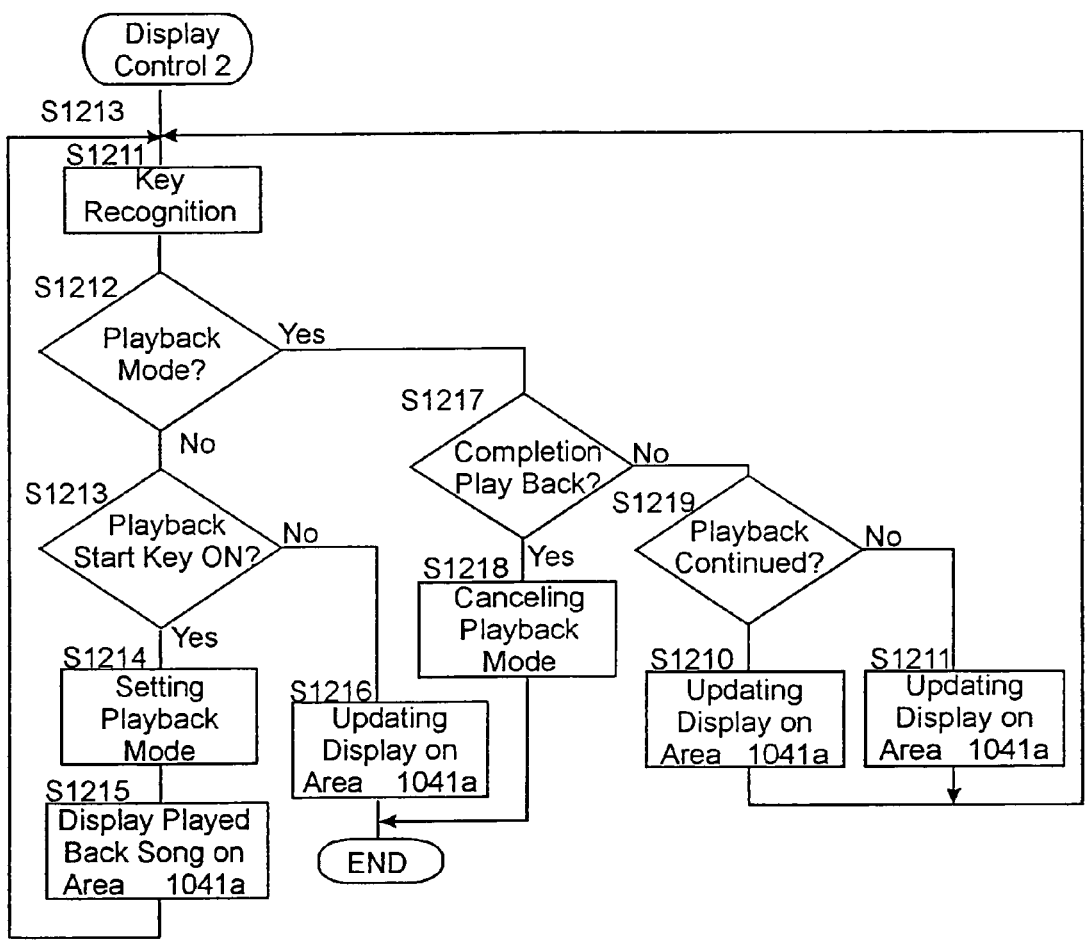
FIG. 27 is a flowchart showing the procedure of a display processing performed when the storage medium is operated in the headphone stereo.

FIG. 27 shows the procedure of a display processing performed when the storage medium is operated. In this procedure, the main processing is started when an operation key is operated with a storage medium being inserted. First, the operated key is recognized (step S1211), and whether a playback mode representing that a song is being played back is set or not is determined. When the playback mode is currently off (NO of step S1212), whether the operated key is a playback start key or not is determined. When the playback start key is operated (YES of step S1213), the playback mode is set (step S1214), the disk name and information on the song being played back are displayed in the display area 1041a (step S1215), and the process returns to step S1211. At this time, a message indicating that playback is currently being performed may be displayed. When a key other than the playback start key is operated (NO of step S1213), display corresponding to the operation, for example, display of display mode switching or information on the next song selected by an operation of the fast-forward key is provided (step S1216). Then, the process is ended.

In the case where the playback mode is currently on (YES of step S1212), when the playback is completed or stopped, for example, by a key operation (YES of step S1217), the playback mode is canceled (step S1218), and the process is ended. Consequently, display of contents information such as the disk name and song information and the advertisement is continued even after the playback is ended, so that which disk is inserted can be found at a glance.

When the playback is continued (NO of step S1217, NO of step S1219), the display of the information on the song being played back in the display area 1041a is updated (step S1211). When there is a key input (YES of step S1219), the display in the display area 1041a is updated in accordance with the key input (step S1210). The headphone stereo 1040 may be structured so that a display mode in which display of the song list is continued during playback is selectable. That the disk name (the album title or the like) is displayed in both of the display modes is convenient because the list of the recorded songs or the title of the song information can be grasped at all times.

In battery-operated apparatuses of this kind, as described in the first embodiment, it is desirable to detect the degree of exhaustion of the battery and update the display in the area 1041b when power necessary for operating the apparatus body can be supplied. A charge discount service or a purchase price discount service can also be received for the optical disk 1045.

The system described in the fourth embodiment is equally applicable to electronic apparatuses to which a storage medium storing various pieces of information therein is detachably attachable such as electronic book players, portable game apparatuses, electronic still cameras, video cameras and electronic notepads as well as to the headphone stereo 1040. Needless to say, the system is similarly applicable to apparatuses having a display and to which a part other than a storage medium such as a tape writer is detachably attachable. When the system is applied to a mobile apparatus, the effect of the advertisement is particularly high because the advertisement is highly likely to be seen by an indefinite number of people.

The electronic apparatus, the method of placing an advertisement on the electronic apparatus, the charging system and the charging method according to the present invention are not limited to the above-described embodiments, but various changes and modifications may be made without departing from the spirit and scope of the invention.

Hereinafter, embodiments of the communication terminal, the communication system and the communication data structure according to the present invention will be described with reference to the attached drawings.

Figure 28A:
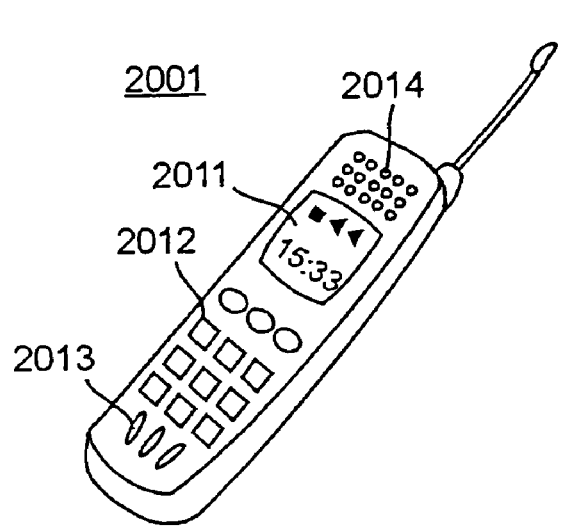
FIGS. 28A and 28B show a portable telephone according to a fifth embodiment of the present invention.
Figure 28B:
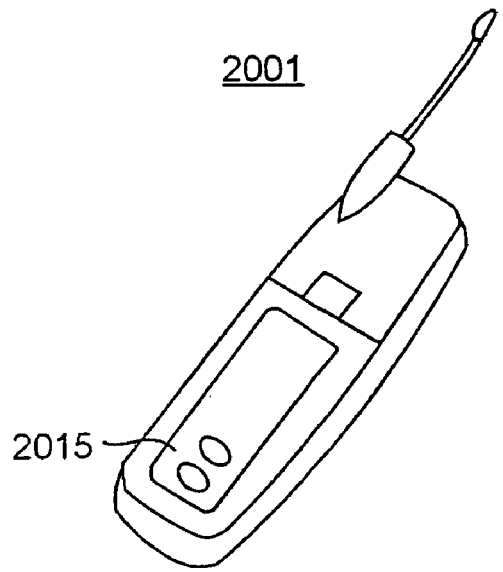
Figure 29:
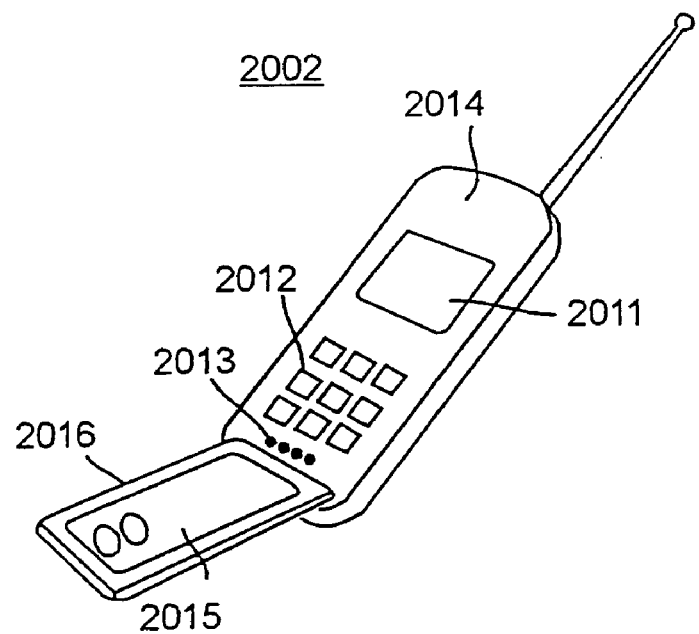
FIG. 29 is a perspective view showing a portable telephone according to a sixth embodiment of the present invention.
Figure 30:
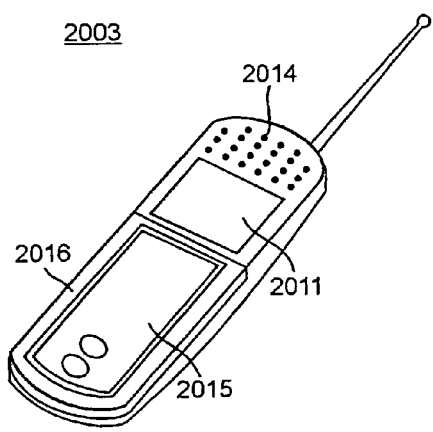
FIG. 30 is a perspective view showing a portable telephone according to a seventh embodiment of the present invention.

Portable Telephone, Referring to FIGS. 28 to 30

FIGS. 28A and 28B show a portable telephone 2001 according to a fifth embodiment. On the front surface of the portable telephone 2001, a moving image display panel 2011 similar to that of a typical portable telephone, an operation portion 2012 comprising various operation buttons, a microphone 2013, a speaker 2014 and the like are disposed. The moving image display panel 2011 comprises a display device with a high display speed using, for example, TN liquid crystal, STN liquid crystal or an organic EL device. On the display panel 2011, the current time, the radio wave intensity, the telephone number of the caller and the like are displayed like on the display panel of a conventional portable telephone.

On the rear surface of the portable telephone 2001, a reflective liquid crystal display panel 2015 having memory capability is disposed. The reflective liquid crystal display panel 2015 is used for displaying, for example, an advertisement such as "OO Co., Ltd.[TNT2]" The structure, the driving method and the display form of the liquid crystal display device used will be described later.

FIG. 29 shows a portable telephone 2002 according to a sixth embodiment. The same elements as those of the portable telephone 2001 are designated by the same reference numbers. The portable telephone 2002 has a lid 2016 pivotable between a position that covers the front surface of the operation portion 2012 and a position that uncovers it, and the reflective liquid crystal display panel 2015 having memory capability is disposed on the rear surface of the lid 2016.

FIG. 30 shows a portable telephone 2003 according to a seventh embodiment. The same elements as those of the portable telephones 2001 and 2002 are designated by the same reference numbers. In the portable telephone 2003, the reflective liquid crystal display device 2015 having memory capability is disposed on the front surface of the lid 2016.

Figure 31:
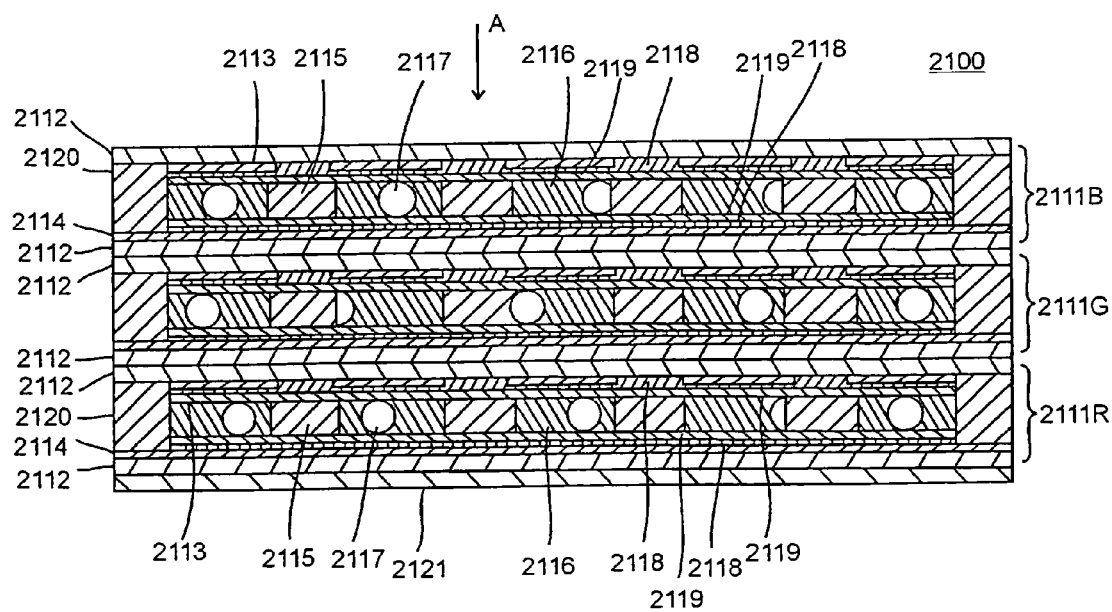
FIG. 31 is a cross-sectional view showing an example of a liquid crystal display device used for a reflective liquid crystal display panel.

Liquid Crystal Display Device, Referring to FIG. 31

Now, the liquid crystal display device used for the reflective liquid crystal display panel 2015 will be described. The liquid crystal display device 2100 is a reflective full-color display device employing the direct matrix driving method and including liquid crystal exhibiting the cholesteric phase. The display described next is similar to liquid crystal display device 1100 described previously. Moreover, liquid crystal display device 1100, which was described previously can optionally be used in the following embodiments where liquid crystal display device 2100 is discussed.

The liquid crystal display device 2100 has a structure such that a red display layer 2111R, which performs display by switching between selective reflection of red and a transparent condition, is disposed on a light absorbing layer 2121; a green display layer 2111G, which performs display by switching between selective reflection of green and the transparent condition, is laminated on the red display layer 2111R; and a blue display layer 2111B, which performs display by switching between selective reflection of blue and the transparent condition, is laminated on the green display layer 2111G.

The display layers 2111R, 2111G and 2111B have a structure such that resin pillars 2115, liquid crystal 2116 and spacers 2117 are sandwiched between transparent substrates 2112 having transparent electrodes 2113 and 2114 formed thereon. On the transparent electrodes 2113 and 2114, an insulative film 2118 and an alignment control film 2119 are provided as required. Around the perimeter of the transparent substrate 2112 (outside the display area), a sealing member 2120 for sealing of the liquid crystal 2116 is provided.

The transparent electrodes 2113 and 2114 are connected to drive ICs 2131 and 2132 (see FIG. 32), respectively, and a predetermined pulse voltage is applied between the transparent electrodes 2113 and 2114. In response to the applied voltage, the display is switched between the transparent condition in which the liquid crystal 2116 transmits visible light and the selective reflection condition in which the liquid crystal 2116 selectively reflects visible light of a specific wavelength.

The transparent electrodes 2113 and 2114 provided in each of the display layers 2111R, 2111G and 2111B comprise a plurality of belt-shaped electrodes disposed in parallel at minute intervals, and are opposed so that the belt-shaped electrodes of the transparent electrodes 2113 and 2114 are perpendicular to each other. Current is successively passed through these upper and lower belt-shaped electrodes. That is, a voltage is successively applied to each liquid crystal 2116 in a matrix form to perform display. This is called matrix driving. The portions at which the transparent electrodes 2113 and 2114 intersect constitute pixels. By performing such matrix driving on each display layer, a full color image is displayed on the liquid crystal display device 2100.

Specifically, in a liquid crystal display device in which liquid crystal exhibiting the cholesteric phase is sandwiched between two substrates, display is performed by switching the state of the liquid crystal between the planar state and the focal conic state. When the liquid crystal is in the planar state, light of a wavelength $\lambda = P \cdot n$ is selectively reflected, where P is the helical pitch of the cholesteric liquid crystal and n is the average refractive index of the liquid crystal. In the focal conic state, when the selective reflection wavelength of the cholesteric liquid crystal is in the infrared region, the liquid crystal scatters visible light, and when the selective reflection wavelength is shorter than the infrared region, the liquid crystal transmits visible light. Therefore, by setting the selective reflection wavelength in the visible region and providing the light absorbing layer on the side opposite to the viewing side of the device, display of a selectively reflected color can be performed in the planar state and display of black can be performed in the focal conic state. Moreover, by setting the selective reflection wavelength in the infrared region and providing the light absorbing layer on the side opposite to the viewing side of the device, display of black can be performed in the planar state because the liquid crystal reflects light of wavelengths in the infrared region and transmits light of wavelengths in the visible region, and display of white can be performed in the focal conic state because the liquid crystal scatters light.

The liquid crystal display device 2100 comprising a lamination of the display layers 2111R, 2111G and 2111B is capable of displaying red by having the blue display layer 2111B and the green display layer 2111G be in the transparent condition, in which the liquid crystal is in the focal conic alignment, and the red display layer 2111R be in the selective reflection condition, in which the liquid crystal is in the planar alignment. Moreover, the liquid crystal display device 2100 is capable of displaying yellow by having the blue display layer 2111B be in the transparent condition, in which the liquid crystal is in the focal conic alignment and the green display layer 2111G and the red display layer 2111R be in the selective reflection condition, in which the liquid crystal is in the planar alignment. Likewise, the liquid crystal display device 2100 is capable of displaying red, green, blue, white, cyan, magenta, yellow and black by selecting the transparent condition or the selective reflection condition as the condition of each display layer. Further, by selecting intermediate selective reflection conditions as the conditions of the display layers 2111R, 2111G and 2111B, display of neutral tints can be performed, so that the liquid crystal display device 2100 can be used as a full color display device.

As the liquid crystal 2116, one that exhibits the cholesteric phase at room temperature is desirable, and chiral nematic liquid crystal obtained by adding a chiral material to nematic liquid crystal is particularly suitable.

The chiral material is an additive agent that twists the molecules of nematic liquid crystal when added to nematic liquid crystal. By adding the chiral material to nematic liquid crystal, a helical structure of liquid crystal molecules having predetermined twist intervals is generated, so that the liquid crystal exhibits the cholesteric phase.

The liquid crystal having memory capability is not limited to this structure; the liquid crystal display layer may be formed as a so-called polymer dispersed liquid crystal composite film in which liquid crystal is dispersed into a known three-dimensional network structure of a polymer or in which a three-dimensional network structure of a polymer is formed in the liquid crystal.

Figure 32:
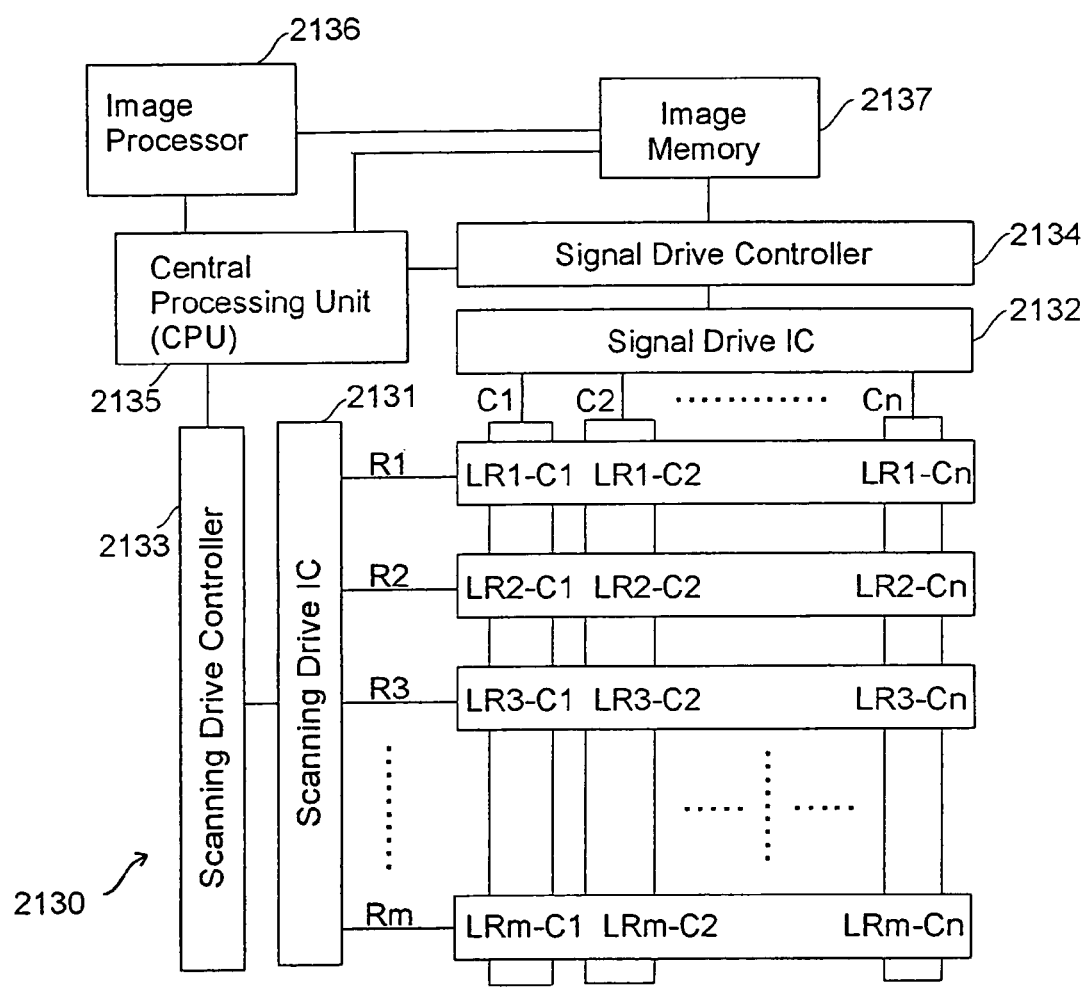
FIG. 32 is a block diagram showing a drive circuit of the liquid crystal display device.

Drive Circuit, Referring to FIG. 32

The pixel structure of the liquid crystal display device 2100 is represented, as shown in FIG. 32, as a matrix of a plurality of scanning electrodes R1, R2 to Rm and signal electrodes C1, C2 to Cn (m, n are natural numbers). The scanning electrodes R1, R2 to Rm are connected to output terminals of the scanning drive IC 2131, and the signal electrodes C1, C2 to Cn are connected to output terminals of the signal drive IC 2132.

The scanning drive IC 2131 outputs a selection signal to a predetermined one of the scanning electrodes R1, R2 to Rm to bring the electrode to a selected state, and outputs a non-selection signal to the other electrodes to bring them to a non-selected state. The scanning drive IC 2131 successively applies the selection signal to the scanning electrodes R1, R2 to Rm while switching the electrode at predetermined time intervals. The signal drive IC 2132 outputs a signal corresponding to the image data to the signal electrodes C1, C2 to Cn at the same time in order to rewrite the pixels on the scanning electrodes R1, R2 to Rm in the selected state. For example, when the scanning electrode Ra is selected (a is a natural number satisfying a≦m), the pixels LRa-C1 to LRa-Cn at the points of intersection of the scanning electrode Ra and the signal electrodes C1, C2 to Cn are simultaneously rewritten. Consequently, the voltage difference between the scanning electrode and the signal electrode at each pixel is the pixel rewriting voltage, and each pixels is rewritten in accordance with the rewriting voltage.

A drive circuit 2130 of the liquid crystal display device 2100 comprises controllers 2133 and 2134 controlled by a central processing unit (CPU) 2135, and drive ICs (drivers) 2131 and 2132. To the CPU 2135, an image processor 2136 and an image memory 2137 are connected. Based on the image data stored in the image memory 2137, the controllers 2133 and 2134 control the drive ICs 2131 and 2132 and apply a voltage between the scanning electrodes and the signal electrodes of the liquid crystal display device 2100 to write an image onto the liquid crystal display device 2100.

When a first threshold voltage for undoing the twist of the liquid crystal exhibiting the cholesteric phase is Vth1, the liquid crystal is brought to the planar state by decreasing the voltage to not more than a second threshold voltage Vth2 lower than the first threshold voltage Vth1 after the voltage Vth1 is applied for a sufficient time. The liquid crystal is brought to the focal conic state by applying a voltage not less than Vth2 and not more than Vth1 for a sufficient time. The two states are kept stable even after the voltage application is stopped. By applying an intermediate voltage between Vth1 and Vth2, display of neutral tints, that is, display of gradations can be performed.

When the pixels are partially rewritten, only specific scanning lines are successively selected so that the part to be rewritten is included. Consequently, rewriting of only a necessary part can be performed for a short time.

Although the pixels can be rewritten by the above-described method, when an image is already displayed, in order to remove the influence of the image, it is desirable to reset all the pixels to the same display state before rewriting. The reset of the pixels may be performed for all the pixels at the same time or may be performed for each scanning electrode.

When the pixels are partially rewritten, the reset is performed for each scanning line or only the pixels between specific scanning lines including the part to be rewritten are reset at the same time.

Figure 33:
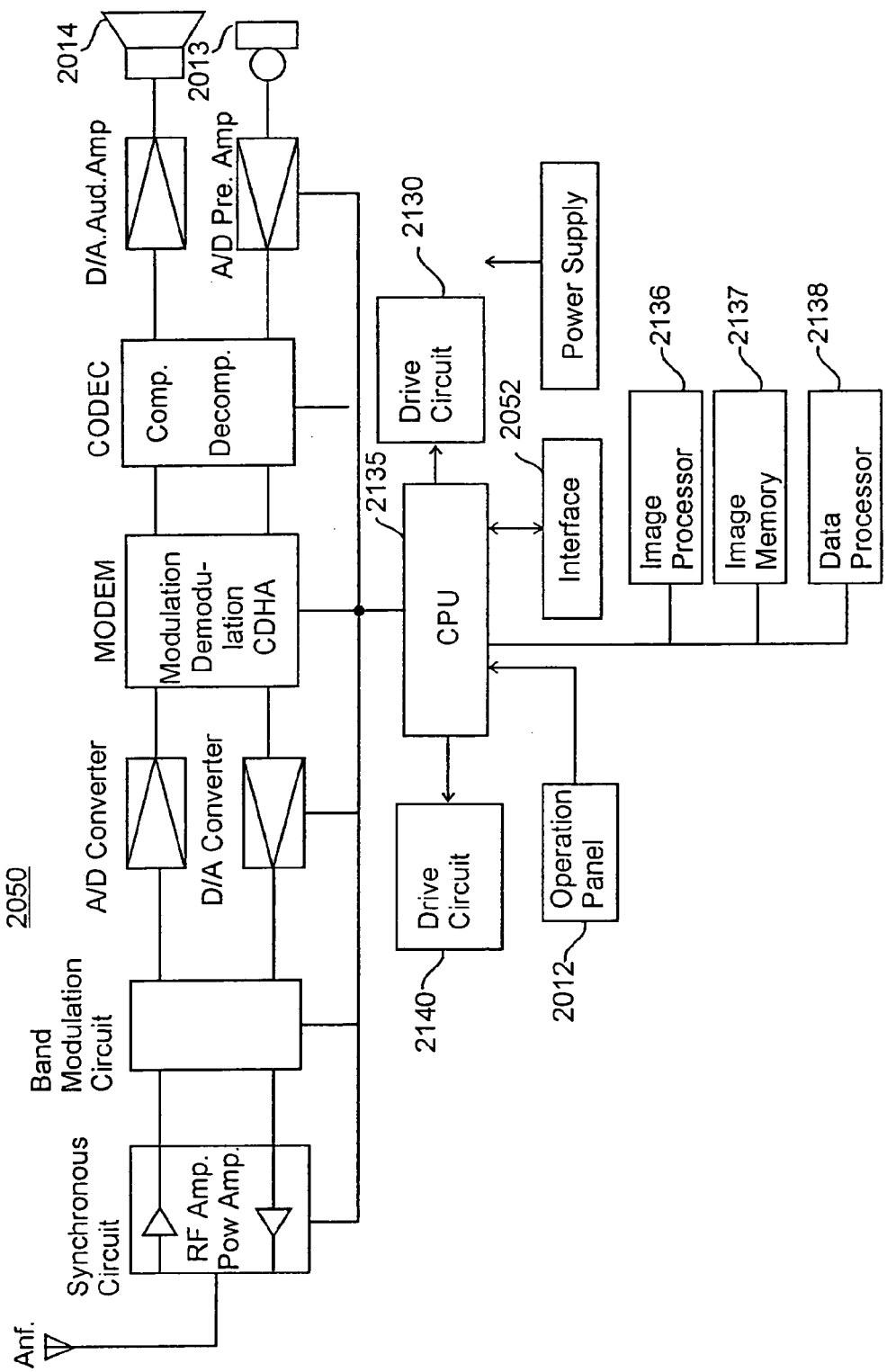
FIG. 33 is a block diagram showing a control portion of the portable telephone.

Control Portion of Portable Telephone, Referring to FIG. 33

Next, the control portion of the portable telephone will be described with reference to FIG. 33. The control portion 2050 is basically similar to those of conventional portable telephones, and is formed with the CPU 2135 shown in FIG. 32 as the main element. The CPU 2135 selects either the moving image display panel 2011 or the reflective liquid crystal display panel 2015 as the display on which received image data is displayed, and controls a drive circuit 2140 of the moving image display panel 2011 or the drive circuit 2130 of the reflective liquid crystal display panel 2015 to display the image data. When selecting the reflective liquid crystal display panel 2015 as the display on which received image data is displayed, the CPU 2135 displays the image data on the reflective liquid crystal display panel 2015 without making a reception notification sound. A data processing circuit 2138 performs various processings on communication data.

The CPU 2135 transmits and receives image data to and from a digital camera or a personal computer through an interface 2052.

Display Examples, Referring to FIGS. 34a Through 34e

Figure 34A:
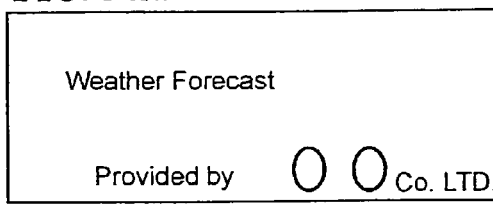
FIGS. 34A through 34E are explanatory views showing examples of displays provided on the reflective liquid crystal display panel.

FIGS. 34A thorough 34E show examples of still images displayed on the reflective liquid crystal display panel 2015. It is to be noted that display examples are not limited thereto.

Figure 34B:
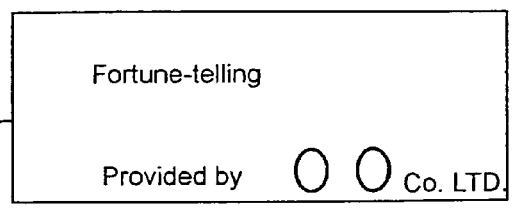
Figure 34C:
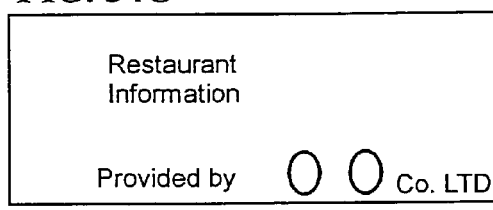
Figure 34D:
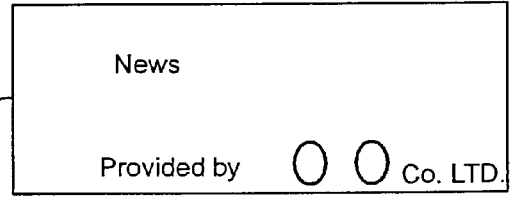
Figure 34E:
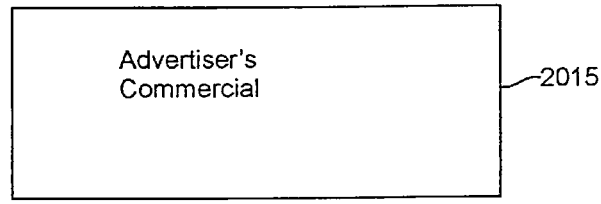

FIG. 34A shows an example in which a weather forecast is displayed together with the company providing it. FIG. 34B shows an example in which fortune-telling is displayed together with the company providing it. FIG. 34C shows an example in which restaurant information is displayed together with the company providing it. FIG. 34D shows an example in which news is displayed together with the company providing it. FIG. 34E shows an example in which an advertiser's commercial is displayed on the entire screen of the reflective liquid crystal display panel 2015.

While these display examples are displayed by displaying image data transmitted from the telephone company, image data can be exchanged between portable telephones, and image data received from another portable telephone can be displayed on the reflective liquid crystal display panel 2015. For example, by transmitting an image captured from a digital camera to another portable telephone, the received image is displayed on the reflective liquid crystal display panel 2015 of the portable telephone receiving the image, and when the image is a distinctive one, it functions as an ornamental display of the portable telephone.

The display on the reflective liquid crystal display panel 2015 is maintained as it is even after power supply to the reflective liquid crystal display panel 2015 is stopped. Therefore, not only power is saved but also the advertisement effect or the ornamental effect is delivered even after power supply to the reflective liquid crystal display panel 2015 is stopped.

Communication Data Structure and Communication Procedure, Referring to FIGS. 35 to 39

Figure 35:
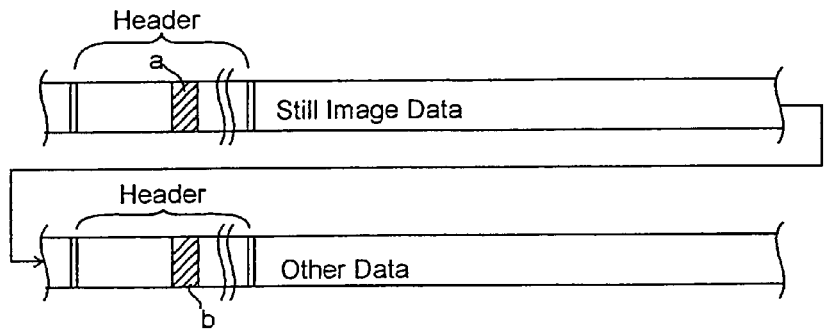
FIG. 35 is a chart showing an example of the communication data structure.

FIG. 35 shows an example of the communication data structure. Communication data is data used in normal transmission and reception, and to the header portion thereof, a data identifier a or b is attached. The identifier a indicates that the data is still image data to be displayed on the reflective liquid crystal display panel 2015. The identifier b indicates that the data is data other than still image data such as sound data.

Figure 36:
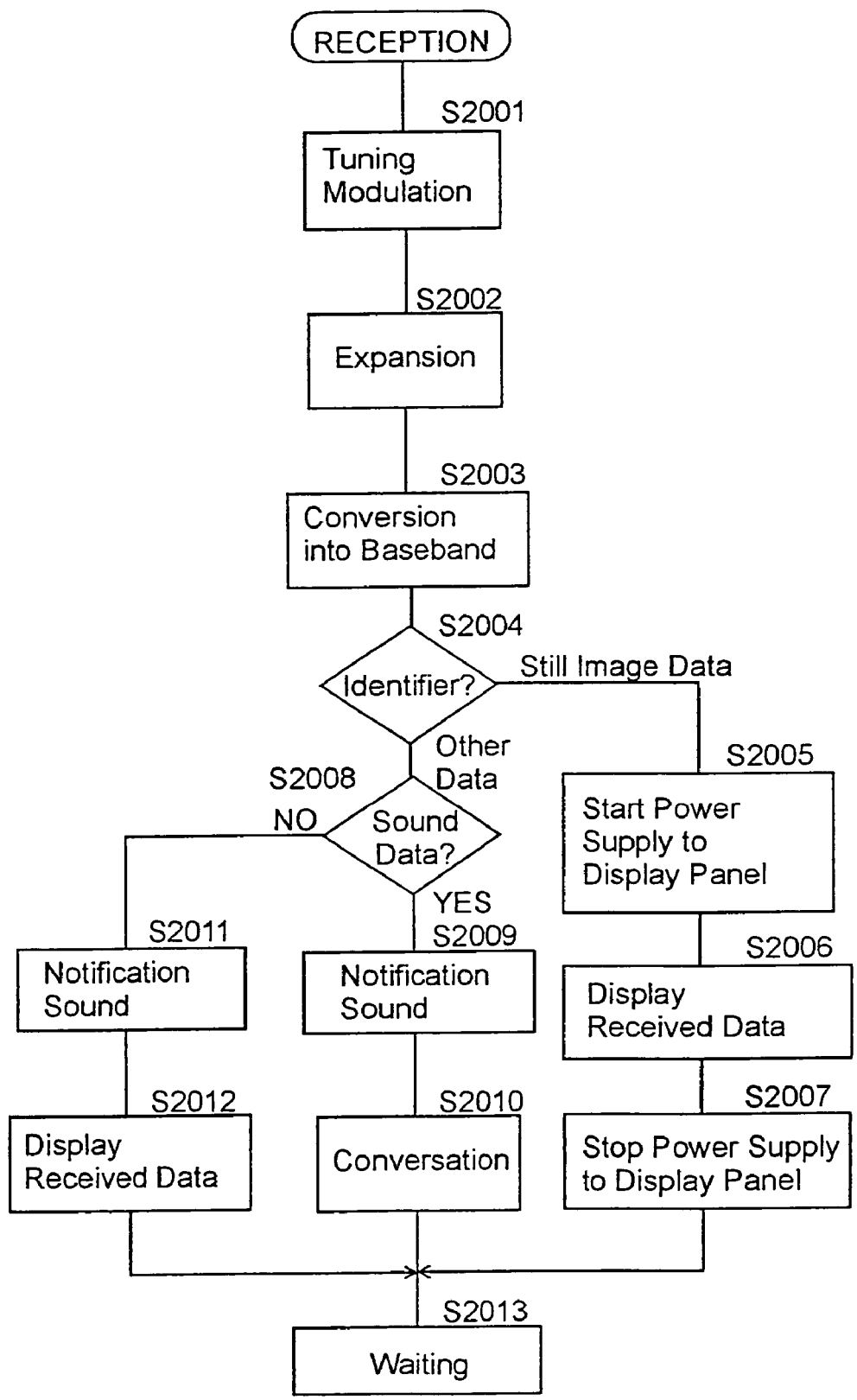
FIG. 36 is a flowchart showing an outline of a communication procedure (at the receiving end).

FIG. 36 shows an outline of the reception procedure when the communication data shown in FIG. 35 is received. In this procedure, when the communication data is received, tuning and demodulation are performed at step S2001, the data is expanded at step S2002, and the data is converted to baseband data at step S2003. Then, whether the identifier a or b is attached to the header portion of the data is determined at step S2004. When the identifier indicates that the data is still image data, the process proceeds to step S2005, and when the identifier indicates that the data is data other than still image data, the process proceeds to step S2008.

When the received data is still image data, at step S2005, power supply to the reflective liquid crystal display panel 2015 is started without a reception notification sound being made, and at step S2006, the received data is displayed on the reflective liquid crystal display panel 2015. Then, power supply to the reflective liquid crystal display panel 2015 is stopped at step S2007, and the process waits at step S2013.

When the received data is data other than still image data, whether the received data is sound data or not is determined at step S2008. When the received data is sound data, the reception notification sound is made at step S2009, and conversation is performed at step S2010. When conversation is finished, the process waits at step S2013.

When the received data is data other than sound data, the reception notification sound is made at step S2011, and the received data is displayed on the moving image display panel 2011 at step S2012. Then, the process waits at step S2013.

In any of these cases, when data is again received in the wait state, the process returns to step S2001, and the above-described processing is repeated.

Figure 37:
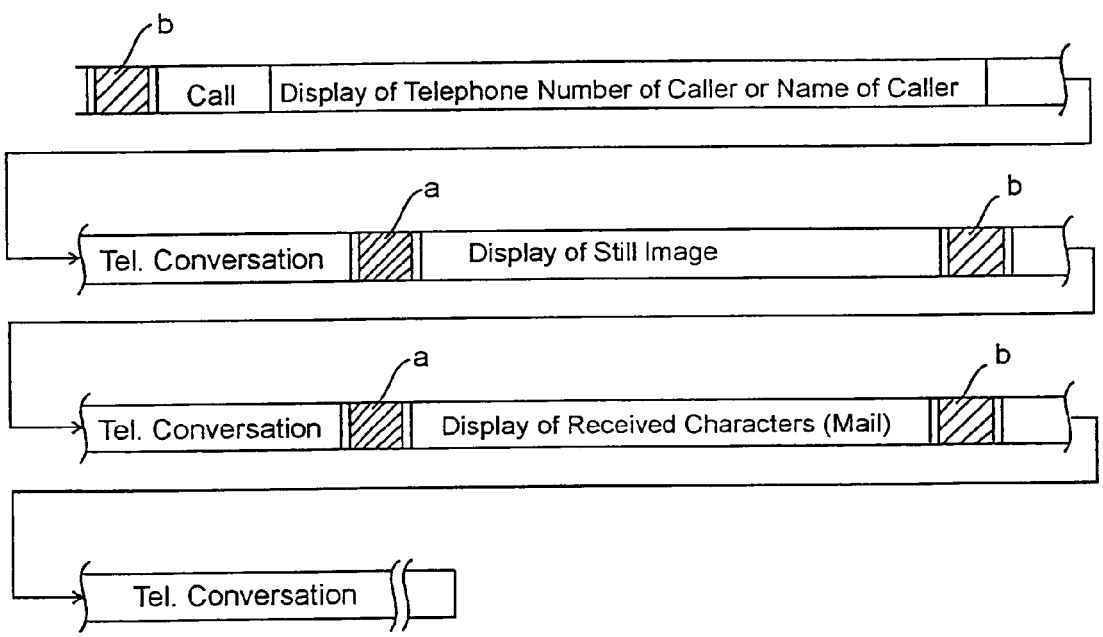
FIG. 37 is a chart showing another example of communication data.

FIG. 37 shows another example of communication, that is, a case where still image data is transmitted during data transmission and reception. In this case, in the communication data, the identifier b is attached to the head portion, reception (call) is performed, the telephone number of the caller or the name of the caller is displayed on the moving image display panel 2011, and then, telephone conversation is performed.

Then, the identifier a is attached, and here, the received still image (an image captured from a digital camera or the like) is displayed on the reflective liquid crystal display panel 2015. Then, the identifier b is attached, and telephone conversation is performed. Then, the identifier a is attached, and the received characters (mail) are displayed on the reflective liquid crystal display panel 2015. Then, the identifier b is attached, and telephone conversation is performed. The transmission and reception is finished here.

Figure 38:
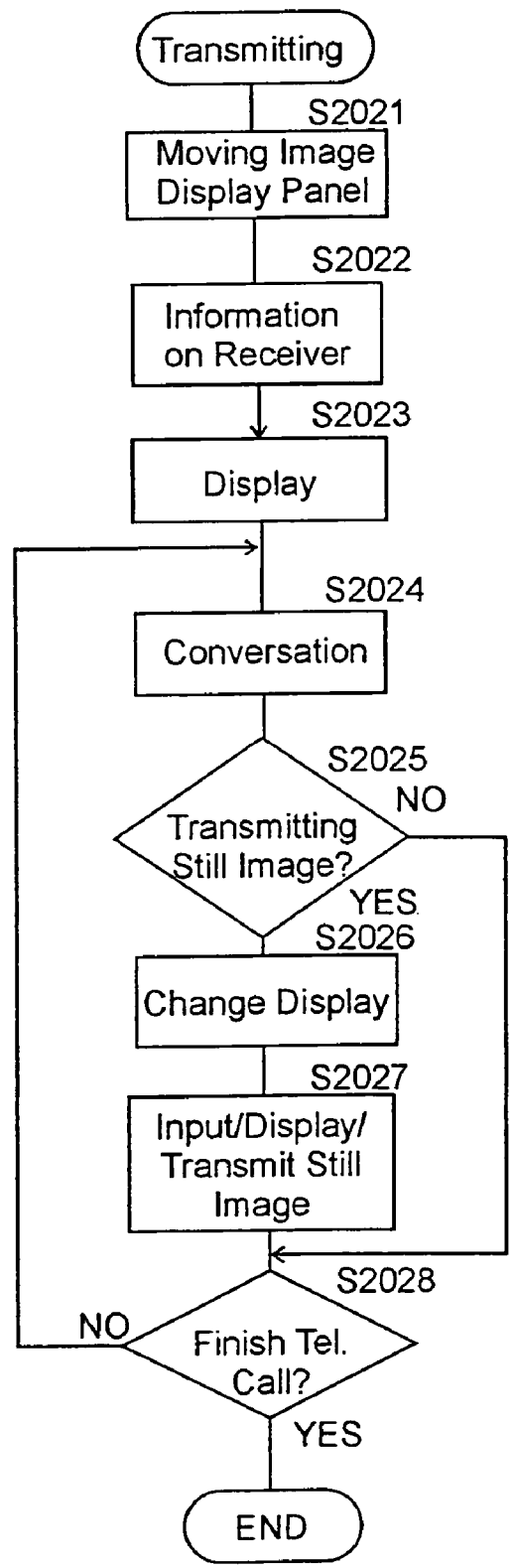
FIG. 38 is a flowchart showing the outline of the communication procedure (at the transmitting end).
Figure 39:
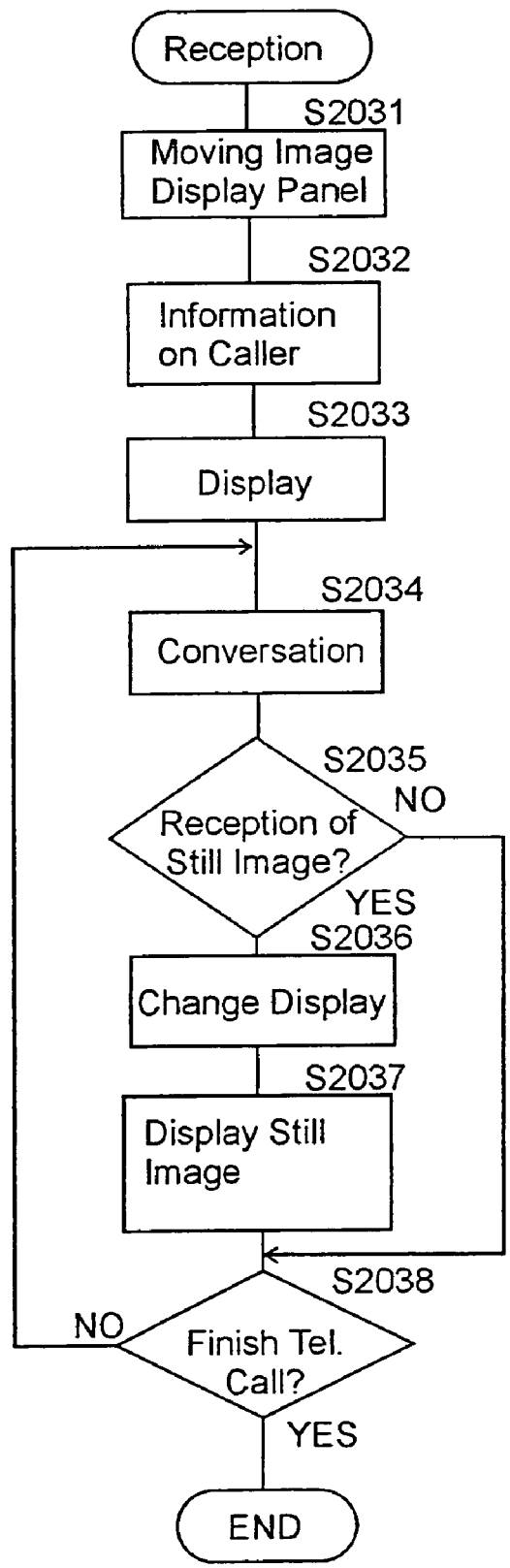
FIG. 39 is a flowchart showing the outline of the communication procedure (at the receiving end).

FIGS. 38 and 39 show the outline of the communication procedure shown in FIG. 37 separately for the transmitting end and for the receiving end.

At the transmitting end, as shown in FIG. 38, first, the display on which data is displayed is changed to the moving image display panel 2011 at step S2021, the information on the receiver (the telephone number and the like) is input from the operation portion 2012 at step S2022, and the input is displayed on the moving image display panel 2011 at step S2023.

Then, telephone conversation is performed at step S2024, and whether to transmit a still image or not is determined at step S2025. When no still image is transmitted, the process proceeds to step S2028. When a still image is transmitted, the display on which data is displayed is changed to the reflective liquid crystal display panel 2015 at step S2026, and still image data is input and the input data is displayed on the reflective liquid crystal display panel 2015 and transmitted to the receiver at step S2027. Inputting still image data indicates capturing data from a digital camera or a personal computer into the portable telephone through the interface 2052.

Then, whether the telephone call is finished or not is determined at step S2028. When the telephone call is not finished, the process returns to step S2024.

At the receiving end, as shown in FIG. 39, first, the display on which data is displayed is changed to the moving image display panel 2011 at step S2031, the information on the caller (the telephone number and the like) is received at step S2032, and the received data is displayed on the moving image display panel 2011 at step S2033.

Then, telephone conversation is performed at step S2034, and whether a still image has been received or not is determined at step S2035. When no still image has been received, the process proceeds to step S2038. When a still image has been received, the display on which data is displayed is changed to the reflective liquid crystal display panel 2015 at step S2036, and the still image data is displayed on the reflective liquid crystal display panel 2015 at step S2037.

Then, whether the telephone call is finished or not is determined at step S2038. When the telephone call is not finished, the process returns to step S2034.

Figure 40:
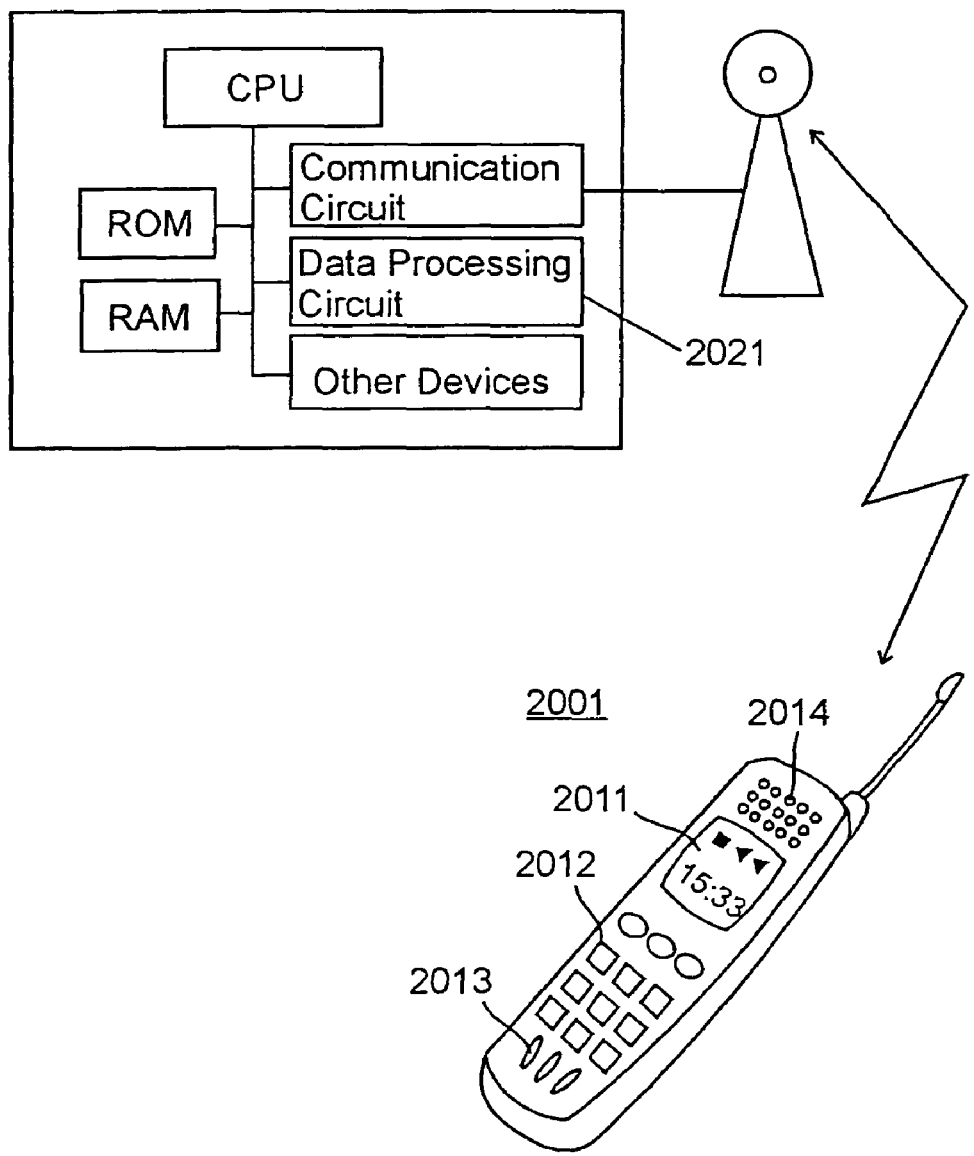
FIG. 40 is an explanatory view showing a first example of the structure of the communication system according to the present invention.
Figure 41:
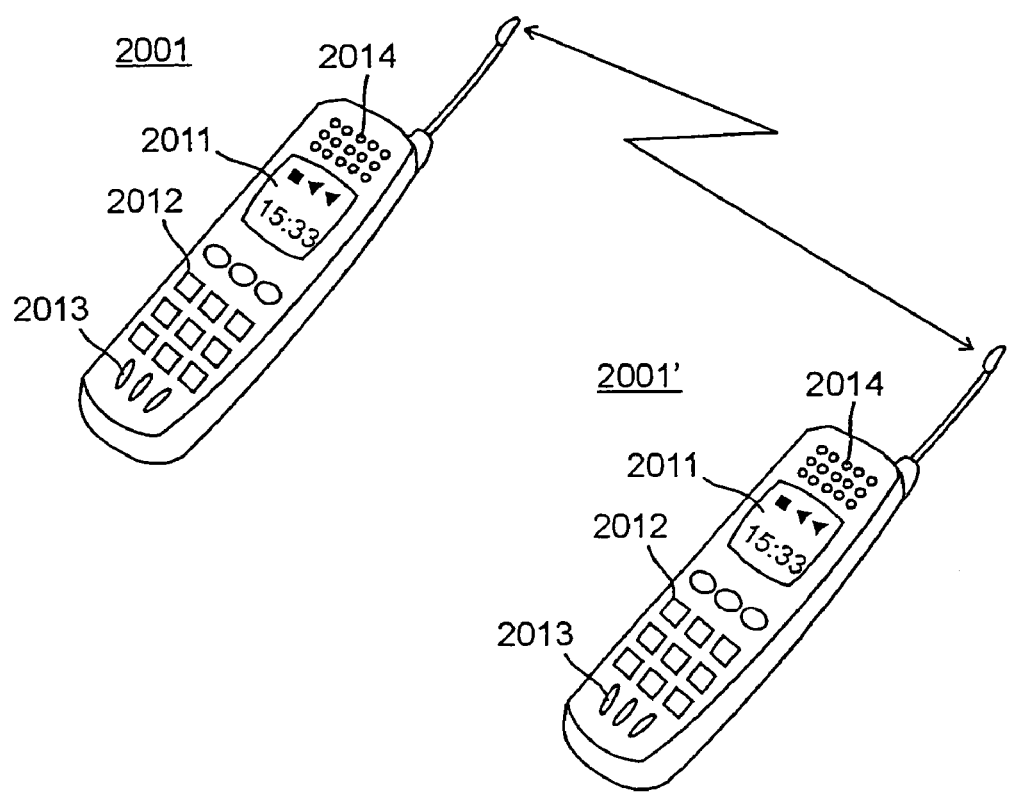
FIG. 41 is an explanatory view showing a second example of the structure of the communication system according to the present invention.

Examples of Structure of Communication System, Referring to FIGS. 40 and 41

FIG. 40 shows a first example of the structure of the communication system. In this example, communication is performed between a host apparatus 2020 and the portable telephone 2001 which is a communication terminal. In this case, in the host apparatus 2020, a data processing circuit 2021 provides communication data with an identifier.

FIG. 41 shows a second example of the communication system structure. In this example, communication is performed between a plurality of portable telephones 2001 and 2001' which are communication terminals. In this case, communication data including an identifier is transmitted from one portable telephone to another. The communication data including an identifier may be produced in the portable telephone by use of the data processing circuit 2138, or data produced by an external apparatus may be captured into the portable telephone. When data is captured from an external apparatus, communication may be performed between the external apparatus and the portable telephone to capture the data, or means for performing writing and reading onto and from a storage medium (for example, a memory card) may be provided in the portable telephone so that data stored in the storage medium in the external apparatus is captured by attaching the storage medium to the portable telephone.

Other Embodiments

The communication terminal, the communication system and the communication data structure according to the present invention are not limited to the above-described embodiments, but various changes and modifications may be made without departing from the spirit and scope of the invention.

Particularly, the present invention is widely applicable to portable communication terminals such as PHS's, portable terminals designed specifically for electronic mail and PDAs having a communication function as well as to portable telephones.

Moreover, the appearance of the portable telephone and the positions of the moving image display panel and the reflective liquid crystal display panel shown in the above-described embodiments are arbitrary. Moreover, whether character data such as mail is displayed on the moving image display panel or on the reflective liquid crystal display panel is arbitrary.

Hereinafter, another embodiment of the portable communication terminal according to the present invention will be described with reference to the attached drawings.

Figure 42:
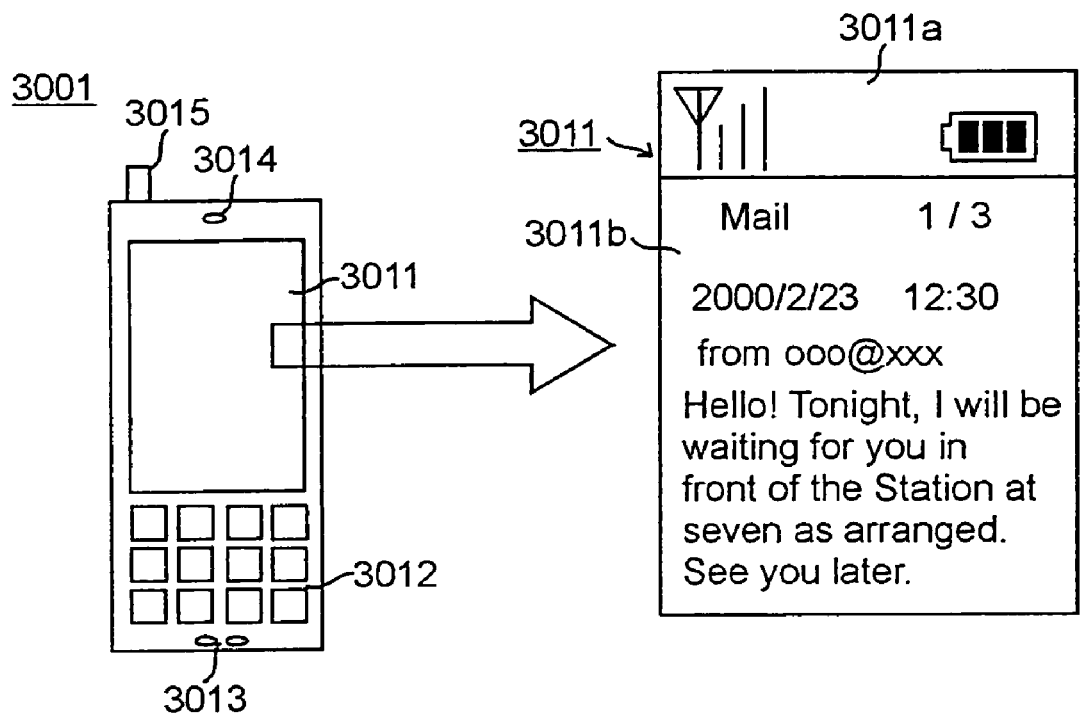
FIG. 42 is a front view showing a portable telephone according to an embodiment of the present invention and an example of the display provided on a display panel of the portable telephone.

Portable Telephone, Referring to FIG. 42

FIG. 42 shows a portable telephone 3001 according to an embodiment of the present invention. The portable telephone 3001 has an external structure similar to that of a common portable telephone, and is provided with a liquid crystal display panel 3011, an operation portion 3012 comprising various operation keys, a microphone 3013, a speaker 3014 and an antenna 3015.

For the liquid crystal display panel 3011, a display device including liquid crystal having memory capability is used, and the structure and the driving method thereof will be described later. The liquid crystal display panel 3011 is divided into a narrow status display area 3011a at the top and a large-area guidance display area 3011b below. In the status display area 3011a, a radio wave reception intensity indicating mark and an internal battery remaining power indicating mark, for example, are displayed. In the guidance display area 3011b, the telephone number, the name, the date of communication, mail, various pieces of information on mail, various messages and the like are displayed.

It is to be noted that various contents may be displayed on the liquid crystal display panel 3011 as well as the ones shown in FIG. 42 and ones shown in FIGS. 48A-48F and 55A-55F described later. In the status display area 3011a, status displays other than the battery remaining power display and the electric field intensity display and other additional pieces of information may be displayed. For example, the current date information, the communication time and the display mode may be displayed.

The liquid crystal display device used for the liquid crystal display panel 3011 can be liquid crystal display device 2100 as described above with reference to FIG. 31. As described, the liquid crystal display device 2100 is a reflective full-color display device employing the direct matrix driving method and including liquid crystal exhibiting the cholesteric phase. Additionally, portable telephone 3001 can employ a display drive circuit 2130 as described above in reference to FIG. 32. Various driving methods may be employed.

The status display area 3011a may be realized by partially driving the liquid crystal display panel 3011, or the panel and the drive circuit of the status display area 3011a and those of the guidance display area 3011b may be independent of each other.

Figure 43:
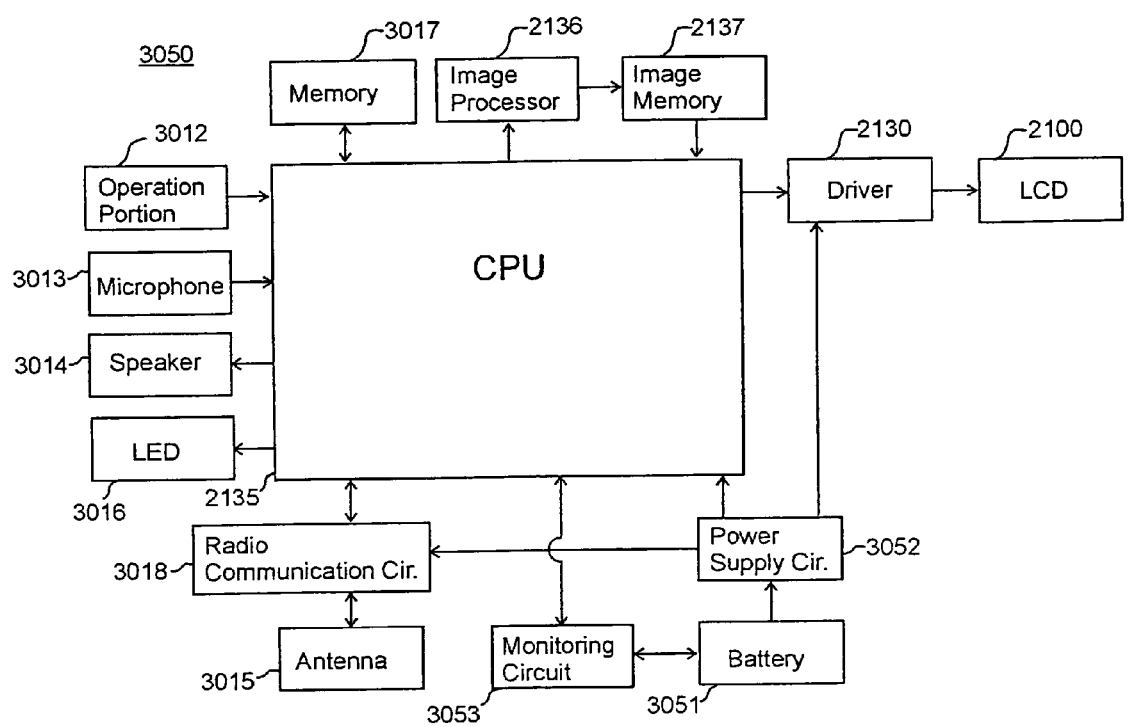
FIG. 43 is a block diagram showing a control portion of the portable telephone.
Figure 44:
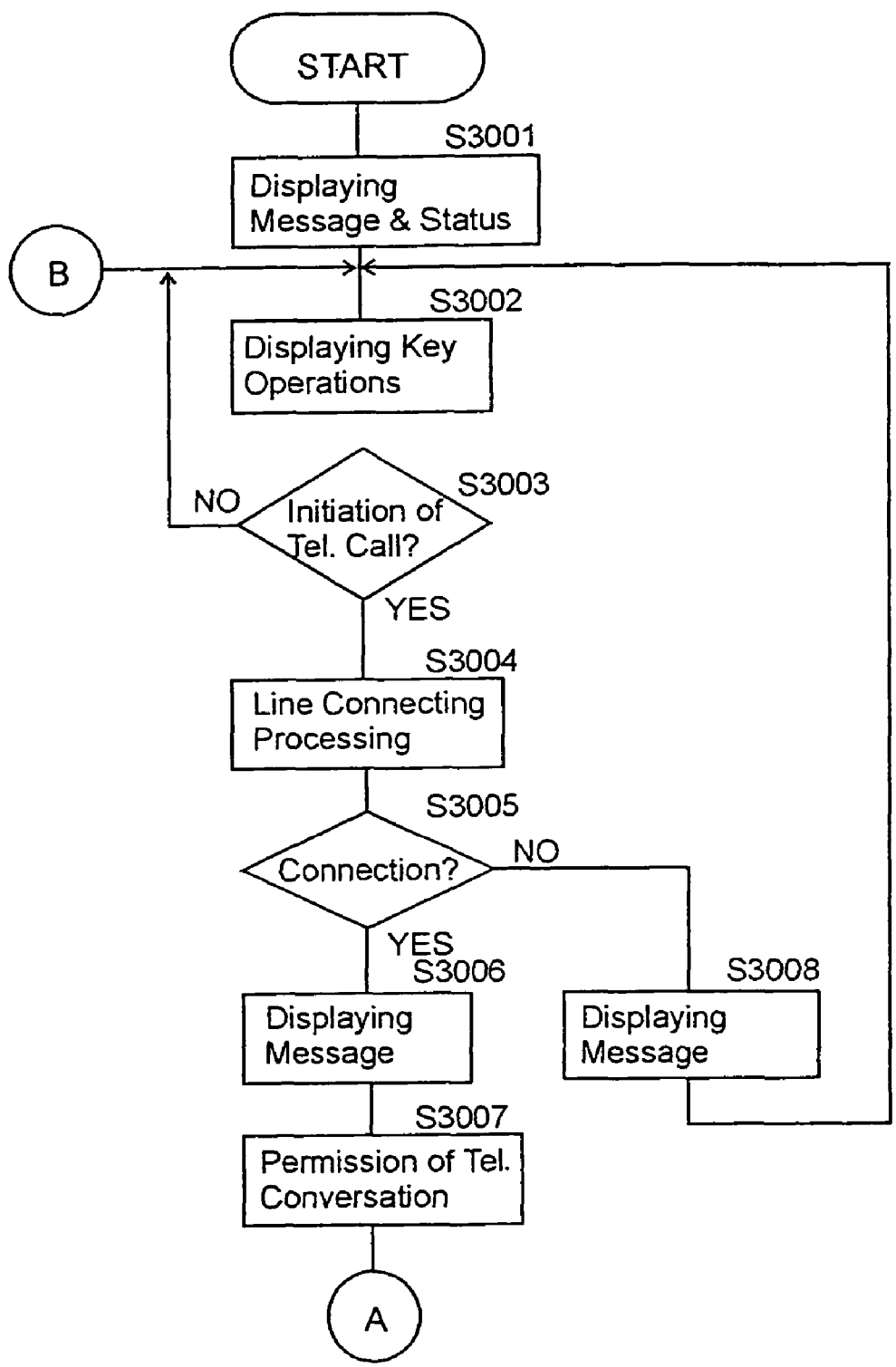
FIG. 44 is a flowchart showing the procedure of control performed during a telephone call.

Control Portion of Portable Telephone, Referring to FIG. 43

Next, the control portion of the portable telephone 3001 will be described with reference to FIG. 43. The control portion 3050 is similar to those of conventional portable telephones, and is formed with the CPU 2135 (also shown in FIG. 32) as the main element. To the CPU 2135, the operation portion 3012, the microphone 3013, the speaker 3014, a light emitting device 3016 such as an LED being turned on to indicate that a telephone call is in progress, and a memory 3017 for storing telephone numbers and the like therein are further connected, and the antenna 3015 is connected through a radio communication circuit 3018.

A battery 3051 included in the control portion 3050 supplies power to the CPU 2135, the drive circuit 2130 and the radio communication circuit 3018 through a power supply circuit 3052. The remaining power of the battery 3051 is monitored by a monitoring circuit 3053 controlled by the CPU 2135. The CPU 2135 decides whether to permit update of the display on the liquid crystal display device 2100 or not based on the remaining power data from the monitoring circuit 3053. The control of whether to permit update or not and other various controls by the CPU 2135 will be described later.

Procedure of Control Performed During a Telephone Call, Referring to FIGS. 44 to 48A-48F FIGS. 44 to 47 show the procedure of control performed by the CPU 2135 during a telephone call. First, at step S3001, a message prompting the user to make a telephone call and status are displayed on the liquid crystal display panel 3011 (see FIG. 48A). Then, at step S3002, a display corresponding to a key operation such as telephone number input on the operation portion 3012 is provided on the liquid crystal display panel 3011.

Then, when the initiation of a telephone call by turning on of a call placement button or the like is recognized at step S3003, line connecting processing is performed at step S3004, and whether a connection is established or not is determined at step S3005. When a connection is established, a message indicating this is displayed at step S3006 (see FIG. 48B), and a telephone conversation is permitted at step S3007. When a connection cannot be established for a reason such that the line is busy, a message indicating this is displayed at step S3008 (see FIG. 48C), and the process returns to step S3002.

Figure 46:
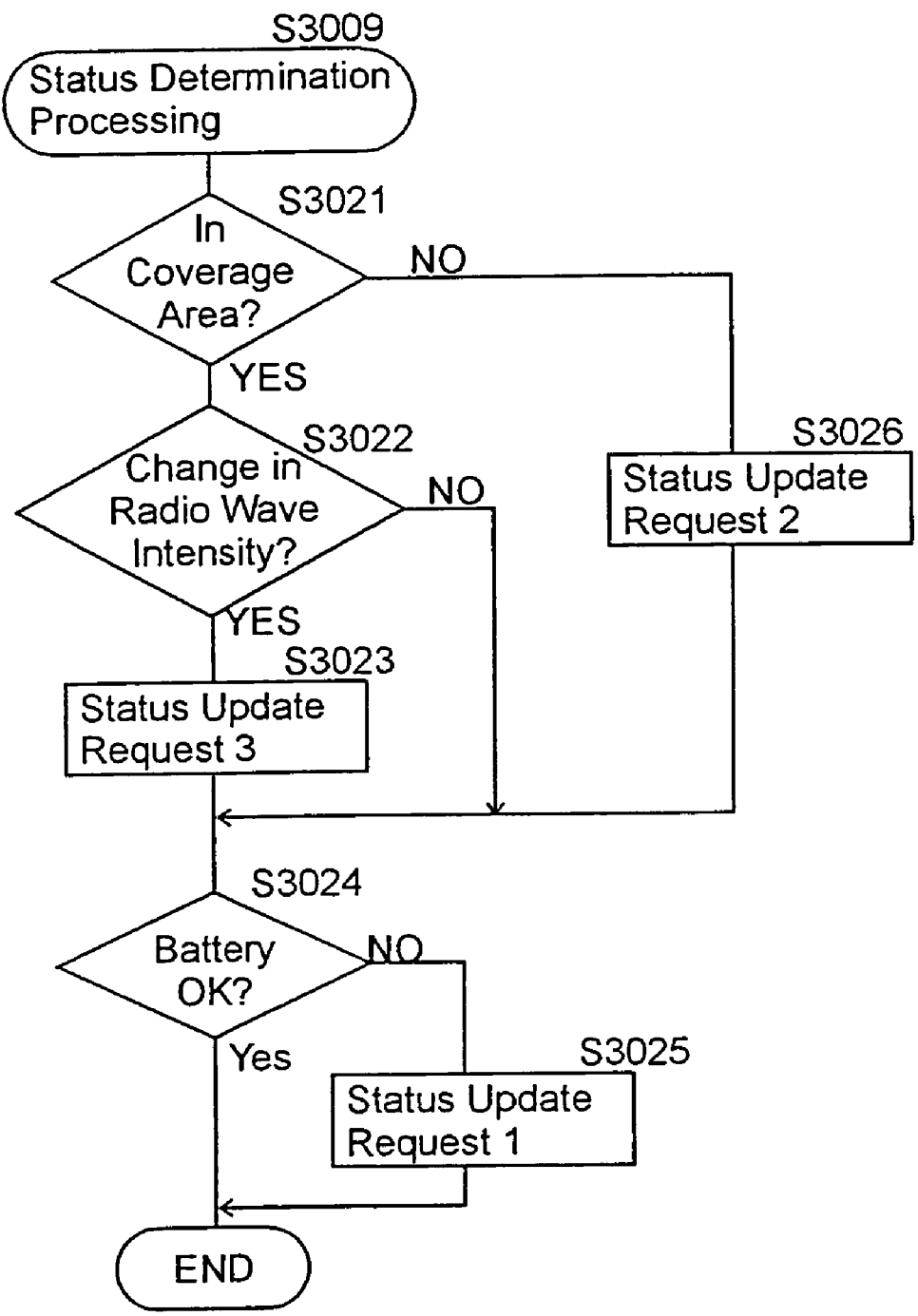
FIG. 46 is a flowchart showing status determination processing.

After a telephone conversation is permitted, a subroutine of status determination processing is called at step S3009 to determine the status. The status determined at this step is whether the portable telephone 3001 is in the coverage area or not and the remaining power of the battery. As shown in FIG. 46, first, whether the portable telephone 3001 is in the coverage area or not is determined at step S3021. In the case where the portable telephone 3001 is in the coverage area, when a change in the radio wave intensity is recognized at step S3022, a status update request 3 (intensity change) is issued at step S3023.

When it is determined at step S3021 that the portable telephone 3001 is outside the coverage area, a status update request 2 (outside the coverage area) is issued at step S3026.

Then, at step S3024, whether a predetermined amount of power is left in the battery 3051 or not is determined based on the detection by the monitoring circuit 3053. When the predetermined amount of power is not left, a status update request 1 (battery warning) is issued at step S3025.

Figure 45:
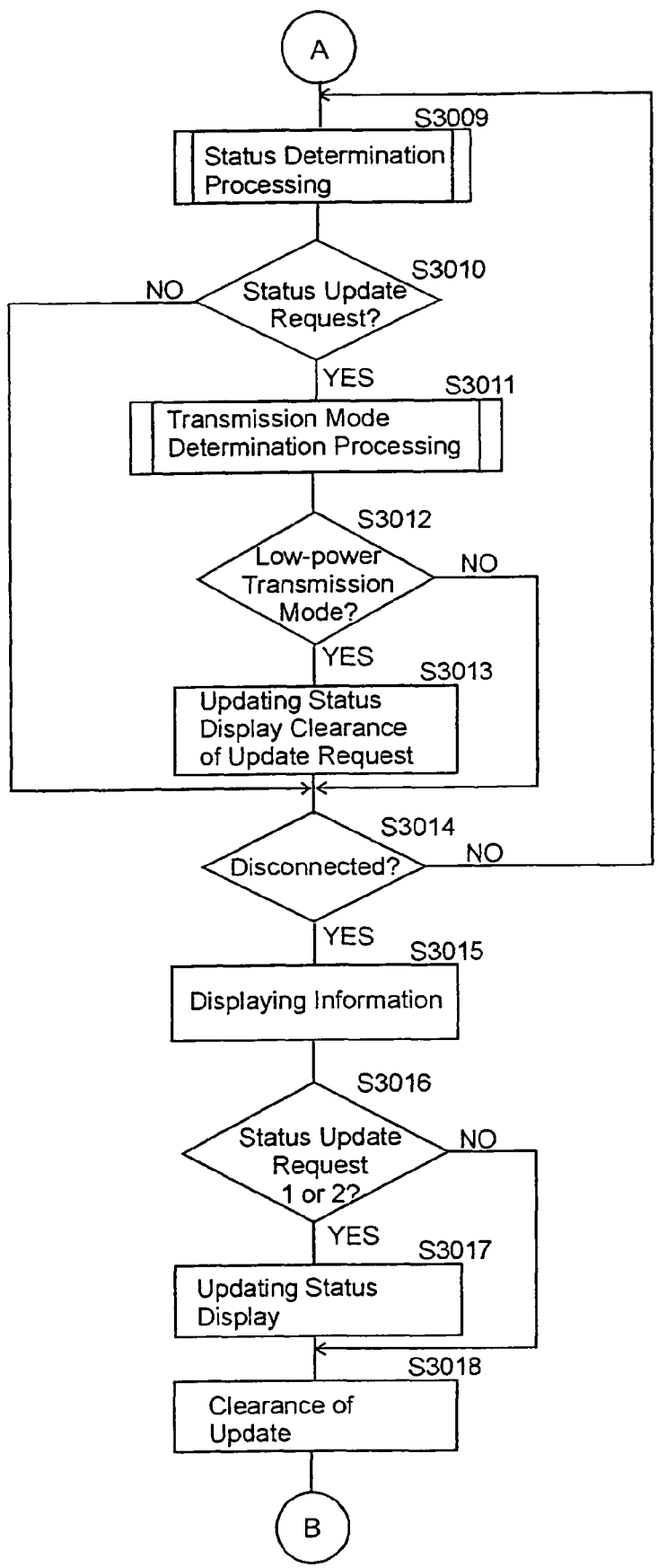
FIG. 45 is a flowchart showing the procedure of control performed during a telephone call, continued from FIG. 44.

When the status determination processing is finished, reverting to FIG. 45, whether there is a status update request or not is determined at step S3010. When there is no status update request, the process proceeds to step S3014. When there is a status update request, the transmission mode is determined at step S3011.

Figure 47:
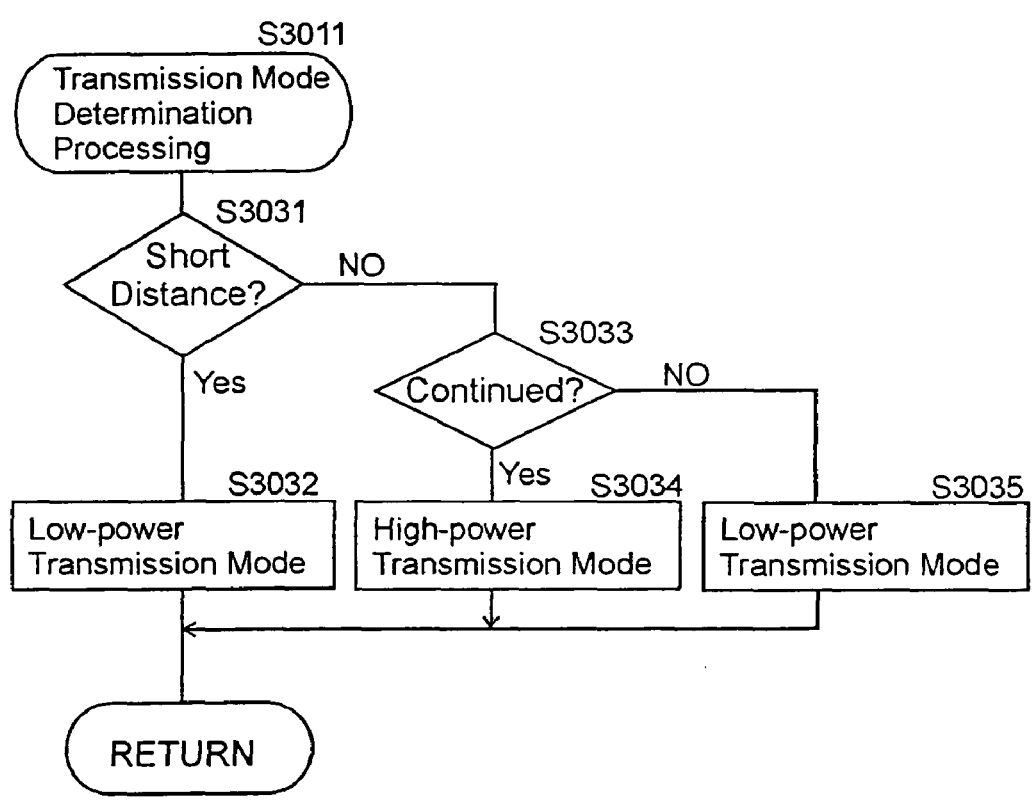
FIG. 47 is a flowchart showing transmission mode determination processing.

In this embodiment, a low-power transmission mode and a high-power transmission mode are provided. As shown in FIG. 47, first, the distance to the base station is determined at step S3031. When the distance is short, the low-power transmission mode is set at step S3032. When the distance is long, whether a voice communication at a sound level not less than a predetermined level is continued or not is determined at step S3033. When the communication is continued, the high-power transmission mode is set at step S3034. When the communication is not continued, the low-power transmission mode is set at step S3035.

When the transmission mode determination processing is finished, reverting to FIG. 45, whether the low-power transmission mode is set or not is determined at step S3012. When the low-power transmission mode is set, the display in the status display area 3011a is updated at step S3013 (see FIGS. 48D, 48E and 48F) and the update request is cleared. That is, in the transmission mode determination processing, the CPU 2135 selects either a mode that inhibits update of the entire area of the display device during communication or a mode that permits partial update of the display device during communication.

Then, whether the line is disconnected or not is determined at step S3014. When the line is not disconnected, the process returns to step S3009. When the line is disconnected, at step S3015, information such as the call time is displayed in the guidance display area 3011b. That is, during the time from when a telephone conversation is permitted at step S3007 to when it is determined at step S3014 that the line is disconnected, update of the display on the liquid crystal display panel 3011 is inhibited except for the display in the status display area 3011a. When only the display in the status display area 3011a is updated, since the increase in electric load is lower than when the entire screen is updated, even if the display in the status display area 3011a is updated during a telephone call, the possibility that the call is interrupted is not strong. This is also effective at preventing update of a display from being stopped in the middle so that an uncompleted screen remains displayed.

Then, whether the status update request 1 or 2 is issued or not is determined at step S3016. When the request 1 or 2 is issued, the status display is updated at step S3017 (see FIGS. 48D and 48E). Then, in either case, the update request is cleared at step S3018. It is considered that after a telephone call or display is completed, even if the radio wave intensity changes, the necessity to immediately update the radio wave intensity display is not great. Therefore, at step S3016, determination is performed only for the status update requests 1 and 2.

While the status display is not updated in a call and communication start wait state in this embodiment, it is to be noted that the status display may be updated as required by periodically performing status determination processing like step S3009 in the wait state.

Figure 49A:
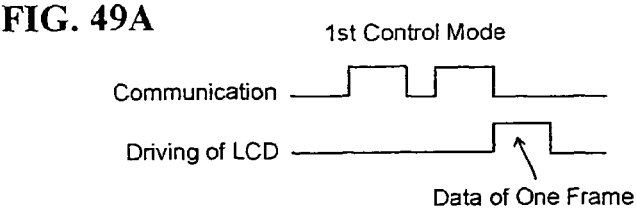
FIGS. 49A through 49C are charts showing a form of a control mode.
Figure 49B:
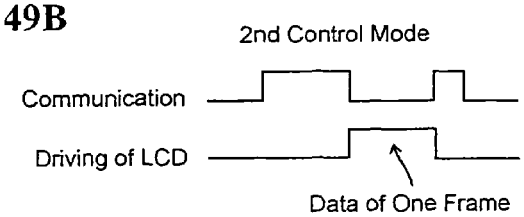
Figure 49C:
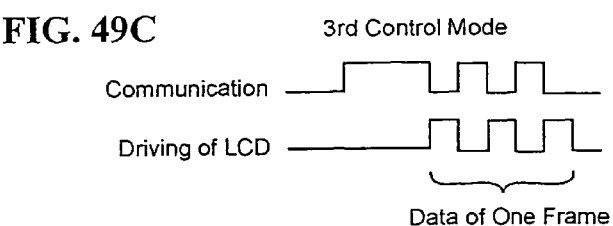

Form of Control Mode, Referring to FIGS. 49A Through 49C

In the portable telephone 3001, when the line is connected, first, second and third control modes shown in FIGS. 49A through 49C are provided with respect to a relationship between communication (meaning substantial data exchange) and driving of the liquid crystal display device 2100.

In the first control mode, image formation on the liquid crystal display panel 3011 is started after completion of communication, and communication is started after completion of image formation. In the second control mode, image formation on the liquid crystal display panel 3011 has higher priority and communication is suspended when image formation is started. In the third control mode, communication has higher priority, and image formation is started when communication is interrupted, and is suspended when communication is resumed.

The first, the second and the third control modes all inhibit driving of the liquid crystal display panel 3011 and communication from being performed at the same time. In the portable telephone 3001, at least driving of the guidance display area 3011b of the liquid crystal display panel 3011 and communication are inhibited from being performed at the same time. Simultaneous driving of update of the entire area of the display panel 3011 and communication may be inhibited, or only update of the guidance display area 3011b may be inhibited. The status may also be periodically updated by periodically performing status determination also during communication.

Figure 50:
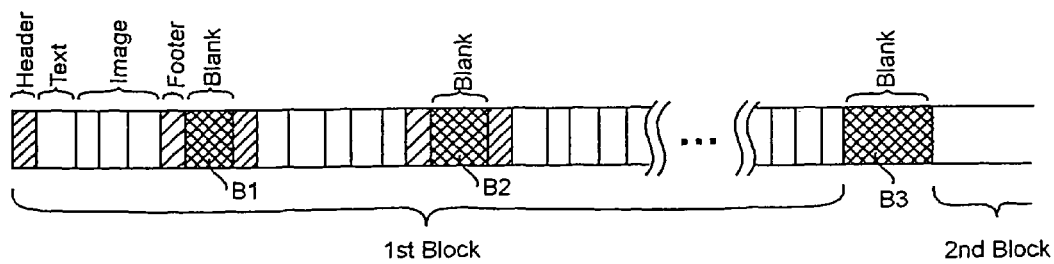
FIG. 50 is a chart showing a data structure example.
Figure 51:
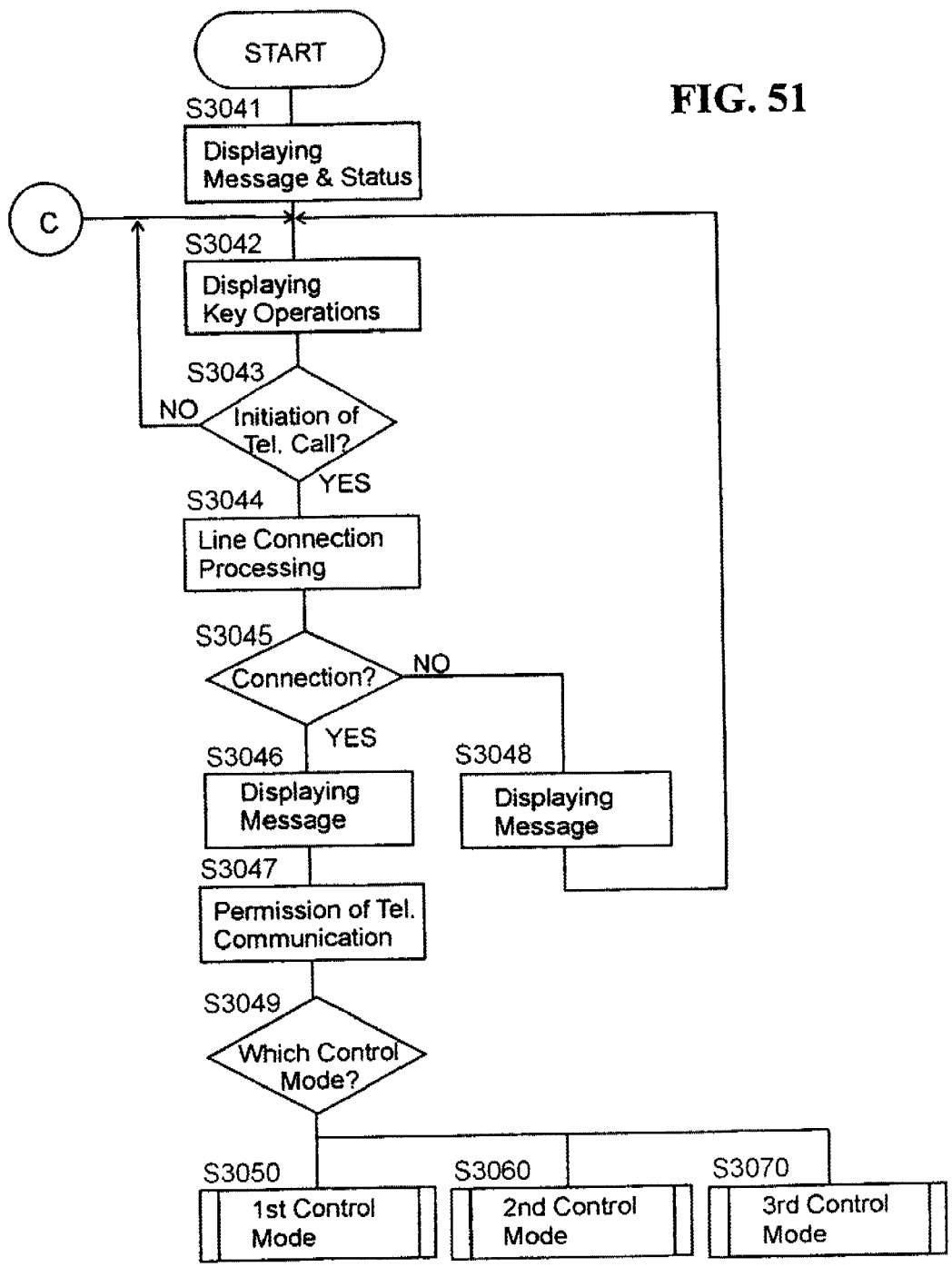
FIG. 51 is a flowchart showing the procedure of control performed during communication.

Data Structure, Referring to FIG. 50

FIG. 50 shows a data structure example, which includes a header, text, an image, a footer and the like. While blanks B1 and B2 are blanks inevitably generated because of heavy line traffic or the like, a blank may be previously provided like a blank B3.

Procedure of Control Performed During Communication, Referring to FIGS. 51 to 55A-55F FIGS. 51 to 54 show the procedure of control performed by the CPU 2135 during communication of mail or the like. When communication is initiated, at step S3041, a message and status is displayed on the liquid crystal display panel 3011 (see FIG. 55A). Then, at step S3042, a display corresponding to a key operation on the operation portion 3012 is provided on the liquid crystal display panel 3011.

Then, when the initiation of communication is recognized at step S3043, the line is connected at step S3044, and whether a connection is established or not is determined at step S3045. When a connection is established, a message indicating this is displayed at step S3046 (see FIG. 55B), and communication is permitted at step S3047. When a connection cannot be established because of server maintenance or the like, a message indicating this is displayed at step S3048 (see FIG. 55C), and the process returns to step S3042.

When communication is permitted at step S3047, the control mode is checked at step S3049, and based on the set control mode, a subsequently described subroutine of step S3050, S3060 or S3070 is executed.

Figure 52:
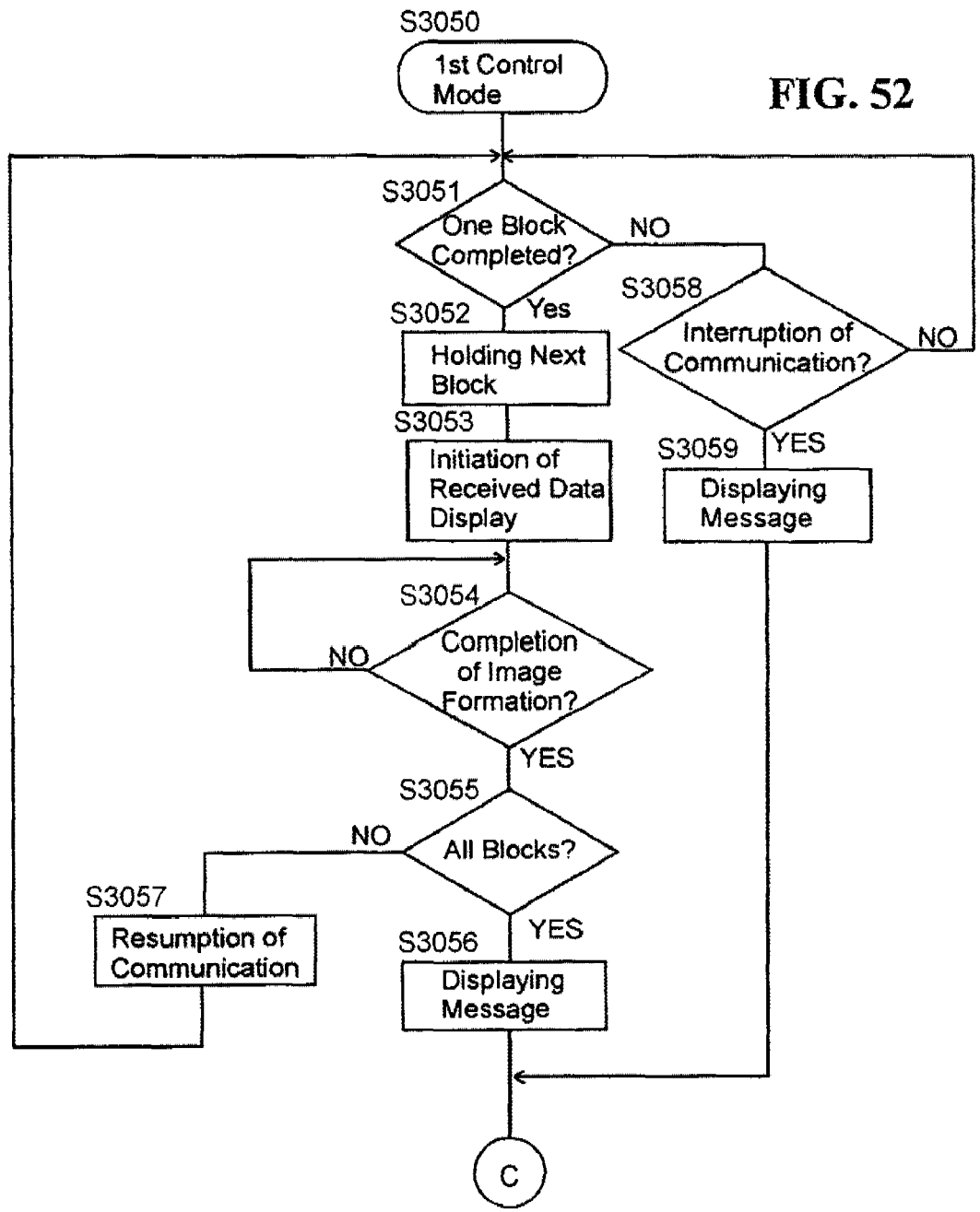
FIG. 52 is a flowchart showing a first control mode.

When the first control mode is set, as shown in FIG. 52, whether communication of one block is completed or not is determined at step S3051. When communication of one block is completed, reception of the data of the next block is placed on hold at step S3052, and display of the received data is started at step S3053 (see FIG. 55D).

Then, after completion of image formation of the received data is recognized at step S3054, whether communication of all the blocks is completed or not is determined at step S3055. When communication of all the blocks is completed, a message indicating the completion is displayed at step S3056 (see FIG. 55E), and the process returns to step S3042. When communication of all the blocks is not completed, communication is resumed at step S3057, and the process returns to step S3051.

When it is determined at step S3051 that communication of one block is not completed, after interruption of communication is recognized at step S3058, a message indicating this is displayed at step S3059 (FIG. 55F), and the process returns to step S3042.

Figure 53:
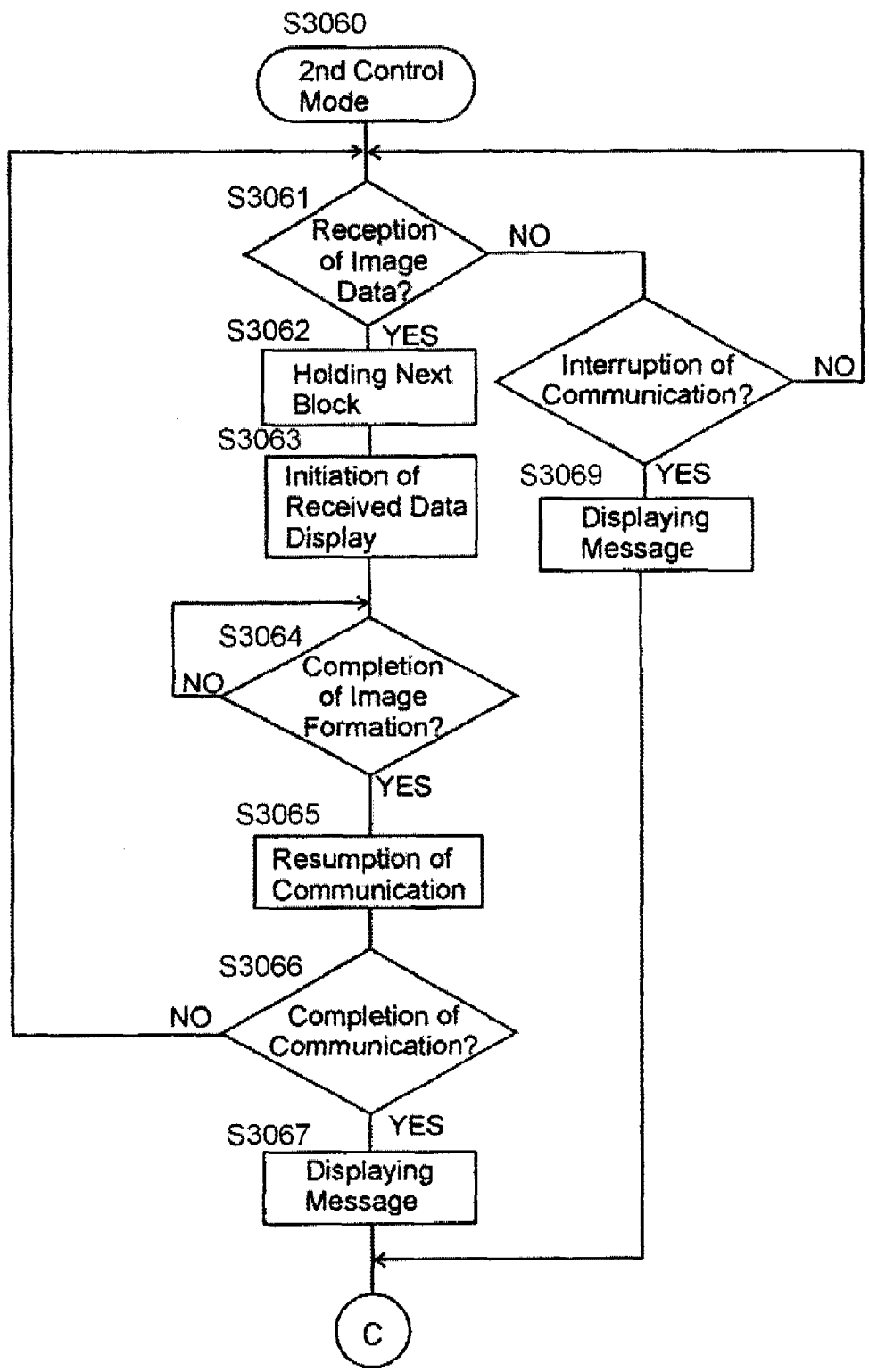
FIG. 53 is a flowchart showing a second control mode.

When the second control mode is set, as shown in FIG. 53, whether image data has been received or not is determined at step S3061. When image data has been received, communication is suspended at step S3062, and display of the received data is started at step S3063 (see FIG. 55D).

Then, after completion of image formation of the received data is recognized at step S3064, communication is resumed at step S3065. Then, whether communication is completed or not is determined at step S3066. When communication is completed, a message indicating the completion is displayed at step S3067 (see FIG. 55E), and the process returns to step S3042. When communication is not completed, the process returns to step S3061.

When it is determined at step S3061 that image data has not been received, after interruption of communication is recognized at step S3068, a message indicating this is displayed at step S3069 (see FIG. 55F), and the process returns to step S3042.

Figure 54:
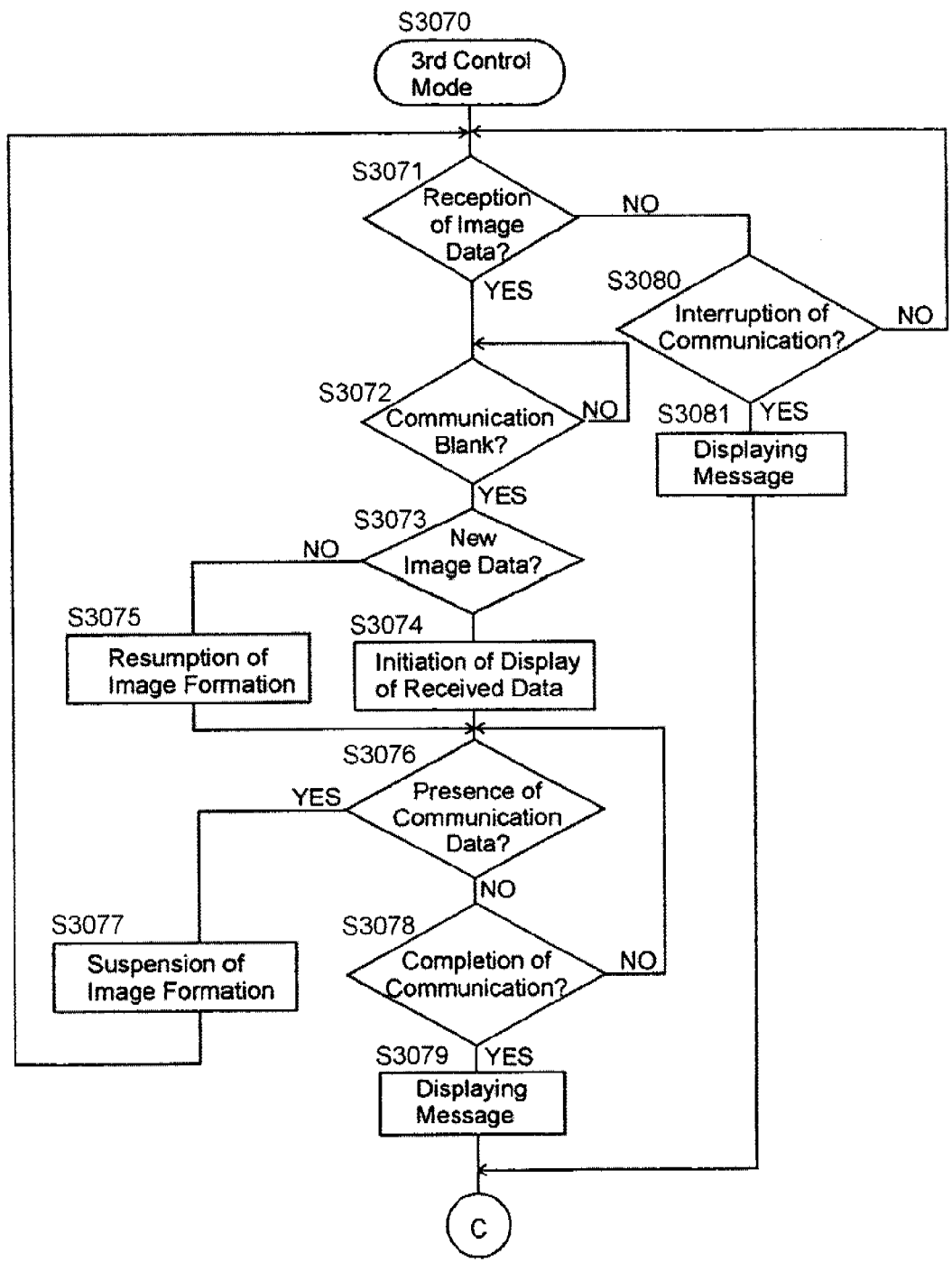
FIG. 54 is a flowchart showing a third control mode.
Figure 55A:
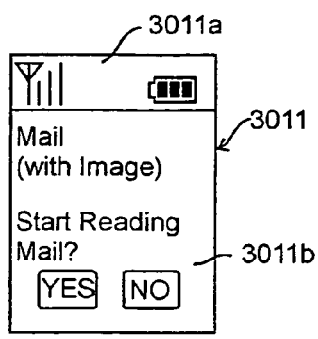
FIGS. 55A through 55F are explanatory views showing examples of the display provided on the liquid crystal display panel during communication.
Figure 55B:
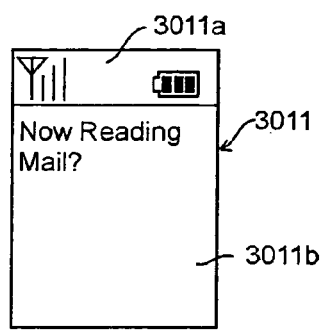
Figure 55C:
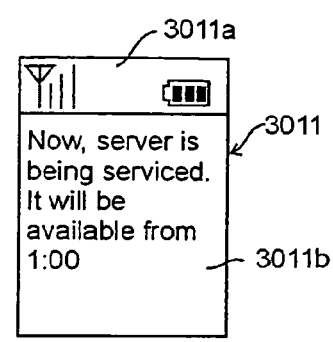
Figure 55D:
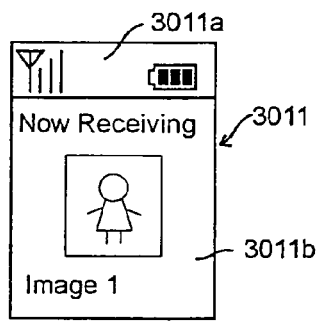
Figure 55E:
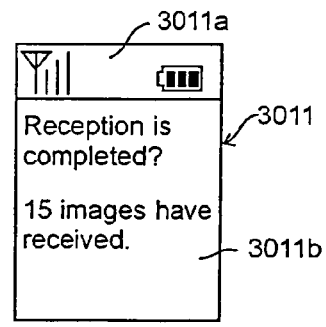
Figure 55F:
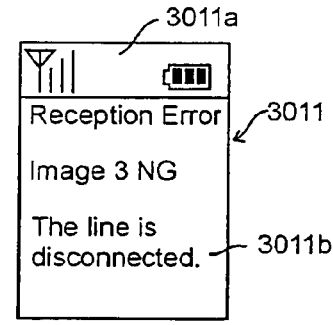

When the third control mode is set, as shown in FIG. 54, first, whether image data has been received or not is determined at step S3071. When image data has been received, after the presence of a communication blank is recognized at step S3072, whether the received data is new image data or not is determined at step S3073. When the received data is new image data, display of the received data is started at step S3074 (see FIG. 55D). When the received data is not new image data, image formation is resumed at step S3075.

Then, the presence or absence of communication data is determined at step S3076. When there is communication data, image formation is suspended at step S3077, and the process returns to step S3071. When there is no communication data, after completion of communication is recognized at step S3078, a message indicating the completion is displayed at step S3079 (see FIG. 55E), and the process returns to step S3042. The process returns to step S3076 while communication is in progress.

When it is determined at step S3071 that image data has not been received, after interruption of communication is recognized at step S3080, a message indicating this is displayed at step S3081 (see FIG. 55F), and the process returns to step S3042.

Other Embodiments

The portable communication terminal according to the present invention is not limited to the above-described embodiments, but various changes and modifications may be made without departing from the spirit and scope of the invention.

Particularly, the present invention is widely applicable to portable communication terminals such as PHS's, portable terminals designed specifically for electronic mail and PDAs having a communication function as well as to portable telephones.

Moreover, the appearance of the portable telephone and the position of the liquid crystal display panel shown in the above-described embodiment are not limited to the particular configurations illustrated and described.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A portable communication terminal comprising:
   a display device having memory capability;
   a driver for driving said display device to update a display on at least a portion of said display device, said display device keeping an image displayed thereon after the driver turns off;
   a radio communication device for performing radio communication;
   a power source for supplying power to said communications device and said driver for driving said display device; and
   a controller for inhibiting performing of radio communication during updating of at least a portion of said display device so as to limit a load on said power source.

2. A portable communication terminal in accordance with claim 1, wherein said controller is configured to inhibit simultaneous communication and updating of said display device.

3. A portable communication terminal in accordance with claim 1, further comprising:
   a selector for selecting a first display mode or a second display mode; and
   wherein said controller is responsive to said selector, and said controller is configured so that, in said first mode, said controller inhibits update of all areas of said display device during communication and said controller is configured so that, in said second mode, said controller permits update of at least one area of said display device during communication.

4. A portable communication terminal in accordance with claim 1,
   wherein the controller is configured so as to invoke inhibition of radio communication based on updating of at least a portion of said display device.

5. A portable communication terminal in accordance with claim 1, wherein said controller is configured to permit simultaneous performing of communication and updating of at least a portion of said display device.

6. A portable communication terminal in accordance with claim 5, wherein said portion of display area permitted to be updated simultaneous with performing communication is an additional information display area.

7. A portable communication terminal comprising:
   a display device having memory capability such that said display device can maintain an image displayed thereon without application of power;
   a display driver configured to drive said display device to update a display on at least a portion of said display device;
   a wireless communication device configured to perform wireless communication;
   a power source for supplying power to said communications device and said driver for driving said display device; and
   a controller that is responsive to the updating of at least a portion of said display device and which is configured so that during a period when at least a portion of said display device is being updated, said controller as a result of such updating inhibits wireless communication during such period so as to limit a load on said power source.

* * * * *